United States Patent
Park

(10) Patent No.: US 9,703,456 B2
(45) Date of Patent: Jul. 11, 2017

(54) MOBILE TERMINAL

(71) Applicant: LG ELECTRONICS INC., Seoul (KR)

(72) Inventor: Jongseok Park, Seoul (KR)

(73) Assignee: LG Electronics Inc., Seoul (KR)

(*) Notice: Subject to any disclaimer, the term of this patent is extended or adjusted under 35 U.S.C. 154(b) by 93 days.

(21) Appl. No.: 13/853,920

(22) Filed: Mar. 29, 2013

(65) Prior Publication Data

US 2013/0263002 A1    Oct. 3, 2013

(30) Foreign Application Priority Data

Mar. 30, 2012   (KR) ........................ 10-2012-0033542

(51) Int. Cl.

| | | |
|---|---|---|
| G06F 3/048 | (2013.01) | |
| G06F 3/0484 | (2013.01) | |
| G06F 3/0488 | (2013.01) | |
| G06F 17/30 | (2006.01) | |
| G11B 27/00 | (2006.01) | |
| G11B 27/10 | (2006.01) | |
| G11B 27/34 | (2006.01) | |
| G11B 27/034 | (2006.01) | |
| H04N 5/445 | (2011.01) | |

(52) U.S. Cl.
CPC .......... *G06F 3/0484* (2013.01); *G06F 3/0488* (2013.01); *G06F 17/3082* (2013.01); *G11B 27/005* (2013.01); *G11B 27/105* (2013.01); *G11B 27/34* (2013.01); *G11B 27/034* (2013.01); *H04N 5/44543* (2013.01)

(58) Field of Classification Search
CPC ... G11B 27/34; G11B 27/034; H04N 5/44543
USPC ........................................................... 715/719
See application file for complete search history.

(56) References Cited

U.S. PATENT DOCUMENTS

| | | | |
|---|---|---|---|
| 8,139,126 B2* | 3/2012 | Manico et al. | ............... 348/239 |
| 8,515,241 B2* | 8/2013 | Forsyth et al. | ............... 386/239 |
| 8,819,719 B1* | 8/2014 | Chen et al. | ..................... 725/24 |
| 2003/0093790 A1* | 5/2003 | Logan et al. | ................... 725/38 |
| 2004/0080611 A1* | 4/2004 | Kakii et al. | ............... 348/14.16 |
| 2004/0098754 A1* | 5/2004 | Vella | ..................... H04N 5/445 |
| | | | 725/135 |
| 2004/0152055 A1* | 8/2004 | Gliessner | ................. G09B 5/06 |
| | | | 434/169 |
| 2007/0127888 A1* | 6/2007 | Hayashi et al. | ................ 386/96 |
| 2007/0263984 A1* | 11/2007 | Sterner | ............... G11B 27/034 |
| | | | 386/234 |

(Continued)

*Primary Examiner* — Abdullah Al Kawsar
*Assistant Examiner* — Jian Yu
(74) *Attorney, Agent, or Firm* — Lee, Hong, Degerman, Kang & Waimey PC

(57) ABSTRACT

A mobile terminal is disclosed. The mobile terminal, if a memo-writing function is activated during video play, assigns at least one part of a touchscreen as an area for handwriting inputs while displaying a video on the touchscreen and obtains a first play timing corresponding to a memo-start time; and if a memo-saving function is carried out, obtains a second play timing which corresponds to the memo-saving time and stores a memo generated based on handwriting inputs received through the handwriting input area in association with the video by reflecting at least one of the first and the second play timing.

28 Claims, 55 Drawing Sheets

(56) References Cited

U.S. PATENT DOCUMENTS

| | | | |
|---|---|---|---|
| 2007/0266304 A1* | 11/2007 | Fletcher | G06F 17/241 715/230 |
| 2008/0119235 A1* | 5/2008 | Nielsen et al. | 455/566 |
| 2008/0253737 A1* | 10/2008 | Kimura et al. | 386/68 |
| 2009/0187825 A1* | 7/2009 | Sandquist | G06F 17/30781 715/719 |
| 2009/0191519 A1* | 7/2009 | Wakamoto et al. | 434/157 |
| 2009/0327856 A1* | 12/2009 | Mouilleseaux | G06F 17/30781 715/230 |
| 2010/0318520 A1* | 12/2010 | Loeb et al. | 707/743 |
| 2011/0138354 A1* | 6/2011 | Hertenstein et al. | 717/115 |
| 2011/0275416 A1* | 11/2011 | Chang et al. | 455/566 |
| 2011/0300910 A1* | 12/2011 | Choi | 455/566 |
| 2012/0204106 A1* | 8/2012 | Hill et al. | 715/716 |
| 2012/0208160 A1* | 8/2012 | Kaylor et al. | 434/262 |
| 2012/0276504 A1* | 11/2012 | Chen et al. | 434/157 |
| 2013/0004138 A1* | 1/2013 | Kilar et al. | 386/230 |
| 2013/0027425 A1* | 1/2013 | Yuan | G06F 3/0484 345/629 |
| 2013/0067394 A1* | 3/2013 | Nan et al. | 715/784 |

* cited by examiner

FIG. 43
(a) memo writing
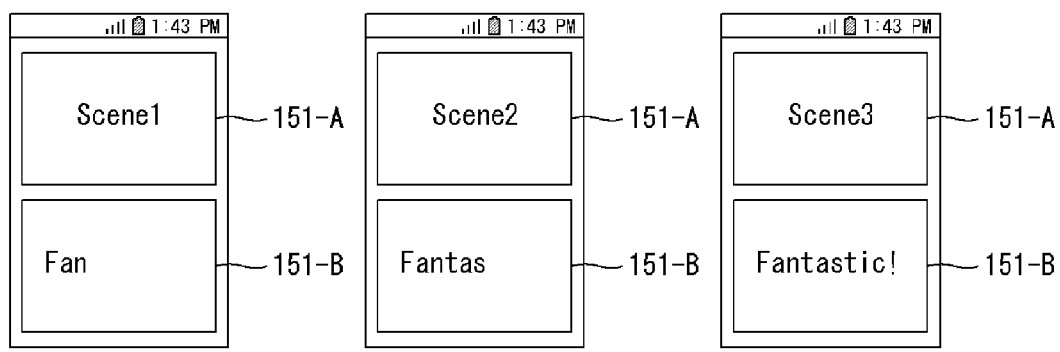
(b) memo display 1 during video play
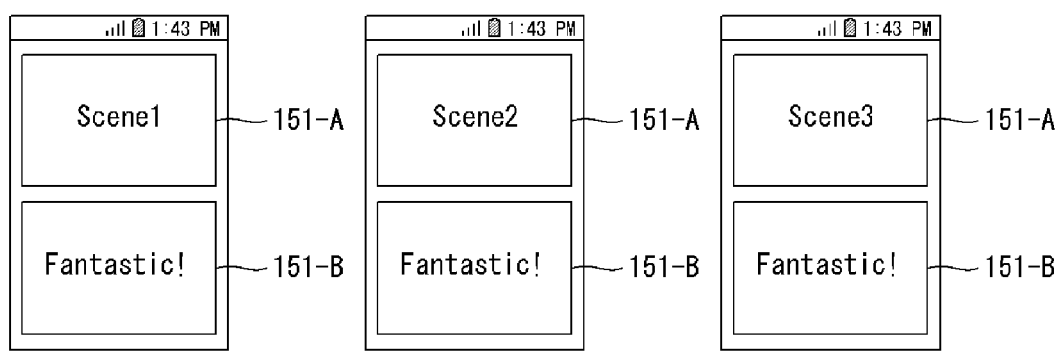
(c) memo display 2 during video play
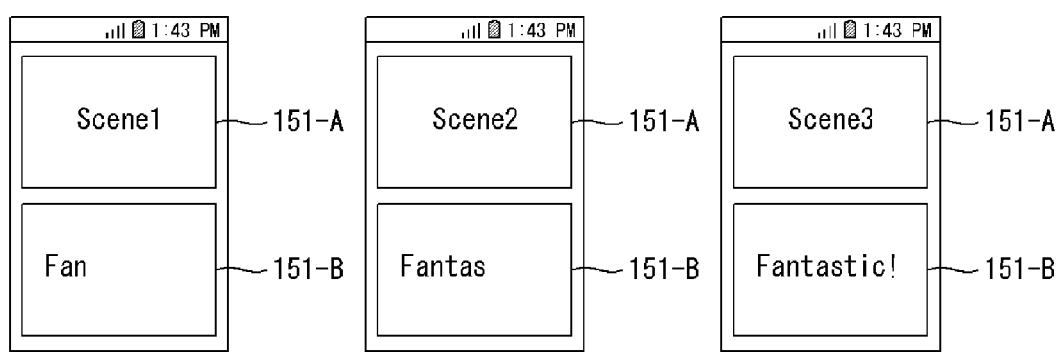

FIG. 53
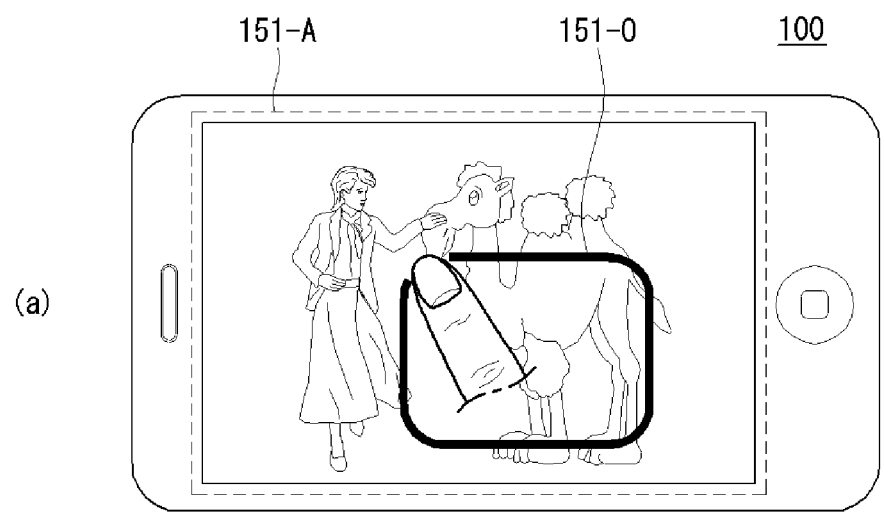
(a)
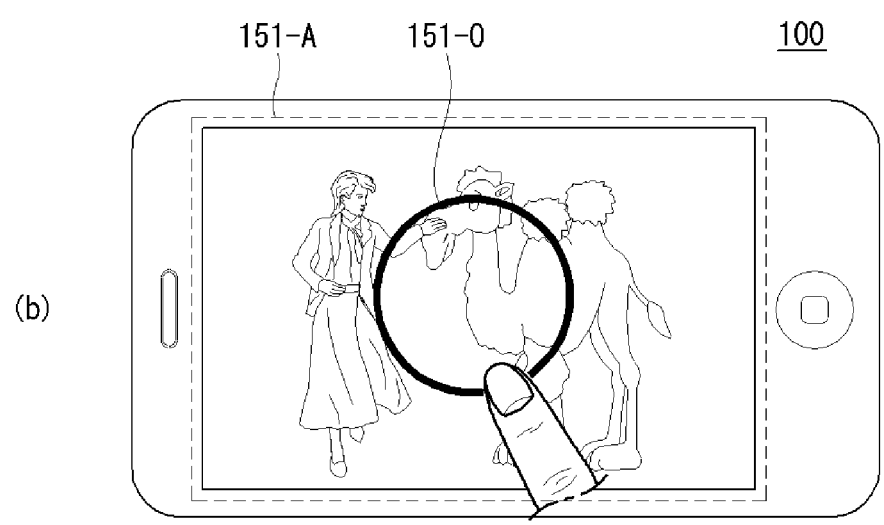
(b)

(a)  (b)

MOBILE TERMINAL

CROSS-REFERENCE TO RELATED APPLICATIONS

This application claims the priority benefit of earlier filing date and right of priority to Korean Patent Application No. 10-2012-0033542, filed on Mar. 30, 2012, the contents of which are hereby incorporated by reference herein in their entirety.

BACKGROUND OF THE INVENTION

Field of the Invention

The present invention relates to a mobile terminal and more particularly, a mobile terminal capable of carrying out a memo writing function while playing a video.

Discussion of the Related Art

As functions of terminals such as personal computers, laptop computers, cellular phones diversify, the terminals become multimedia players having multiple functions for capturing pictures or moving images, playing music, moving image files and games and receiving broadcasting programs.

To support and enhance the increasing number of functions in a terminal, improving a structural part and/or a software part of the terminal would be desirable. The menu structure of various terminals including the latest ones is getting more complex as they provide complex and diverse functions.

SUMMARY OF THE INVENTION

A technical problem of the present invention is to provide a mobile terminal capable of carrying out a memo-writing function through handwriting or voice inputs while a video is played.

Another technical problem of the present invention is to provide a mobile terminal capable of reducing a video play speed in case a memo writing function is carried out while the video is played.

A yet another technical problem of the present invention is to provide a mobile terminal capable of playing a video corresponding to a memo insertion interval repeatedly in case a memo writing function is activated while the video is played.

A still another technical problem of the present invention is to provide a mobile terminal supporting designating only a time point at which a memo is supposed to be inserted while a video is played and writing a memo at the designated time point after the video play is completed.

Technical problems of the present invention are not limited to what is mentioned above and different technical problems not mentioned above will be clearly understood from the descriptions provided below by those skilled in the art to which the present invention belongs.

To solve the technical problems above, a mobile terminal according to an embodiment of the present invention comprises a touch screen and a controller. The controller, if a memo-writing function is activated during video play, assigns at least one part of the touch screen as an area for handwriting inputs while displaying the video on the touch screen and obtains a first play timing corresponding to a memo-start time. The controller, if a memo-saving function is carried out, obtains a second play timing which corresponds to the memo-saving time and stores a memo generated based on handwriting inputs received through the handwriting input area in association with the video by reflecting at least one of the first and the second play timing.

To solve the technical problem, a mobile terminal according to another embodiment of the present invention comprises a microphone, a touchscreen, and a controller. The controller, if a memo-writing function is activated during video play, activates the microphone while displaying the video on the touchscreen and obtains a first play timing corresponding to a memo-start time. Next, if a memo-saving function is carried out, the controller obtains a second play timing which corresponds to the memo-saving time and stores a memo generated based on sound signals received through the microphone by reflecting at least one of the first and the second play timing.

To solve the technical problem, a mobile terminal according to yet another embodiment of the present invention comprises a touchscreen and a controller. The controller, if a memo-insertion function is activated during video play, displays a user interface for choosing data to be stored in association with the video on the screen while displaying the video on the screen and inserts the data chosen through the user interface into a memo corresponding to a play timing selected from among the video play timings.

To solve the technical problem, a mobile terminal according to a still another embodiment of the present invention comprises a touchscreen; and a controller reducing a video play speed if memo writing is started during video play, playing the video at a normal speed after memo writing is completed, setting up an interval between a memo writing start time and a memo writing completion time as a memo insertion time, and displaying the memo insertion interval in a video play progress bar.

To solve the technical problem, a mobile terminal according to a further embodiment of the present invention comprises a touchscreen; and a controller providing a user interface meant for memo writing through the touchscreen if a start time of a predetermined memo writing interval is approached and playing a video interval corresponding to the memo writing interval repeatedly while the user interface is provided until memo writing is completed.

To solve the technical problem, a mobile terminal according to an additional embodiment of the present invention comprises a touchscreen; and a controller, if a video play is terminated after a plurality of time points for memo insertion are selected during video play or video recording, displaying a plurality of items corresponding to the selected plurality of time points and if a particular item is selected from among the plurality of items, displaying a user interface for writing a memo to be inserted at a time point corresponding to the particular item.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIG. 43 illustrates a procedure of displaying a memo stored according to a method for operating a mobile terminal of FIG. 42;

FIG. 53 illustrates examples of selecting a time at which a memo is inserted according to a method for operating a mobile terminal of FIG. 51;

DETAILED DESCRIPTION OF THE INVENTION

The objectives, characteristics, and advantages of the present invention will be more clearly understood from the following descriptions related to appended drawings. Hereinafter, preferred embodiments according to the present invention will be described in more detail with reference to appended drawings. The same reference number denotes the same constituting element throughout the entire document. Also, if it is determined that functions known to the public related to the present invention or a specific descriptions about structure of the present invention unnecessarily cause ambiguity in understanding technical principles of the present invention, the corresponding descriptions will be omitted.

Hereinafter, a mobile terminal according to embodiments of the present invention will be described below in more detail with reference to the accompanying drawings. In the following description, the suffixes "module" and "unit" are used in reference to components of the mobile terminal for convenience of description and do not have meanings or functions different from each other.

The mobile terminals described herein may include a cellular phone, a smart phone, a laptop computer, a digital broadcasting terminal, a personal digital assistant (PDA), a portable multimedia player (PMP), and a navigation system. However, the present invention is not limited to the types of mobile terminals described above.

Figure 1:
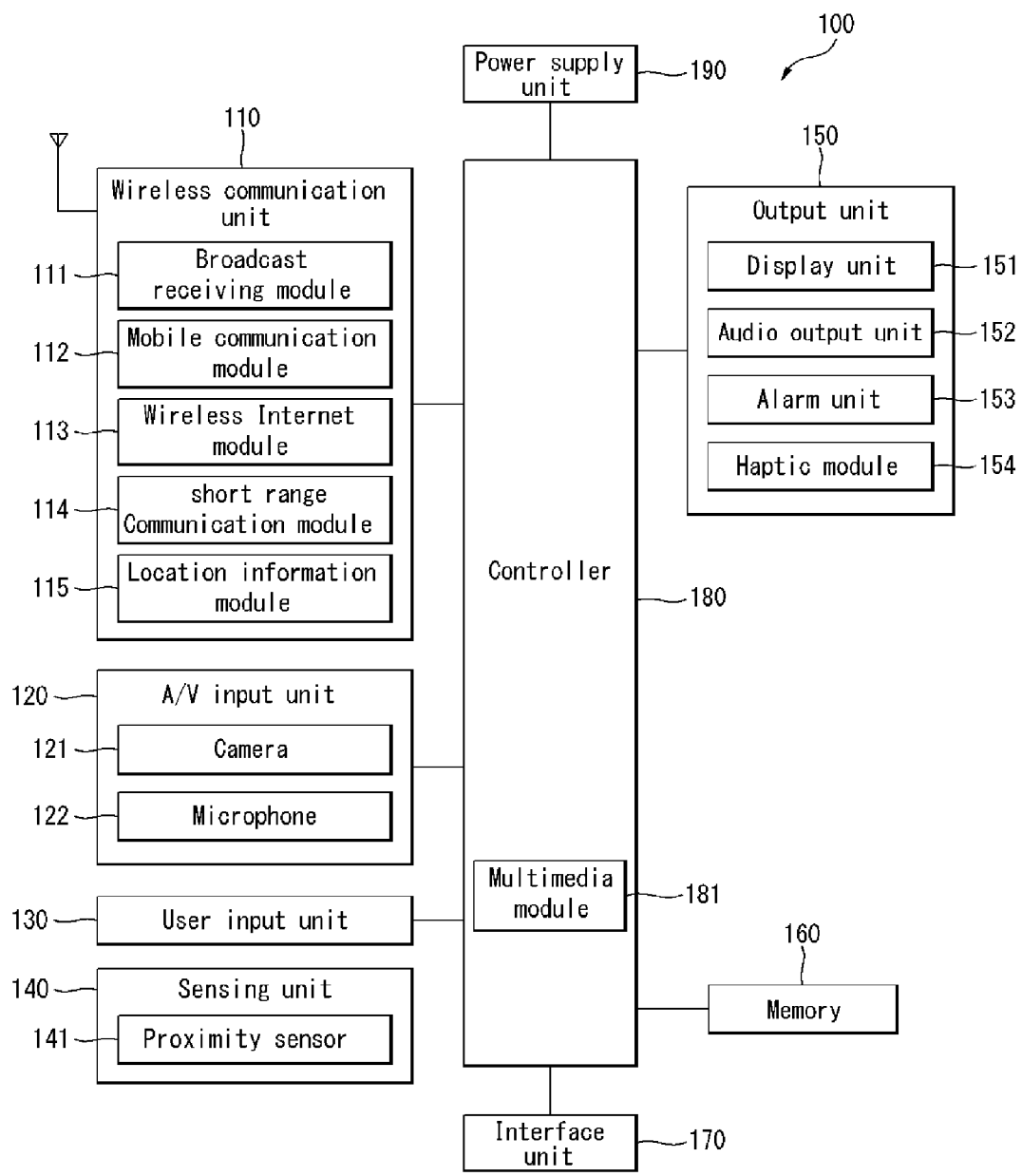
FIG. 1 is a block diagram of a mobile terminal according to an embodiment of the present invention.

FIG. 1 is a block diagram of an implementation of a mobile terminal 100. The mobile terminal 100 can include a wireless communication unit 110, an audio/video (A/V) input unit 120, a user input unit 130, a sensing unit 140, an output unit 150, a memory 160, an interface unit 170, a controller 180, and a power supply 190. The components shown in FIG. 1 are not essential parts and the number of components included in the mobile terminal can be varied.

The components of the mobile terminal will now be described. The wireless communication unit 110 can include at least one module that enables radio communication between the mobile terminal 100 and a radio communication system or between the mobile terminal 100 and a network in which the mobile terminal 100 is located. For example, the wireless communication unit 110 can include a broadcast receiving module 111, a mobile communication module 112, a wireless Internet module 113, a short range communication module 114 and a local information module 115.

The broadcast receiving module 111 receives broadcast signals and/or broadcast related information from an external broadcast management server through a broadcast channel.

The broadcast channel can include a satellite channel and a terrestrial channel. The broadcast management server can be a server that generates and transmits broadcast signals and/or broadcast related information or a server that receives previously created broadcast signals and/or broadcast related information and transmits the broadcast signals and/or broadcast related information to a terminal. The broadcast signals can include not only television broadcast signals, radio broadcast signals and data broadcast signals but also signals in the form of combination of television broadcast signal and radio broadcast signal.

The broadcast related information can be information on a broadcast channel, a broadcast program or a broadcast service provider. The broadcast related information can be provided through a mobile communication network and the broadcast related information can be received by the mobile communication module 112.

The broadcast related information can exist in various forms. For example, the broadcast related information can exist in the form of electronic program guide (EPG) of digital multimedia broadcast (DMB) or in the form of electronic service guide (ESG) of digital video broadcast-handheld (DVB-H).

The broadcast receiving module 111 receives broadcast signals using various broadcast systems. Particularly, the broadcast receiving module 111 can receive digital broadcast signals using digital broadcast systems such as digital multimedia broadcast-terrestrial (DMB-T), digital multimedia broadcast-satellite (DMB-S), media forward link only (MediaFLO), DVB-H and integrated services digital broadcast-terrestrial (ISDB-T) systems. The broadcast receiving module 111 can be constructed to be suited to broadcast systems providing broadcast signals other than the above-described digital broadcast systems.

The broadcast signals and/or broadcast related information received via the broadcast receiving module 111 can be stored in the memory 160. The mobile communication module 112 transmits/receives a radio signal to and/or from at least one of a base station, an external terminal and a server of a mobile communication network. The radio signal can include a voice call signal, a video telephony call signal or data in various forms according to transmission and receiving of text/multimedia messages.

The wireless Internet module 113 is a module for wireless Internet access and can either be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA), and other techniques can be used as a wireless Internet technique.

The short range communication module 114 is a module for local area communication. Bluetooth™, radio frequency identification (RFID), infrared data association (IrDA), ultra wideband (UWB) and ZigBee™ can be used as a local area communication technique.

The local information module 115 confirms or obtains the position of the mobile terminal 100. A global positioning system (GPS) module is a representative example of the local information module 115. According to the current technology, the GPS module 115 can calculate information on distances between one point (object) and at least three satellites. The GPS module 115 can also calculate information on the time when the distance information is measured and apply trigonometry to the obtained distance information to obtain three-dimensional position information on the point (object) according to latitude, longitude and altitude.

Furthermore, a method of calculating position and time information using three satellites and correcting the calculated position and time information using another satellite is also used. In addition, the GPS module 115 continuously calculates the current position in real time and calculates velocity information using the position information.

The A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display unit 151.

The image frames processed by the camera 121 can be stored in the memory 160 or transmitted to an external device via the wireless communication unit 110. Some mobile terminals 100 may include at least two cameras 121.

The microphone 122 receives an external audio signal in a call mode, a recording mode or a speed recognition mode and processes the received audio signal into electric audio data. The audio data can be converted into a form that can be transmitted to a mobile communication base station via the mobile communication module 112 and output in the call mode. The microphone 122 can employ various noise removal algorithms for removing noise generated when the external audio signal is received.

The user input unit 130 receives input data for controlling the operation of the mobile terminal 100 from a user. The user input unit 130 can include a keypad, a dome switch, a touch pad (constant voltage/capacitance), jog wheel, jog switch and other input devices.

The sensing unit 140 senses the current state of the mobile terminal 100, such as open/close state of the mobile terminal, the position of the mobile terminal, whether a user touches the mobile terminal, the direction of the mobile terminal and acceleration/deceleration of the mobile terminal and generates a sensing signal for controlling the operation of the mobile terminal. For example, the sensing unit 140 can sense whether a slide phone is opened or closed when the mobile terminal 100 is a slide phone. Furthermore, the sensing unit 140 can sense whether the power supply 190 supplies power and whether the interface unit 170 is connected to an external device. The sensing unit 140 can include a proximity sensor 141.

The output unit 150 generates visual, auditory or tactile output and can include a display unit 151, an audio output unit 152, an alarm unit 153 and a haptic module 154.

The display unit 151 displays information processed by the mobile terminal 100. For example, the display unit 151 displays a user interface unit (UI) or a graphic user interface unit (GUI) related to a telephone call when the mobile terminal 100 is in the call mode. The display unit 151 displays a captured or/and received image, UI or GUI when the mobile terminal 100 is in the video telephony mode or the photographing mode.

The display unit 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display.

The rear structure of the display unit 151 can also be of the light transmission type. According to this structure, a user can see an object located behind the body of the mobile terminal 100 through an area of the body of the mobile terminal, which is occupied by the display unit 151.

The mobile terminal 100 can include at least two display modules 151 according to the construction of the terminal. For example, the mobile terminal 100 can include a plurality of display modules 151 that are arranged on a single side of the mobile terminal at a predetermined distance or integrated. Otherwise, the plurality of display modules 151 can be arranged on different sides of the mobile terminal.

The display unit 151 and a sensor sensing touch (referred to as a touch sensor hereinafter) may form a layered structure, which is referred to as a touch screen hereinafter. The display unit 151 of the touch screen can be used as an input device in addition to an output device. The touch sensor can be, for example, a touch film, a touch sheet or a touch pad.

The touch sensor can be constructed such that it converts a variation in pressure applied to a specific portion of the display unit 151 or a variation in capacitance generated at a specific portion of the display module into an electric input signal. The touch sensor can be constructed such that it can sense pressure of touch as well as the position and area of touch.

When touch input is applied to the touch sensor, a signal corresponding to the touch input is transmitted to a touch controller (not shown). The touch controller processes the signal and transmits data corresponding to the processed signal to the controller 180. Accordingly, the controller 180 can detect a touched portion of the display unit 151.

The proximity sensor 141 can be located in an internal region of the mobile terminal 100, either surrounded by the touch screen or near the touch screen. The proximity sensor 141 senses an object approaching a predetermined sensing face or an object located near the proximity sensor by using electromagnetic force or infrared rays without having mechanical contact. The proximity sensor 141 has a lifetime longer than that of a contact sensor and has wider application.

The proximity sensor 141 may include a transmission type photo-electric sensor, a direct reflection type photo-electric sensor, a mirror reflection-type photo-electric sensor, a high-frequency oscillating proximity sensor, a capacitive proximity sensor, a magnetic proximity sensor, an infrared proximity sensor, or similar sensor.

A capacitive touch screen is constructed such that proximity of a pointer is detected through a variation in an electric field according to the proximity of the pointer. In this case, the touch screen (touch sensor) can be classified as the proximity sensor 141.

For convenience of explanation, an action of the pointer approaching the touch screen while the pointer is not in contact with the touch screen, such that location of the pointer on the touch screen is recognized, is referred to as "proximity touch" and an action of the pointer making contact with the touch screen is referred to as "contact touch" in the following description. A touch point refers to the configuration where the pointer is substantially perpendicular to the touch screen while the pointer proximity-touches the touch screen.

The proximity sensor 141 senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output unit 152 can output audio data received from the wireless communication unit 110 or stored in the memory 160 in a call signal receiving mode, a telephone call or recording mode, a speech recognition mode and a broadcast receiving mode. The audio output unit 152 outputs audio signals related to functions (for example, a call signal incoming tone, a message incoming tone, etc.) performed in the mobile terminal 100. The audio output unit 152 can include a receiver, a speaker, a buzzer, or other type of audio output device.

The alarm unit 153 outputs a signal for indicating generation of an event of the mobile terminal 100. Examples of events generated in the mobile terminal 100 include receiving a call signal, receiving a message, inputting a key signal, inputting a touch, or other type of event. The alarm unit 153 can output signals in forms different from video signals or audio signals, such as, for example, a signal for indicating generation of an event via vibration. The video signals or the audio signals can be also output via the display unit 151 or the audio output unit 152.

The haptic module 154 generates various haptic effects that the user can feel. A representative example of a haptic effect is vibration. The intensity and pattern of vibration generated by the haptic module 154 can be controlled. For example, different vibrations can be combined and output or sequentially output.

The haptic module 154 can generate a variety of haptic effects. The haptic effects include: an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibration.

The haptic module 154 can transmit haptic effects via direct contact and also allow the user to feel haptic effects via kinesthetic sense of his fingers or arms. The mobile terminal 100 can include at least two haptic modules 154 according to the construction of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output when a touch input is applied to the touch screen.

The memory 160 can include at least a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to web storage performing the storing function of the memory on the Internet.

The interface unit 170 serves as a path to all external devices connected to the mobile terminal 100. The interface unit 170 receives power or data from the external devices and transmits the data or power to the internal components of the mobile terminal 100 or transmits data of the mobile terminal to the external devices.

The interface unit 170 can include a wired and/or wireless headset port, an external charger port, a wired and/or wireless data port, a memory card port, a port for connecting a device having a user identification module, an audio I/O port, a video I/O port, an earphone port, or other type of port.

A user identification module is a chip that stores information for authenticating the authority to use the mobile terminal 100 and can include a user identify module (UIM), a subscriber identify module (SIM) and a universal subscriber identify module (USIM). A device (hereinafter referred to as an identification device) including the identification module can be manufactured in the form of a smart card. Accordingly, the identification device can be connected to the mobile terminal 100 through a card slot included in the interface unit 170.

In the above, structure of a mobile terminal 100 according to the present invention has been described with reference to FIG. 1. In what follows, characteristics of a mobile terminal 100 according to the present invention which carries out a memo function will be described in more detail.

Figure 2:
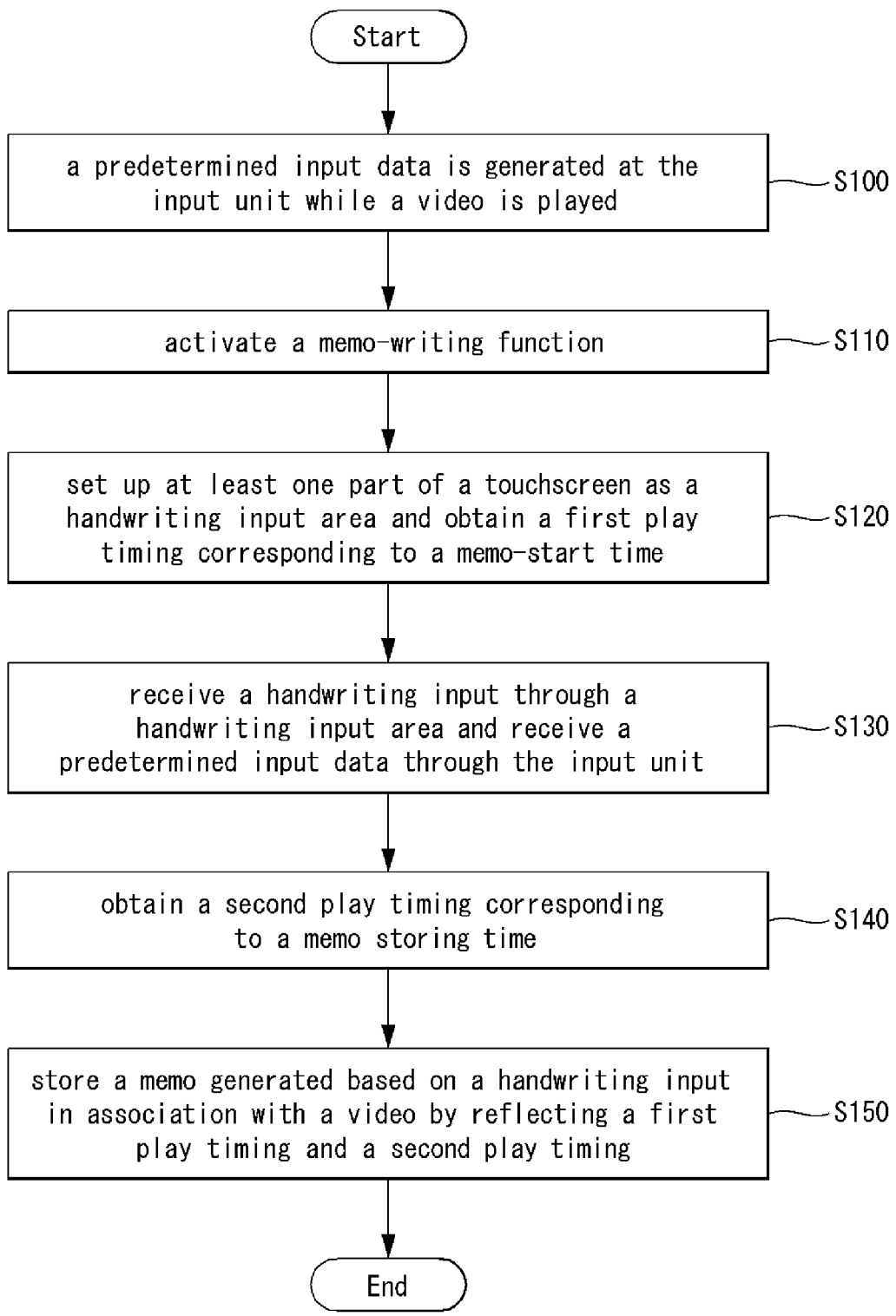
FIG. 2 is a flow diagram illustrating one example of a method for generating a memo in a mobile terminal according to the present invention.

FIG. 2 is a flow diagram illustrating one example of a method for generating a memo in a mobile terminal 100 according to the present invention. In what follows, the method for generating a memo will be described with reference to related drawings.

A predetermined input data is generated in the input unit 116 while the mobile terminal 100 plays a video S100. As described above, the predetermined input data may correspond to a hardware hotkey operation, a particular gesture of the user recognized through the camera 121, a particular command from the user received through the microphone 122 and so on.

If the input unit 116 generates the predetermined input data, the controller 180 activates a memo-writing function S110. After activation of the memo-writing function, the controller 180 assigns at least one part of the touch screen 151 as a handwriting input area and obtains a first play timing corresponding to a memo start time (i.e., a time point at which the memo-writing function is activated) S120. Then, the user can provide handwriting inputs to the handwriting input area by using a handwriting input means such as his or her finger or a stylus pen.

If a handwriting input is received through the handwriting input area, the controller 180 generates a memo based on the handwriting input and then receives a predetermined input data through the input unit 116, S130. The predetermined input data can be generated based on the user's operation configured to store the generated memo. Meanwhile, the memo based on the handwriting input may correspond to an image or character recognition result for the corresponding handwriting input. However, the scope of the present invention is not limited to the above description.

If the predetermined input data is received, the controller 180 activates a memo storing function and obtains a second play timing which corresponds to a memo storing time (i.e., a time point at which a predetermined input data is received) S140. Then, the controller 180 stores the memo generated based on the handwriting input in association with the video by reflecting the first and the second play timing S150.

It should be noted here that storing the generated memo in association with the video may indicate synchronization of memo-writing and memo-storing time of the generated memo with a play timing of the video. More specifically, the controller 180 can set up an insertion start timing of the memo with respect to the video as the first timing while setting up an insertion timing of the memo with respect to the video as the second play timing.

Meanwhile, the controller 180 can continuously display a procedure of playing the video on the touchscreen 151 even if the memo-writing function has been activated. However, the area for displaying the procedure of playing the video can occupy the entire touchscreen 151 or part of the touchscreen 151.

Different from the method for generating a memo file described with reference to FIG. 2, the controller 180 may activate the memo-writing function and the memo-storing function based on a predetermined pattern of touch input received through the touchscreen 151. Also, the controller 180 may activate the memo-writing function and the memo-storing function based on a touch on a soft key displayed on the touchscreen 151.

Figure 3:
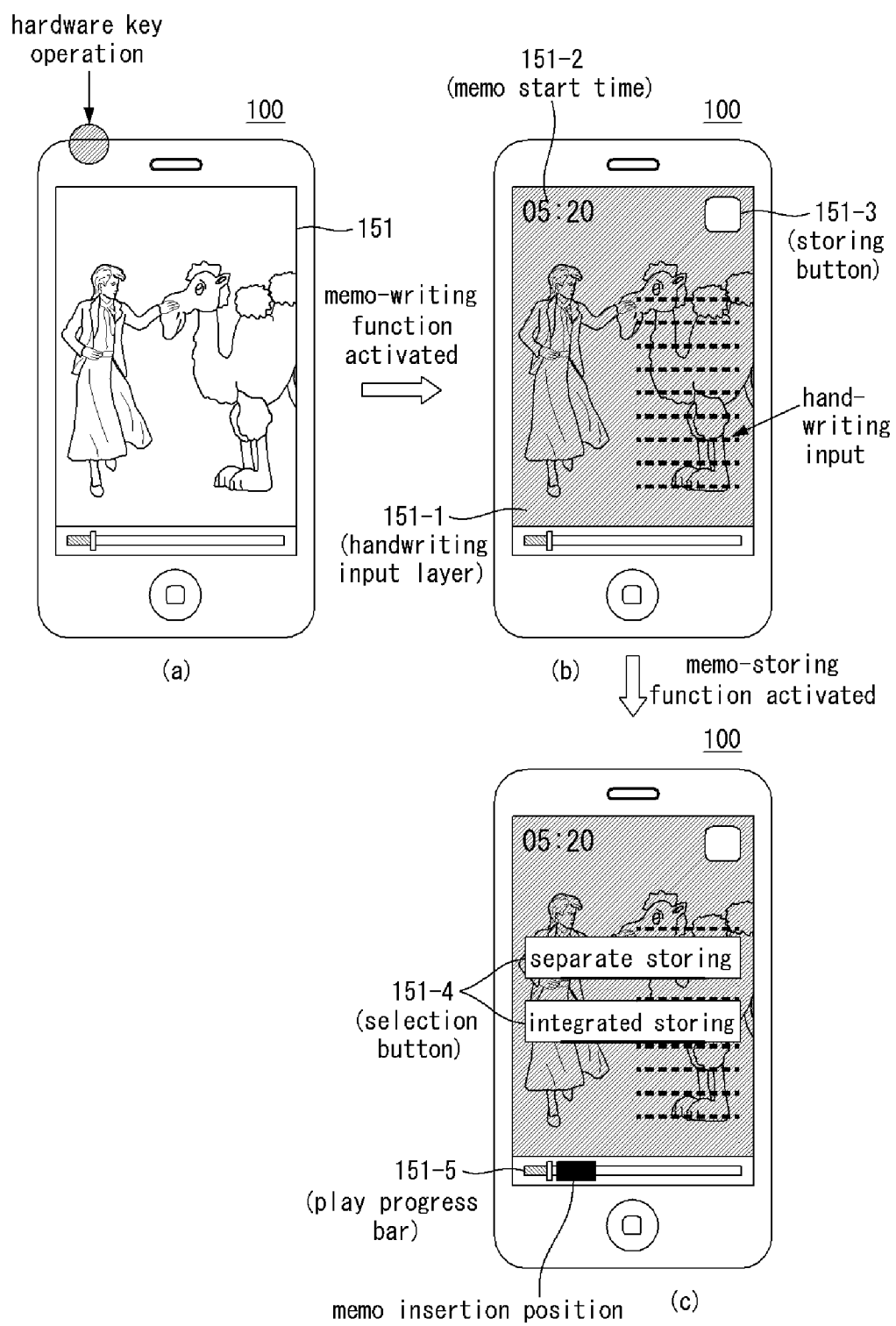
FIG. 3 illustrates one example of a procedure for carrying out the method for generating a memo shown in FIG. 2.

FIG. 3 illustrates one example of a procedure for carrying out the method for generating a memo shown in FIG. 2.

FIG. 3(a) illustrates a situation where the user operates a hardware key for a memo-writing function during video play. Then, as shown in FIG. 2, the controller 180 can set up the entire screen of the touchscreen 151 as a handwriting input area.

More specifically, the controller 180 generates a layer for handwriting input 151-1 on the screen of the touchscreen 151 and the user provides a handwriting input through the layer 151-1. Also, a storing button 151-3 for storing a memo input time 151-2 and a memo generated based on the handwriting input is displayed on the layer 151-1.

The user touches the storing button 151-3 while in the state of FIG. 3(*b*). Then, as shown in FIG. 3(*c*), the controller 180 provides a selection button 151-4 including an "integrated storing" button for storing the generated memo in synchronization with a play timing of the video and a "separate storing" button for storing the generated memo as a memo separately from the video. A procedure for allowing the user to select a method for storing the generated memo through the selection button 151-4 may be implemented as a selective procedure.

If the user touches the "integrated storing" button, the controller 180 stores the generated memo by reflecting a memo start time and a memo storing time. With reference to FIG. 3(*c*), the controller 180 can display a position of storing the generated memo on a progress bar 151-5 for the video play.

Although FIG. 3 illustrates a case where the layer 151-1 for handwriting input is generated on the entire screen of the touchscreen 151 when the handwriting function is activated, the layer for handwriting input may be generated only on one part of the touchscreen 151 in another embodiment of the present invention.

Figure 4:
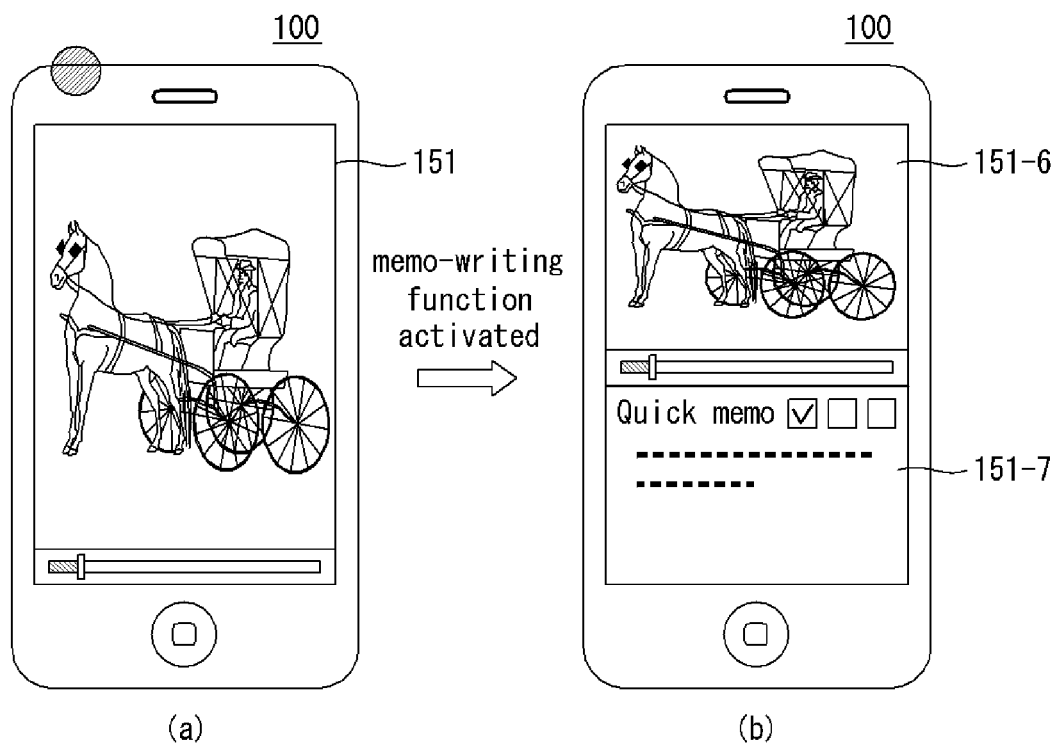
FIG. 4 illustrates one example of activating a memo-writing function according to the method for generating a memo shown in FIG. 2.

FIG. 4 illustrates one example of activating a memo-writing function according to the method for generating a memo shown in FIG. 2.

FIG. 4(*a*) illustrates a situation where the user operates a hardware key for activating a memo-writing function. Then the controller 180 can activate the memo-writing function and as shown in FIG. 4(*b*), set up the screen of the touchscreen 151 to be composed of a video play area 151-6 and a handwriting input area 151-7. Then the user is allowed to perform a memo-writing procedure through handwriting inputs while watching the video.

Figure 5:
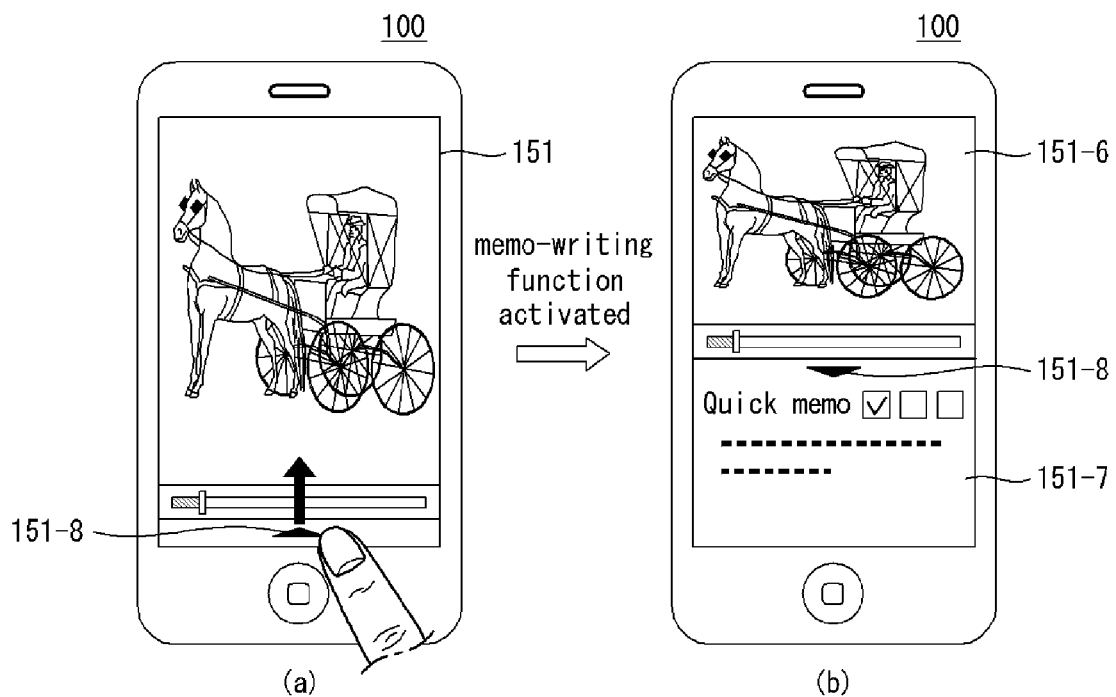
FIG. 5 illustrates another example of activating a memo-writing function according to the method for generating a memo shown in FIG. 2.

FIG. 5 illustrates another example of activating a memo-writing function according to the method for generating a memo shown in FIG. 2.

FIG. 5(*a*) illustrates a situation where the user drags a touch on a handler 151-8 displayed in the bottom end of the touchscreen 151 in an upward direction. Then the controller 180 can activate the memo-writing function and as shown in FIG. 5(*b*), set up the screen of the touchscreen 151 to be composed of a video play area 151-6 and a handwriting input area 151-7. Although not shown in the figure, if the user drags a touch on the handler 151-8 in a downward direction while in the state of FIG. 5(*b*), the controller can remove the handwriting input area 151-7 and set up the entire screen of the touchscreen 151 as the video play area 151-6.

Figure 6:
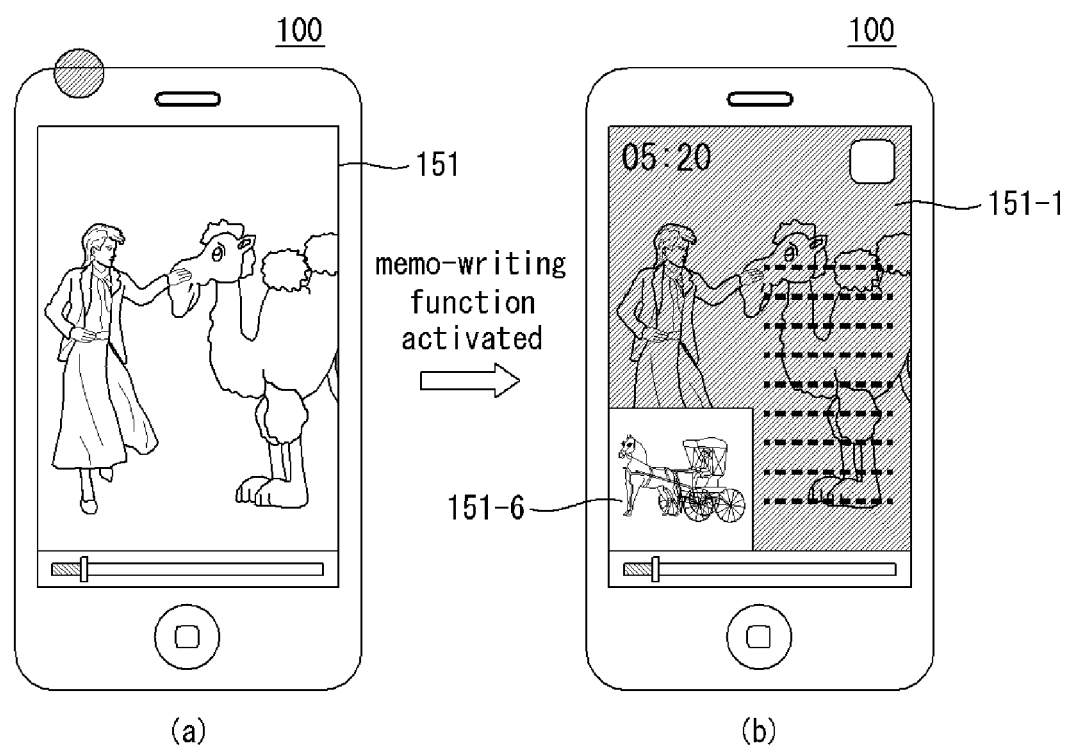
FIG. 6 illustrates yet another example of activating a memo-writing function according to the method for generating a memo shown in FIG. 2.

FIG. 6 illustrates yet another example of activating a memo-writing function according to the method for generating a memo shown in FIG. 2.

FIG. 6(*a*) illustrates a situation where the user operates a hardware key for activating a memo-writing function. Then the controller 180 can activate the memo-writing function and as shown in FIG. 6(*b*), generate a layer 151-1 for receiving handwriting inputs on the screen of the touch screen 151 and display a video play area 151-6 in one part of the touchscreen 151. Referring to the video play area 151-6, it can be noticed that the controller 180 still displays a video on the touchscreen 151 even when the memo-writing function is activated.

Also, referring to FIG. 6(*b*), it can be noticed that the controller 180 captures a video scene of the video at the time the memo-writing function is activated and displays the captured video scene as a background of the layer 151-1 corresponding to a handwriting input area.

As described with reference to FIG. 6(*b*), if the capture video scene is provided as a background of the layer 151-1, the user can write a memo while watching (referring to) the captured video scene. Meanwhile, the controller 180 can generate a memo by taking account of both the handwriting input and the captured video scene. For example, the controller 180 can generate a memo from an image file including an image inserted into the captured video scene through a handwriting input and store the memo.

However, the controller 180 can still generate a memo by using only handwriting inputs without incorporating the captured video scene even when the captured video scene is displayed as a background of the layer 151-1.

Also, even if a scene of the video is captured, the controller 180 may not display the captured video scene as a background of the layer 151-1. However, at this time, too, the controller 180 can take both the captured video scene and the handwriting input into consideration at the time of generating a memo.

Figure 7:
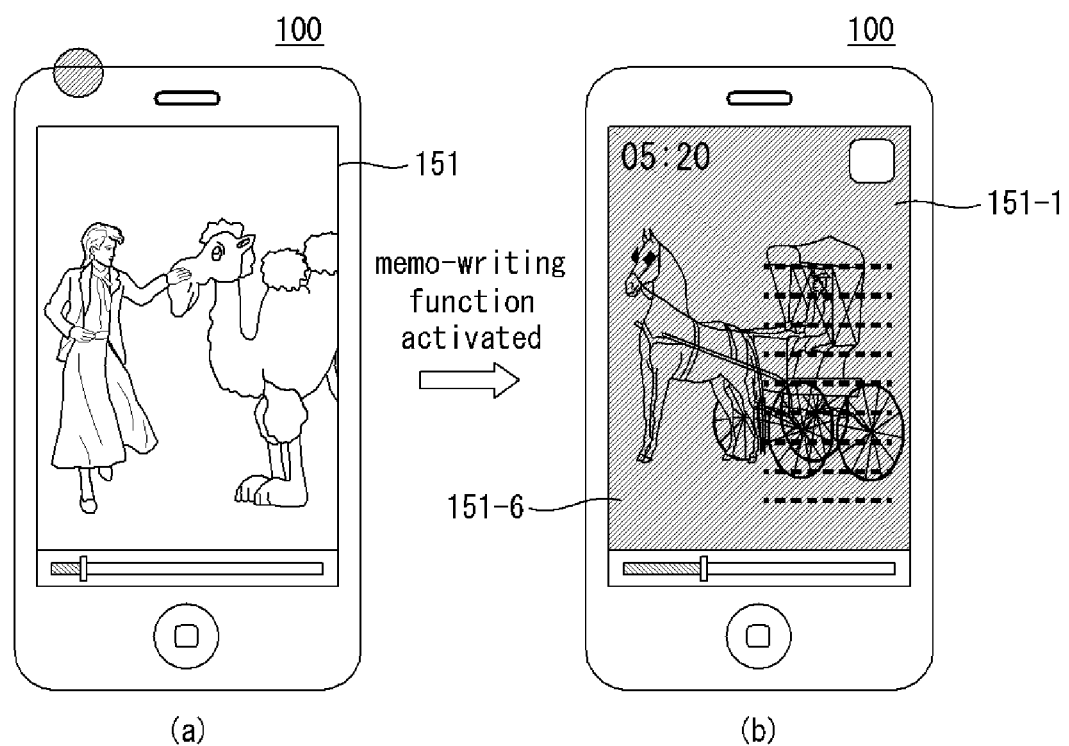
FIG. 7 illustrates still another example of activating a memo-writing function according to the method for generating a memo shown in FIG. 2.

FIG. 7 illustrates still another example of activating a memo-writing function according to the method for generating a memo shown in FIG. 2.

FIG. 7(*a*) illustrates a situation where the user operates a hardware key for activating a memo-writing function. Then the controller 180 can activate the memo-writing function and as shown in FIG. 7(*b*), generate a layer 151-1 for receiving handwriting inputs across the entire touchscreen 151. However, the controller 180 still displays a video in a video play area on a layer which lies beneath the layer 151-1.

At this time, too, the controller 180 can capture a video scene corresponding to the time point of activating the memo-writing function and take both the video scene captured at the time of generating the memo and a handwriting input into consideration.

In the above, described was storing a memo generated based on a handwriting input into a memo corresponding to a video by taking account of both a first play timing which is a memo-writing start time and a second play timing which is a memo-storing time.

Different from the above, the controller 180 can insert the generated memo into the video by considering only the first play timing. For example, the controller 180 of the mobile terminal 100 can store a character memo generated based on the handwriting input as a memo corresponding to the first play timing. Also, the controller 180 can insert the generated memo as a memo corresponding to the video by considering the second play timing only. For example, the controller 180 can store a character memo generated based on the handwriting input as characters corresponding to the second play timing.

In other words, a mobile terminal 100 according to the present invention can store the generated memo in association with the video by reflecting at least one of the first and the second play timing. This applies the same for various methods for generating a memo carried out by the present invention, which will be described later.

In addition, different from the above description, a mobile terminal 100 according to the present invention may provide a virtual keyboard through the touchscreen 151 when a memo-writing function is activated instead of generating a layer 151-1 for receiving a handwriting input on the touchscreen 151 or displaying a separate handwriting input area 151-7 on the touchscreen 151. At this time, the touchscreen 151 may provide an area for displaying characters received through the virtual keyboard, too.

Figure 8:
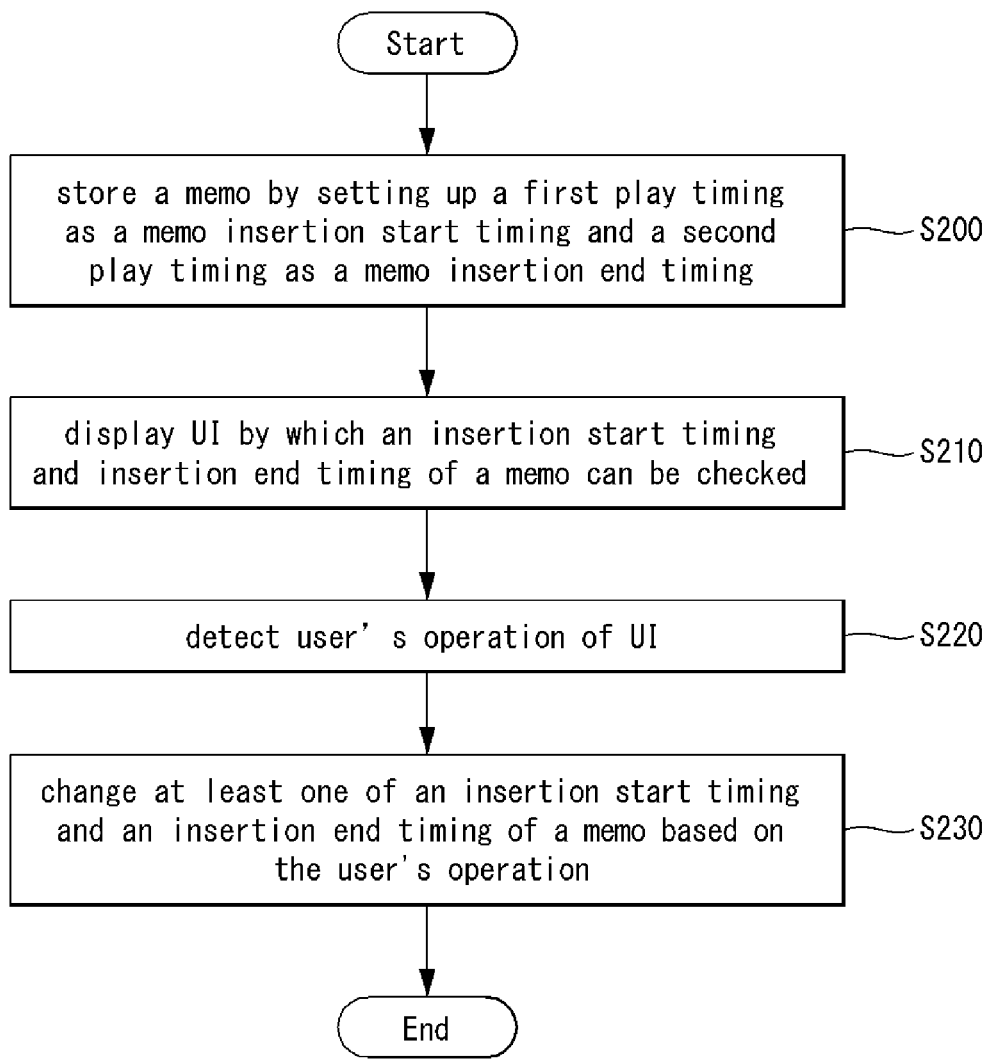
FIG. 8 is a flow diagram illustrating another example of a method for editing a memo in a mobile terminal according to the present invention.

FIG. 8 is a flow diagram illustrating another example of a method for editing a memo in a mobile terminal 100 according to the present invention. In what follows, the method for editing a memo will be described with reference to related drawings.

If a touch is detected at a storing button 151-3 for storing a memo, the controller 180 sets up a first play timing at which a memo input is started as a start timing for inserting a memo into a video and sets up a second play timing at which the storing button 151-3 is touched as an end timing for inserting a memo into the video and thus stores a memo generated based on a handwriting input S200.

Next, the controller 180 displays a user interface by which the user can check an insertion start and insertion end timing of the memo on the touchscreen 151, S210. Here, the controller 180 can display the user interface in association with a progress bar of the video. In other words, the controller 180 can display a writing start time and a storing time of the memo on the progress bar of the video.

Next, if the user's operation on the user interface is detected S220, the controller 180, based on the user's operation on the user interface, changes at least one of an insertion start timing and an insertion end timing of the memo for the video S230.

Figure 9:
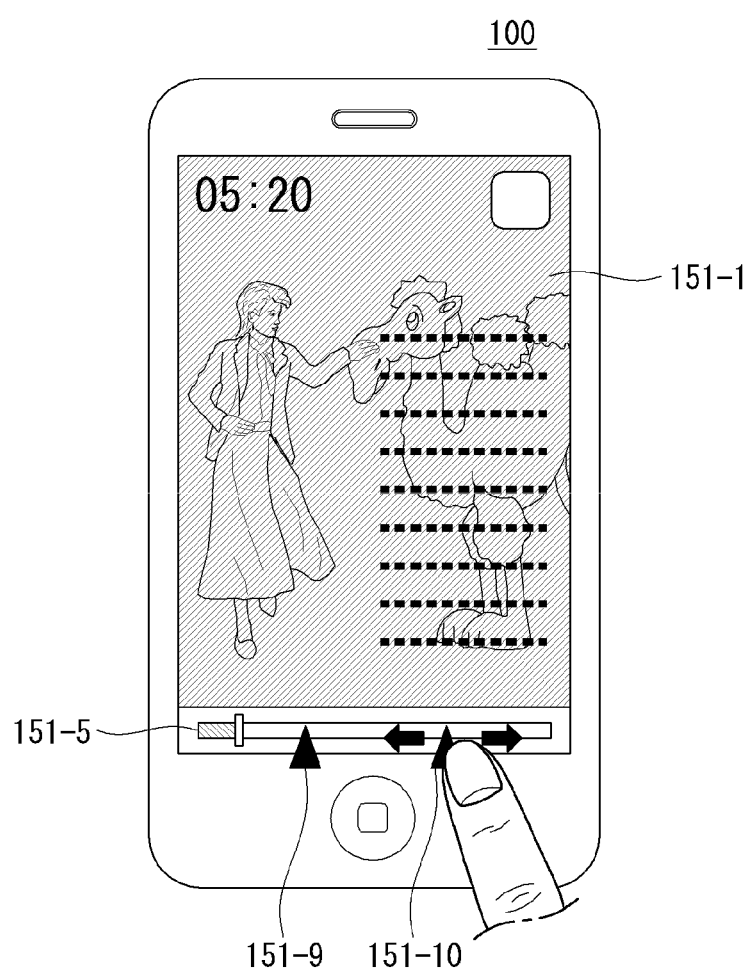
FIG. 9 illustrates one example of a method for changing an insertion end timing of a memo according to the method for editing a memo shown in FIG. 8.

FIG. 9 illustrates one example of a method for changing an insertion end timing of a memo according to the method for editing a memo shown in FIG. 8.

With reference to FIG. 9, if a memo file is generated, the controller 180 displays a first indicator 151-indicating a first play timing corresponding to a memo-writing start time on a play progress bar of a video and a second indicator 151-10 indicating a second play timing corresponding to a memo storing time on the progress base 151-5 of the video.

As shown in FIG. 9, the user drags a touch on the second indicator 151-10 in the left or right direction. Then the controller 180 can change a memo-insertion end timing for the video into a left or right-side timing. If the user moves a touch on the first indicator 151-9 toward the left or right-side, the controller 180 can change a memo-inserting start timing for the video toward the left or right-side accordingly.

Also, the controller 180 can change both of the memo-insertion start timing and insertion end timing for the video based on movement of a touch on both of the first 151-9 and the second indicator 151-10. Meanwhile, the direction along which the memo insertion start timing is changed and that along which the memo insertion end timing is changed can be different from each other.

Figure 10:
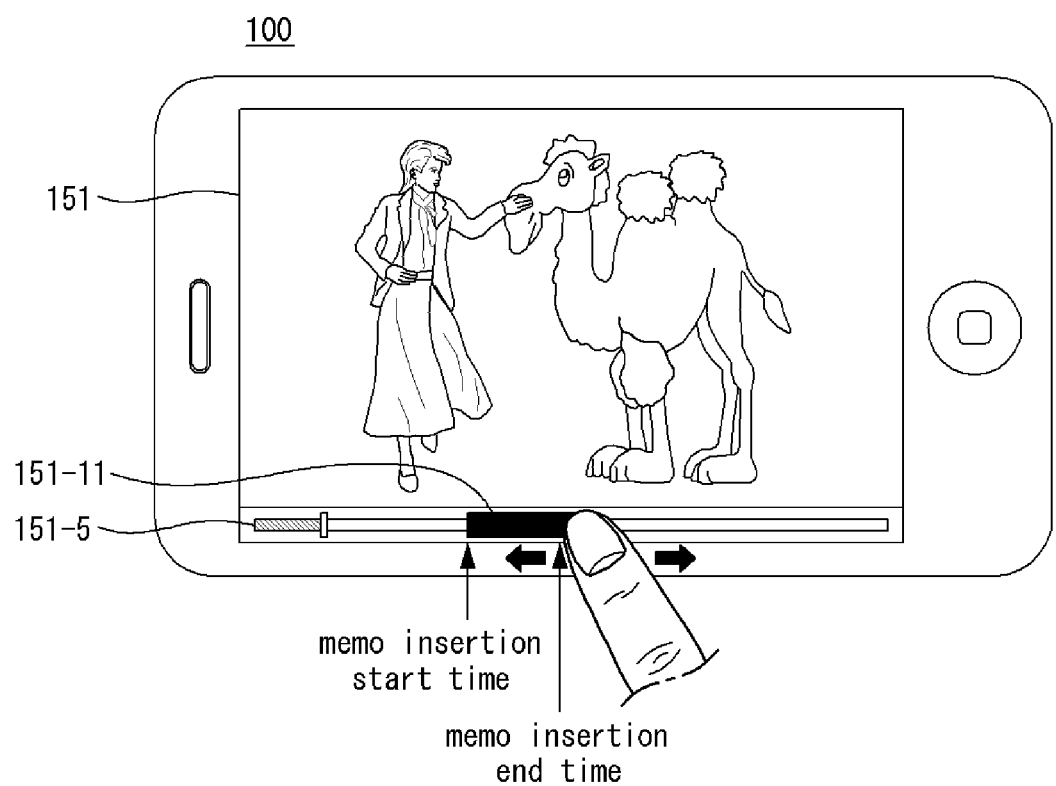
FIG. 10 illustrates another example of a method for changing an insertion end timing of a memo according to the method for editing a memo shown in FIG. 8.

FIG. 10 illustrates another example of a method for changing an insertion end timing of a memo according to the method for editing a memo shown in FIG. 8.

With reference to FIG. 10, it can be noticed that a bar-shaped user interface indicating that a memo has been inserted to a video can be displayed in association with the progress bar 151-5. As shown in FIG. 10, the user can change a memo insertion end timing by dragging a touch in the left or right direction on an area corresponding to the memo insertion end timing through the bar-shaped user interface.

Also, the user can change the memo insertion start timing by dragging a touch in the left or right direction on an area corresponding to a memo-insertion start timing through the bar-shaped user interface. Also, the user can change both the memo insertion start and end timing by simultaneously moving touches on the respective areas corresponding to the memo insertion start timing and the memo insertion end timing through the bar-shaped user interface.

Figure 11:
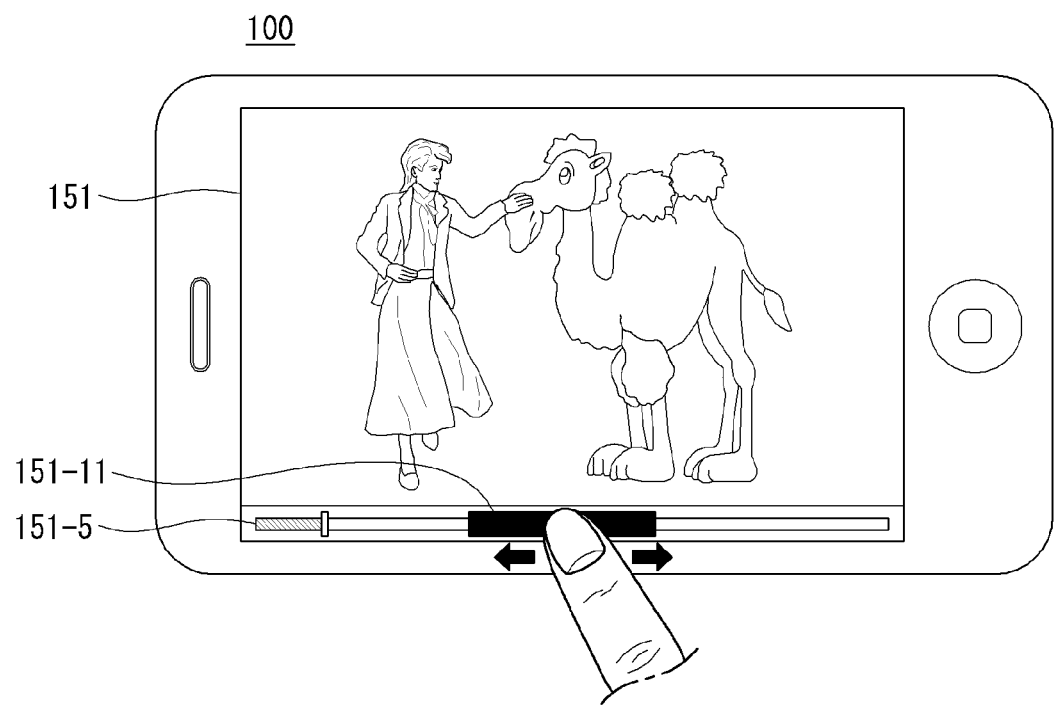
FIG. 11 illustrates a method for changing an insertion position itself of a memo according to the method for editing a memo shown in FIG. 8.

FIG. 11 illustrates a method for changing an insertion position itself of a memo according to the method for editing a memo shown in FIG. 8.

FIG. 11 indicates that the user can move the memo-insertion start timing and the memo-insertion end timing toward left or right-side in the same direction by the same amount of time interval by dragging a touch on a central area of a bar-shaped user interface in the left or right direction.

Figure 12:
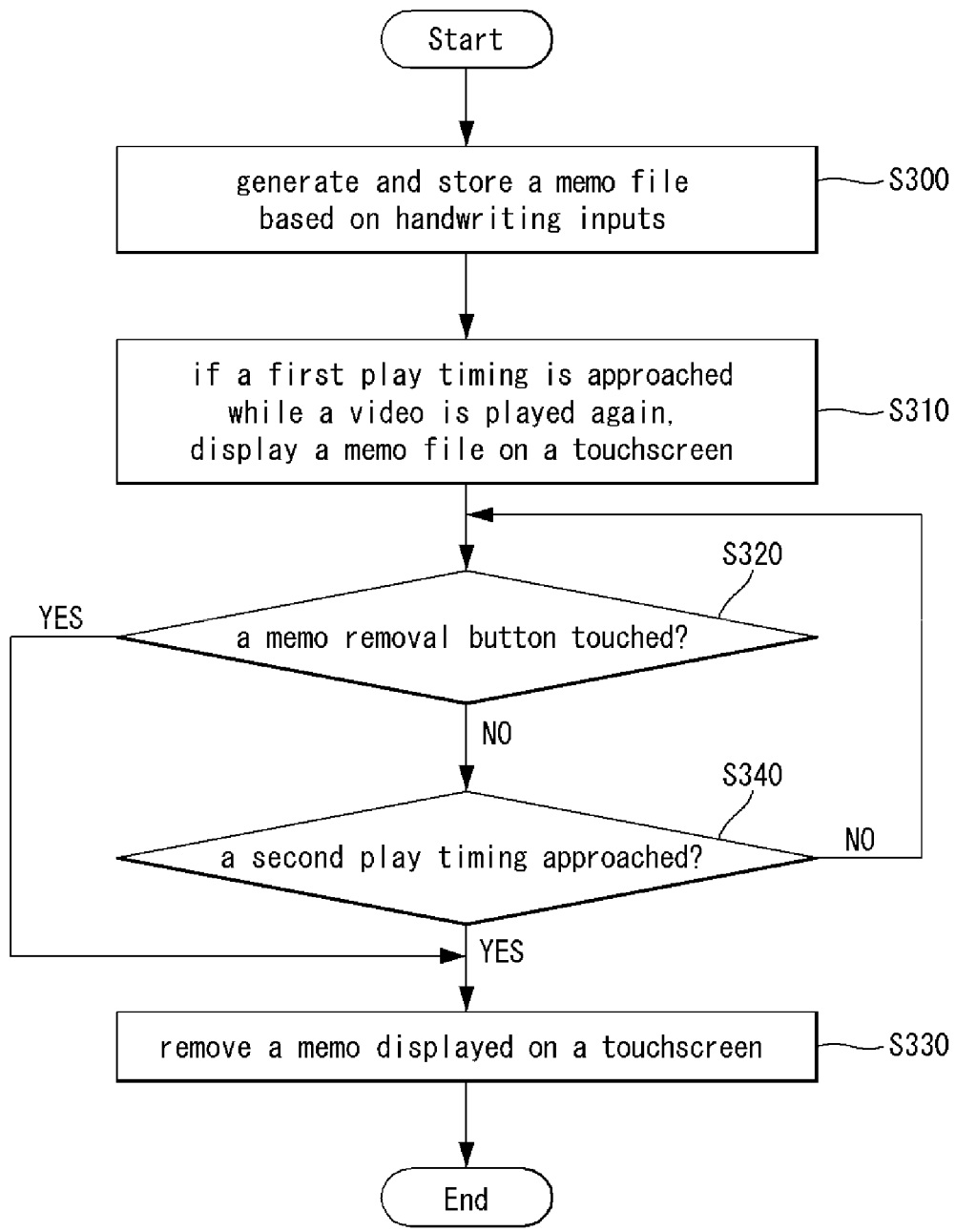
FIG. 12 is a flow diagram illustrating one example of a method for displaying a memo in a mobile terminal according to the present invention.

FIG. 12 is a flow diagram illustrating one example of a method for displaying a memo in a mobile terminal according to the present invention. In the following, the method for displaying a memo will be described with reference to related drawings.

According to the method for generating a memo described above, a memo file based on handwriting inputs is generated and stored during video play S300. Next, if it approaches a first play timing while the video is played again, the controller 180 displays the stored memo in the touchscreen 151, S310.

Here, the first play timing refers to a time point at which writing of the stored memo has begun and corresponds to a timing configured to be a memo-insertion start time at the time of storing a memo. Meanwhile, a memo removal button for removing a memo displayed on the touchscreen 151 is displayed on the touchscreen 151.

After the memo is displayed on the touchscreen 151, the controller 180 checks whether the memo removal button has been touched S320. If the memo removal button is touched, the controller 180 removes a memo file displayed on the touchscreen 151, S330.

If a touch for the memo removal button is not received, the controller 180 checks whether the video approaches a second play timing S340. If it approaches the second play timing, the controller 180 removes a memo displayed on the touchscreen 151, S330. However, if the second play timing is not approached, the controller 180 performs the S320 step again.

Figure 13:
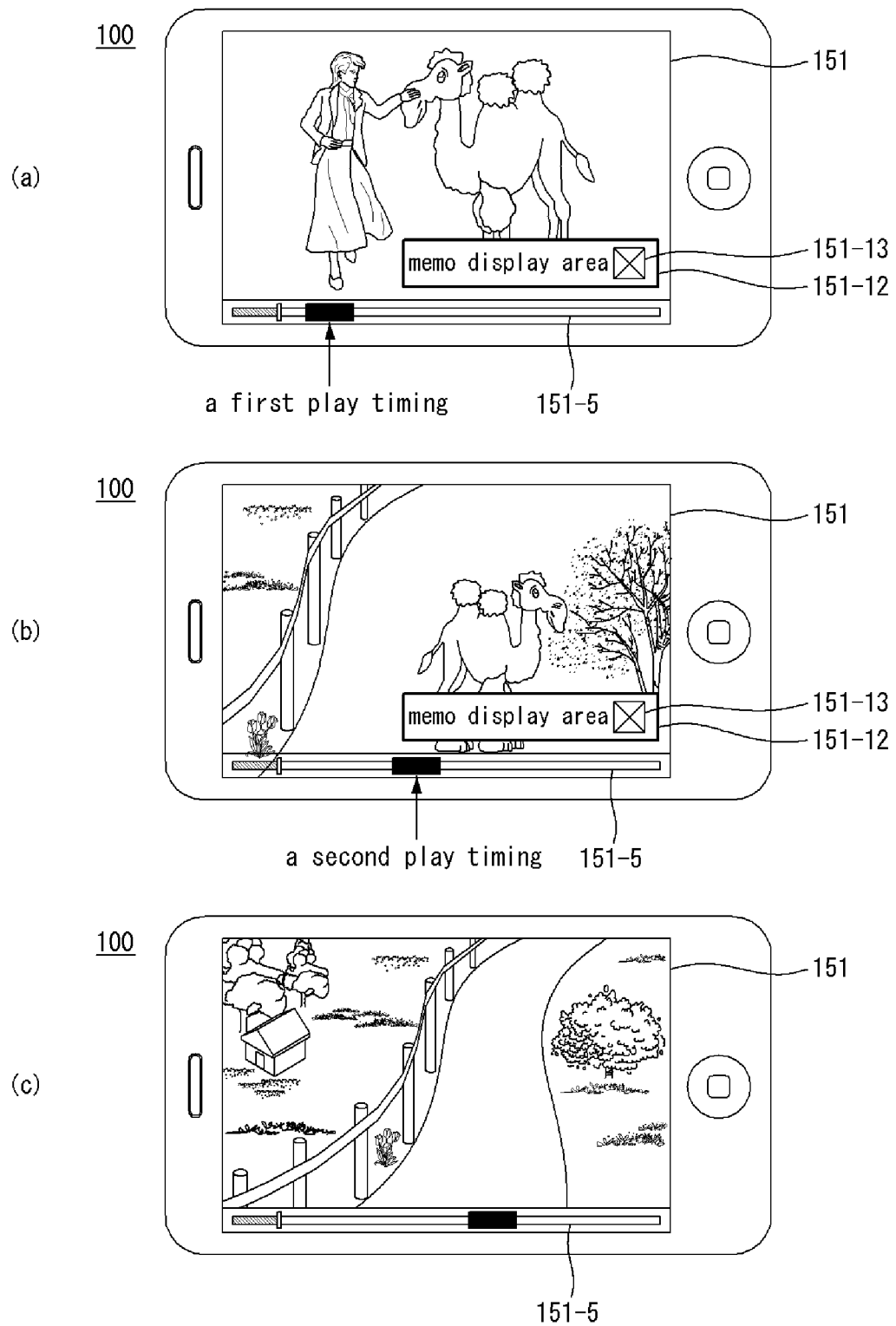
FIG. 13 illustrates a procedure of displaying a memo stored in a mobile terminal of the present invention according to the method for displaying a memo shown in FIG. 12.

FIG. 13 illustrates a procedure of displaying a memo stored in a mobile terminal 100 of the present invention according to the method for displaying a memo shown in FIG. 12.

With reference to FIG. 13(*a*), if a first play timing is approached in the middle of playing the video again while a memo is stored in synchronization with a video play timing, the controller 180 provides a memo display area 151-12 in which a memo stored in the touchscreen 151 is displayed. Also, it can be noticed that the memo display area 151-12 includes a button 151-13 for removing the memo display area 151-12 from the touchscreen 151.

With reference to FIGS. 13(*b*) and (*c*), it can be noticed that if a second play timing is approached while the video is played, the controller 180 removes the memo display area 151-12 from the touchscreen. Meanwhile, when the button 151-13 is touched, the controller 180 can remove the memo display area 151-12 from the touchscreen 151 even before the second play timing is approached.

Figure 14:
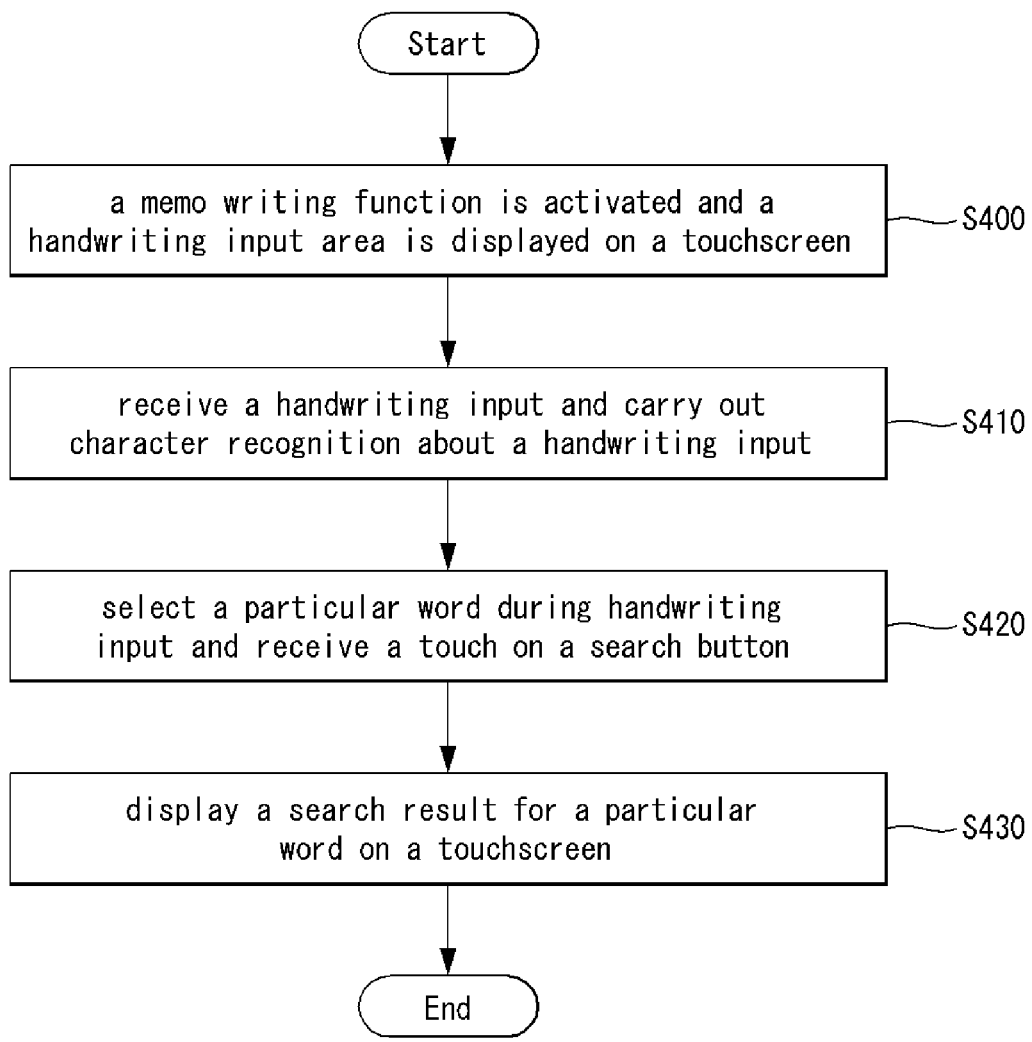
FIG. 14 is a flow diagram illustrating another example of a method for generating a memo in a mobile terminal according to the present invention.

FIG. 14 is a flow diagram illustrating another example of a method for generating a memo in a mobile terminal 100 according to the present invention.

A memo-writing function is activated and a handwriting input area is displayed on the touchscreen 151, S400. Next, if a handwriting input is received through the handwriting input area, the controller 180 performs character recognition against the handwriting input S420.

Next, a touch input for selecting a particular word among the handwriting inputs and a touch input for a search button for searching for the selected word are received S420. Then the controller 180, based on a character recognition result for the particular word, performs a search for the particular word and displays a search result for the particular word on the touchscreen 151, S430.

Meanwhile, the search for a particular word may be carried out internally within a mobile terminal 100 according to the present invention or through the Internet. Also, the search for a particular word may be carried out for other electronic devices connected to the mobile terminal 100 wired or wirelessly. However, a search scope for a particular word according to the present invention is not limited to the examples described above.

Figure 15:
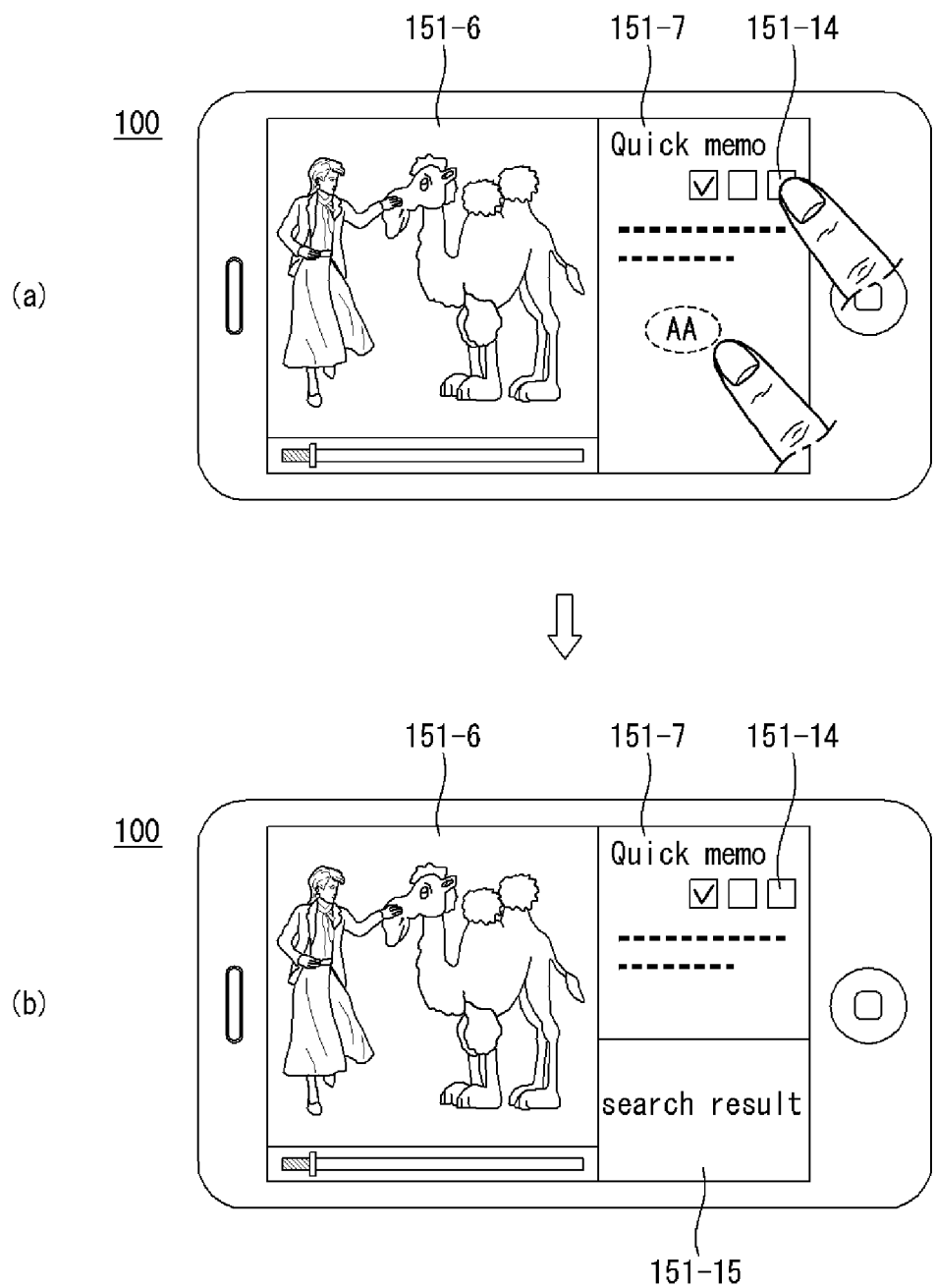
FIG. 15 illustrates a procedure of carrying out a search of a handwritten word in a mobile terminal of the present invention according to the method for generating a memo shown in FIG. 14.

FIG. 15 illustrates a procedure of carrying out a search of a handwritten word in a mobile terminal of the present invention according to the method for generating a memo shown in FIG. 14.

FIG. 15(a) illustrates a situation where a memo-writing function is activated; the user touches a particular word of "AA" among handwriting inputs written in a handwriting input area 151-7; the "AA" is selected; and the user touches a search button 151-14. Then the controller 180, as shown in FIG. 15(b), performs a search for the "AA" and displays the search result on a search result display area 151-15.

Figure 16:
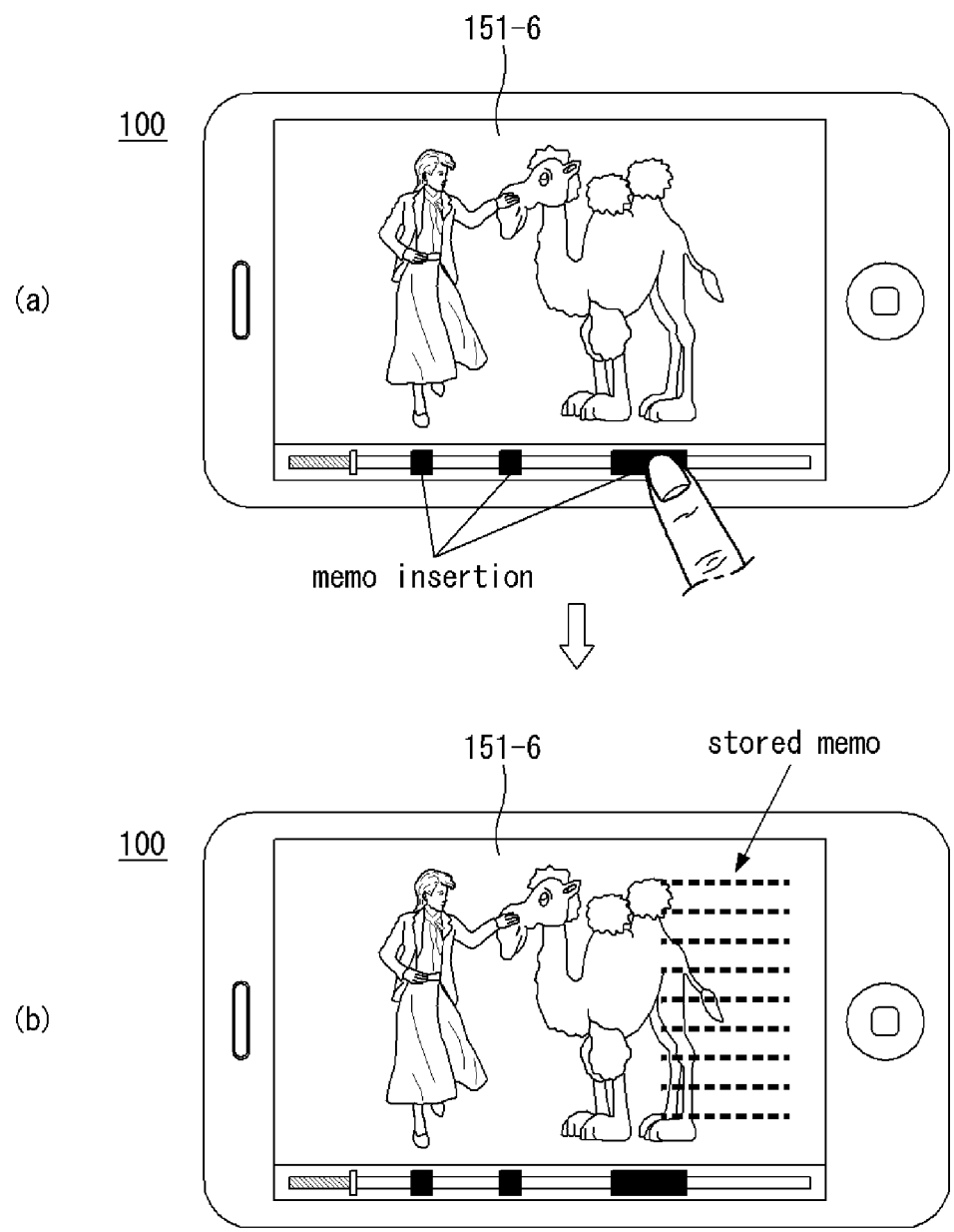
FIG. 16 illustrates one example of a procedure of displaying a memo stored in association with a video in a mobile terminal according to the present invention.

FIG. 16 illustrates one example of a procedure of displaying a memo stored in association with a video in a mobile terminal 100 according to the present invention.

FIG. 16(a) illustrates a situation where a video is played again while a plurality of memos associated with the video has been already stored. With reference to FIG. 16(a), it can be noticed that three memos have been stored being inserted into a particular play timing area in association with the video.

While in the state of FIG. 16(a), the user touches a particular memo insertion mark displayed in association with a video play progress bar. Then the controller 180, as shown in FIG. 16(b), can display a pre-stored memo corresponding to the touched particular memo insertion mark on the touchscreen 151.

Figure 17:
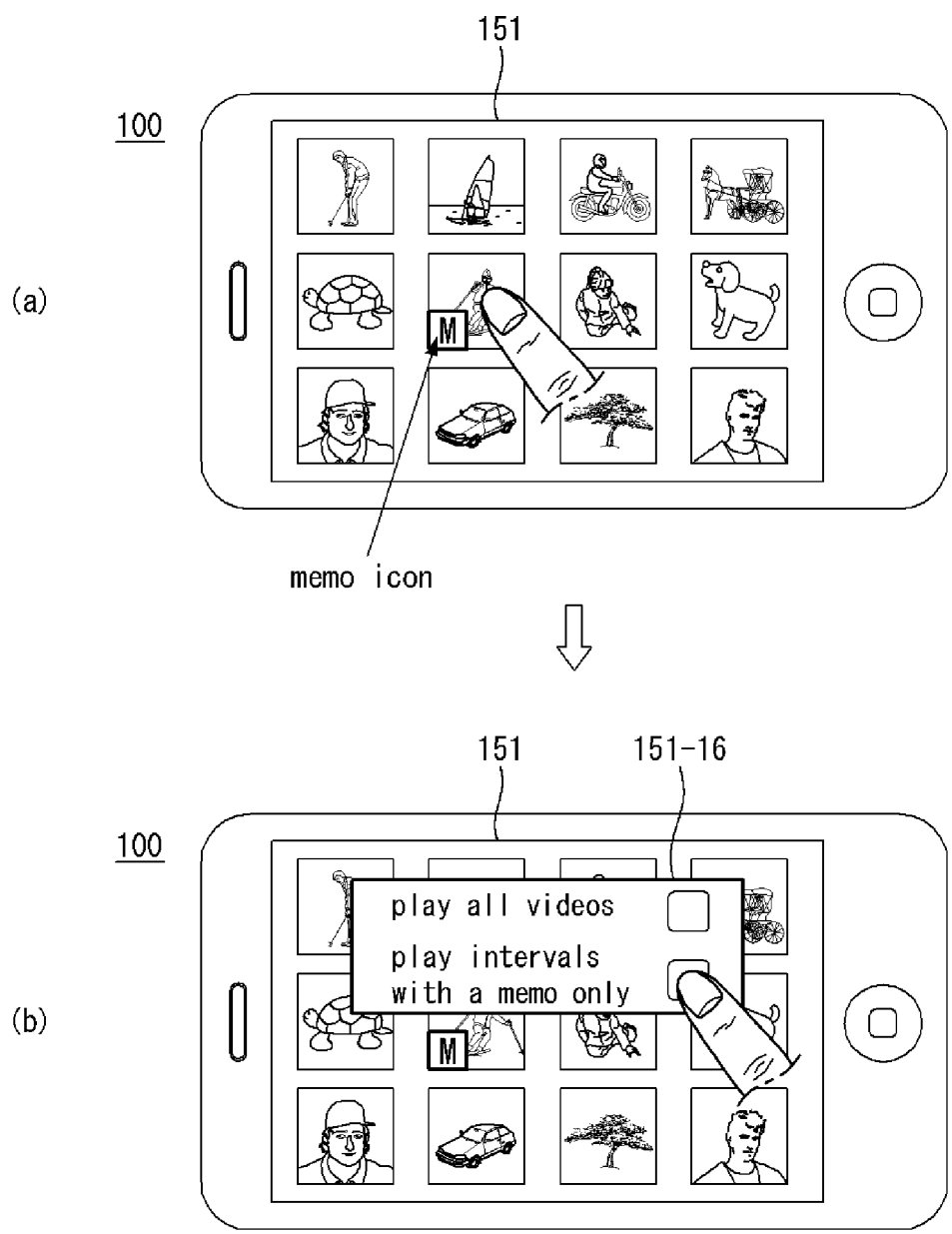
FIG. 17 illustrates one example of a procedure of playing a video including a memo stored in synchronization with the video in a mobile terminal according to the present invention.

FIG. 17 illustrates one example of a procedure of playing a video including a memo stored in synchronization with the video in a mobile terminal 100 according to the present invention.

FIG. 17(a) illustrates a situation where memo icons are additionally displayed on the icons of videos among a plurality of videos stored in the mobile terminal 100, where memos corresponding to the videos are stored in association therewith. While in the state of FIG. 17(a), the user selects an icon of a video including a memo icon. Then the controller 180, as shown in FIG. 17(b), can display on the touchscreen 151 a user interface 151-16 capable of determining whether to play the whole of the selected video or only the video part in association with a memo.

Figure 18:
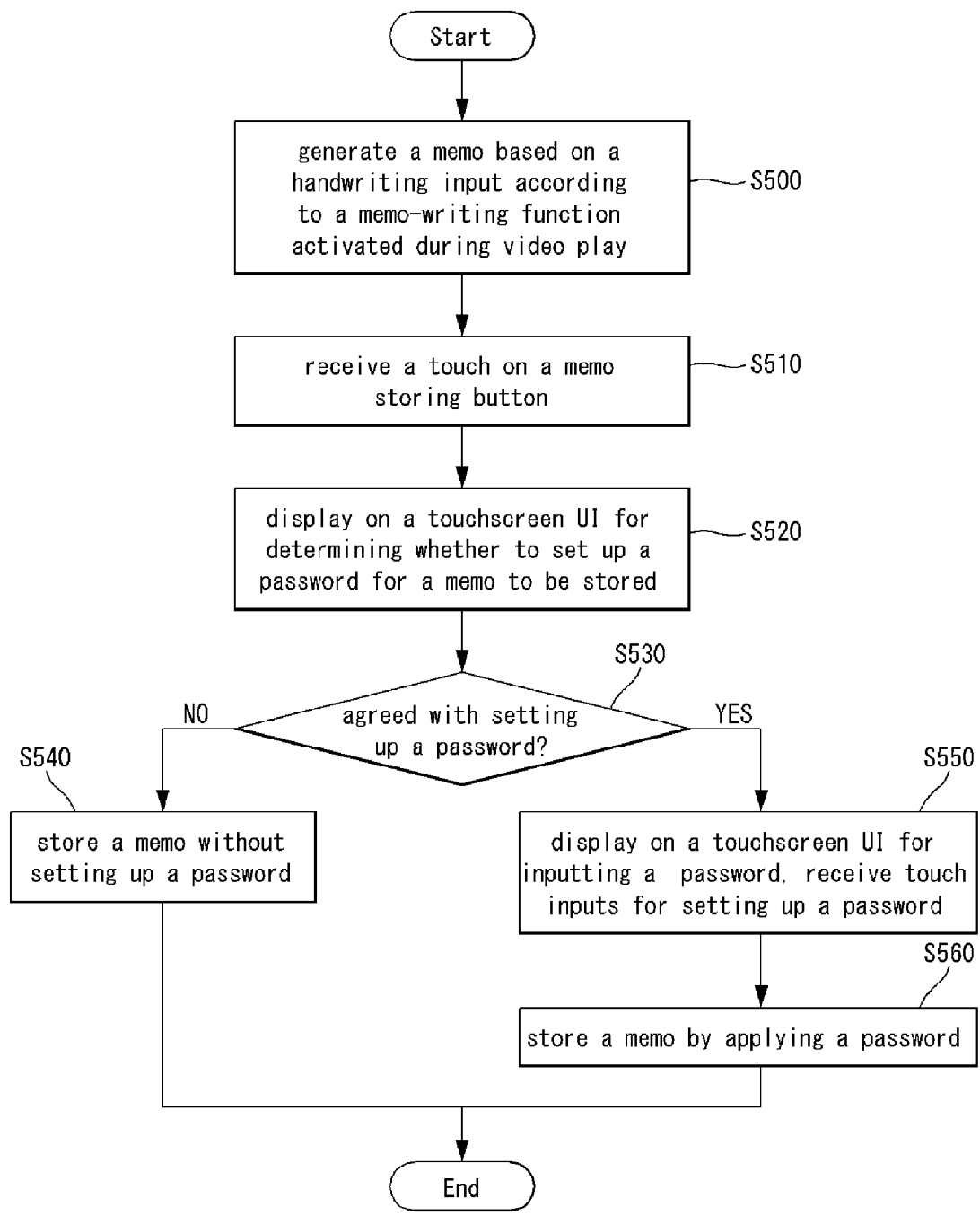
FIG. 18 illustrates yet another method for generating a memo in a mobile terminal according to the present invention.

FIG. 18 illustrates yet another method for generating a memo in a mobile terminal according to the present invention. In what follows, the method for generating a memo will be described with reference to related drawings.

A memo is generated based on a handwriting input according to a memo-writing function activated during video play S500. Next, a touch for a memo storing button is received S510. Then, at the time of storing the generated memo, the controller 180 displays a user interface for determining whether to set up a password for the memo to be stored S520.

Afterwards, the controller 180 checks whether the user agrees with setting up a password through the user interface S530. If the user does not agree with the set-up, the controller 180 stores the memo without setting up a password S540. In this case, it is no necessary to provide a password for displaying the stored memo again on the touchscreen 151.

However, if the user agrees with setting up a password, the controller 180 displays a user interface for the user to input a password on the touchscreen 151 and receives touch inputs for setting up a password S550. Then the controller 180 applies a password to and stores the memo S560. In this case, an authentication process based on entering a password is required for display the stored memo again on the touchscreen 151.

By using the method for generating a memo shown in FIG. 18, the user can enjoy the benefit of protecting privacy and keeping secrets.

Figure 19:
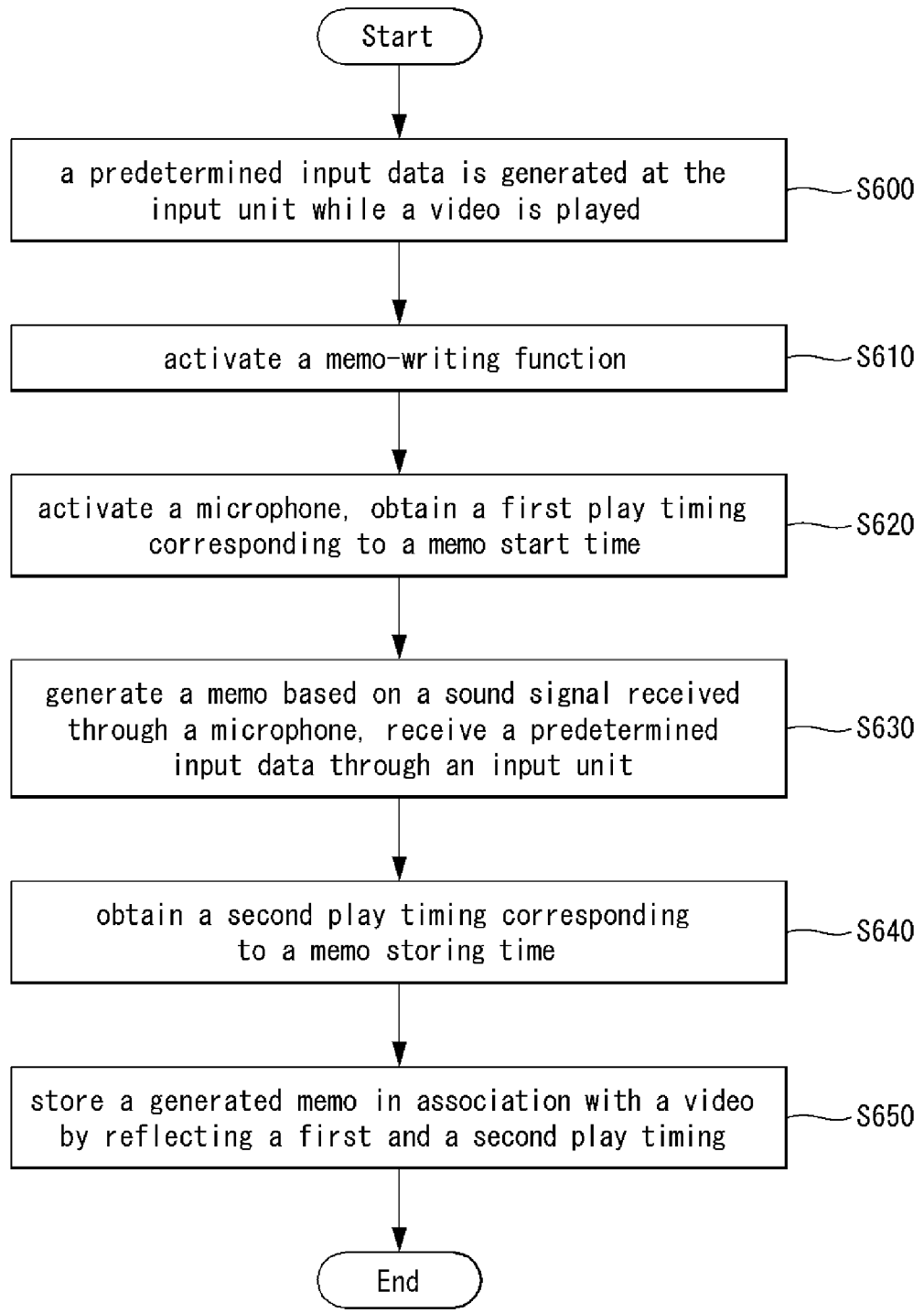
FIG. 19 is a flow diagram illustrating still another method for generating a memo in a mobile terminal according to the present invention.

FIG. 19 is a flow diagram illustrating still another method for generating a memo in a mobile terminal 100 according to the present invention. In what follows, the method for generating a memo will be described with reference to related drawings.

While a video is played in the mobile terminal 100, a predetermined input data is generated from an input unit 116, S600. If the predetermined input data is generated from the input unit 116, the controller 180 activates a memo-writing function S610. If the memo-writing function is activated, the controller 180 activates an microphone 122 and obtains a first play timing corresponding to a memo start time (i.e., a time point at which the memo-writing function is activated).

Then the controller 180 generates a memo based on a sound signal received through the microphone 122 and after the memo is generated, a predetermined input data is received through the input unit 116, S630. Here, the predetermined input data can be generated based on the user's operation configured to store the generated memo.

If the predetermined input data is received, the controller 180 activates a memo storing function and obtains a second play timing corresponding to a memo-storing time (i.e., a time point at which a predetermined input data is received) S640. Next, the controller 180 stores the generated memo in association with the video by reflecting the first and the second play timing S650.

Figure 20:
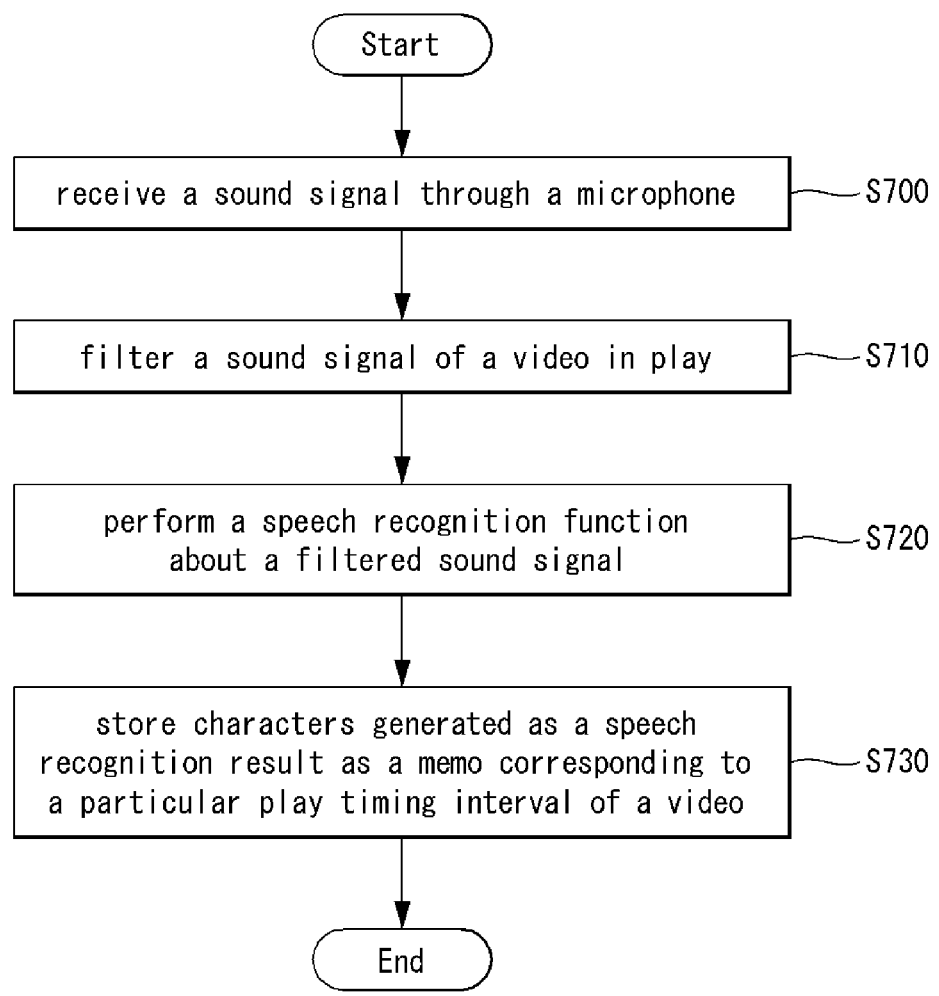
FIG. 20 is a flow diagram illustrating one example of the method for generating a memo shown in FIG. 19.

FIG. 20 is a flow diagram illustrating one example of the method for generating a memo shown in FIG. 19. In what follows, the method for generating a memo will be described with reference to related drawings.

A sound signal is received through the microphone 122, S700. Then the controller 180 filters a sound signal of a currently played video from the received sound signal S710 and performs a speech-to-text function against the filtered sound signal S720. Next, the controller 180 stores characters generated from applying the speech-to-text function as a memo corresponding to a particular play timing interval of the video S730.

Different from FIG. 20, the controller 180 can also record the filtered sound signal and stored the recorded sound signal as a memo corresponding to the particular play timing interval.

Figure 21:
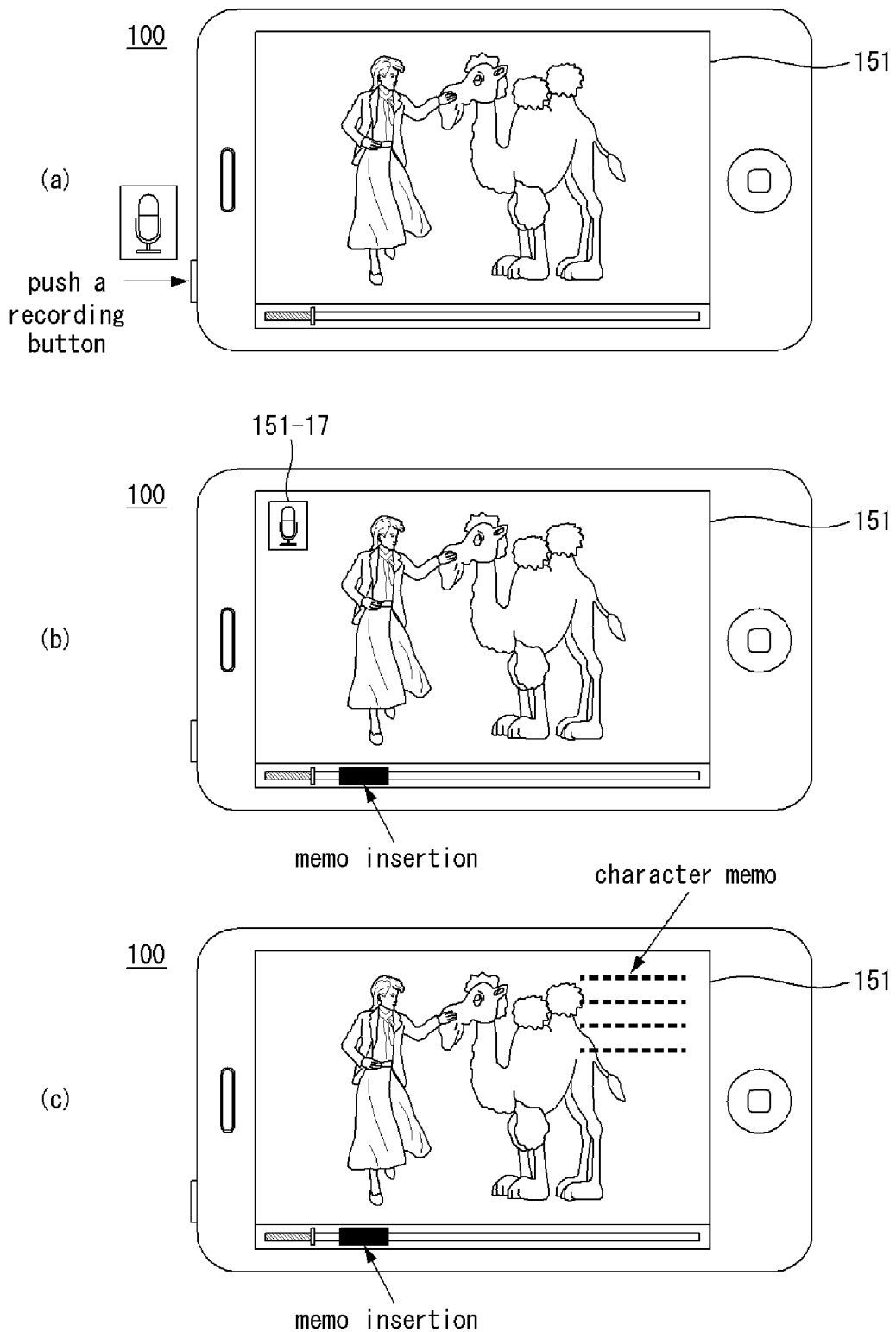
FIG. 21 illustrates a procedure of carrying out the method for generating a memo shown in FIG. 19 and a result obtained by carrying out the procedure.

FIG. 21 illustrates a procedure of carrying out the method for generating a memo shown in FIG. 19 and a result obtained by carrying out the procedure.

FIG. 21(a) illustrates a situation where the user activates a memo-writing function by turning on the microphone by pushing a recording button during video play. FIG. 21(b) illustrates a situation which indicates that a voice memo generated based on a sound signal received through the microphone is stored corresponding to a particular play timing interval of the video. The microphone-shaped icon 151-17 shown in FIG. 21(b) may correspond to an icon indicating that a voice memo stored in association with the video is being output. FIG. 21(c) illustrates a situation where a memo stored based on a sound signal received through the microphone is displayed on the touchscreen 151 when a particular play timing is approached.

Figure 22:
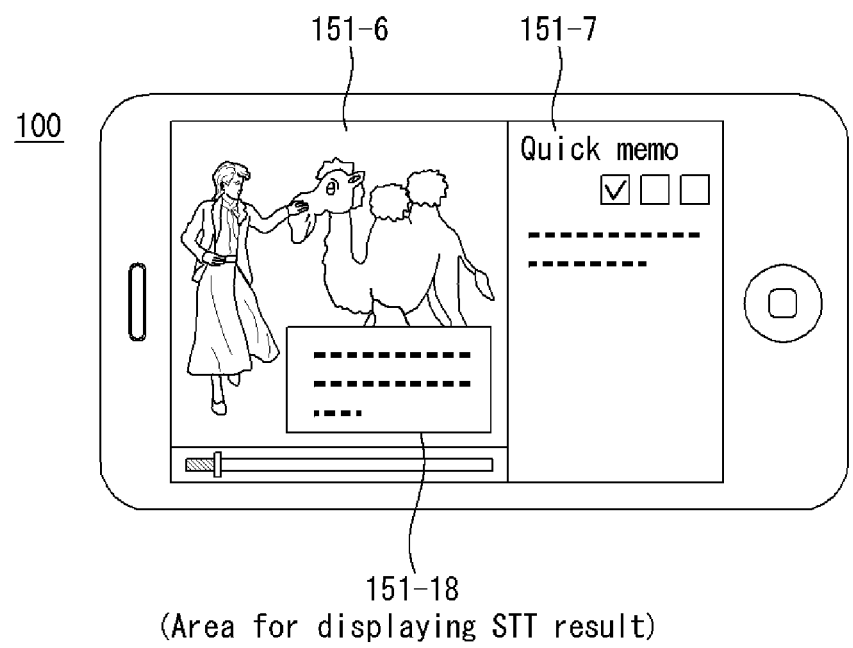
FIG. 22 illustrates a further method of a method for generating a memo in a mobile terminal according to the present invention.

FIG. 22 illustrates a further method of a method for generating a memo in a mobile terminal 100 according to the present invention.

With reference to FIG. 22, the touchscreen 151 displays a handwriting input area 151-7 and an area 151-18 in which a voice recognition result is displayed at the same time. Characters displayed in the area 151-18 may correspond to a character memo representing a character recognition result against a speech signal corresponding to the video. Then the user can carry out memo-writing through a handwriting input while viewing character data related to the video.

Also, the characters displayed on the area 151-18 may be a character data representing a character recognition result for a speech signal corresponding to the video. Then the user can write a memo through handwriting inputs while viewing the character data for the video.

Different from FIG. 22, the mobile terminal 100 can display a character memo generated from speech recognition on the handwriting input area. The user can input an additional handwriting input through the handwriting input area while the character memo is being displayed. Then the controller 180 can generate a memo based on the character memo and the handwriting input and store the generated memo.

Figure 23:
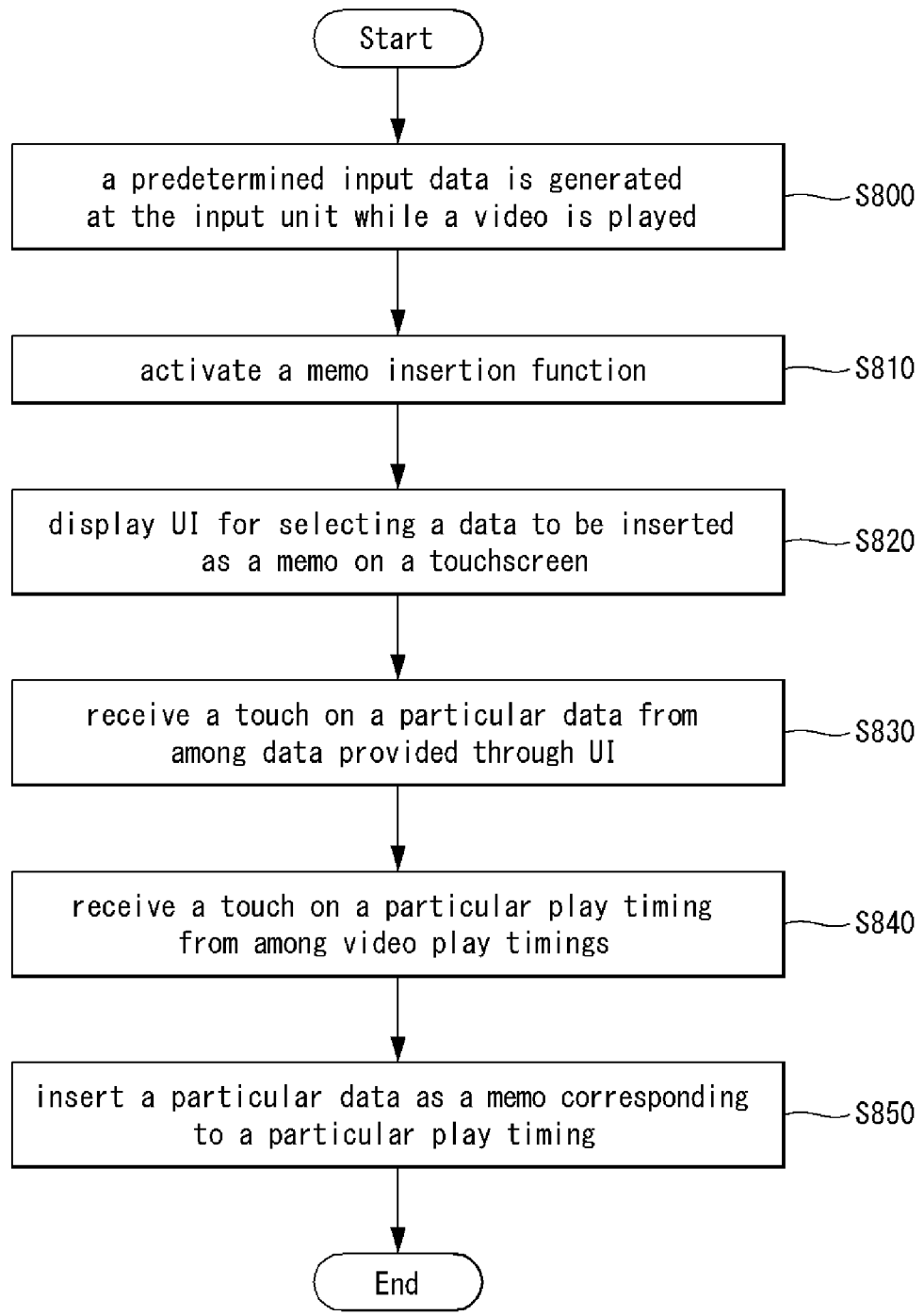
FIG. 23 illustrates an additional method for generating a memo in a mobile terminal according to the present invention.

FIG. 23 illustrates an additional method for generating a memo in a mobile terminal 100 according to the present invention. In what follows, the method for generating a memo will be described with reference to related drawings.

While a video is played in the mobile terminal 100, a predetermined input data is generated from an input unit 116, S800. If the predetermined input data is generated from the input unit 116, the controller 180 activates a memo insertion function for a video S810. If the memo insertion function is activated, the controller 180 displays a user interface for selecting data to be inserted into a memo on the touchscreen 151, S820.

Next, the controller 180 receives a touch related to a particular data among data provided through the user interface S830. This indicates that the particular data has been selected as a memo to be inserted into the video. After the particular data is selected, a touch for a particular play timing among play timings of the video is received from the user S840. This indicates that a position at which the particular data is inserted as a memo has been selected.

Then the controller 180 inserts the selected particular data as a memo corresponding to the selected particular play timing S850. Meanwhile the data inserted into the video as a memo may correspond to a memo file generated by one of the methods for generating a memo, a text file, a sound file, or an image file. But the scope of the present invention is not limited to the above description.

On the other hand, according to the method for generating a memo shown in FIG. 23, the controller 180 continuously displays a procedure of playing the video on the touchscreen 151 even when the memo insertion function is being carried out.

Figure 24:
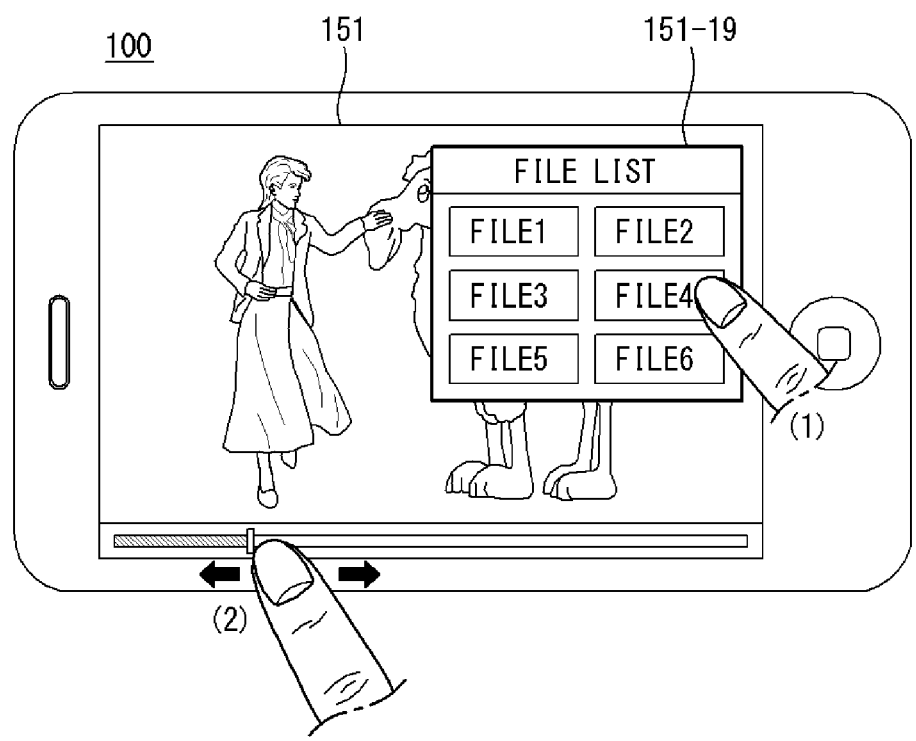
FIG. 24 illustrates one example of storing a particular file in such a way to correspond to a particular play timing of a video according to the method for generating a memo shown in FIG. 23.

FIG. 24 illustrates one example of storing a particular file in such a way to correspond to a particular play timing of a video according to the method for generating a memo shown in FIG. 23.

With reference to FIG. 24, it can be noticed that the touchscreen 151 displays a user interface 151-19 for selecting a file to be inserted as a memo into a video being played. FIG. 24 illustrates a situation where the user selects a "FILE4" from among a plurality of files displayed on the user interface 151-19 as a file to be inserted into the video being displayed and selects a position at which the selected file is inserted by dragging a touch on a play progress bar of the video. On the other hand, it is preferable that when a memo insertion function is activated, a screen switching function according to the dragging of a touch on the progress bar should be deactivated.

Figure 25:
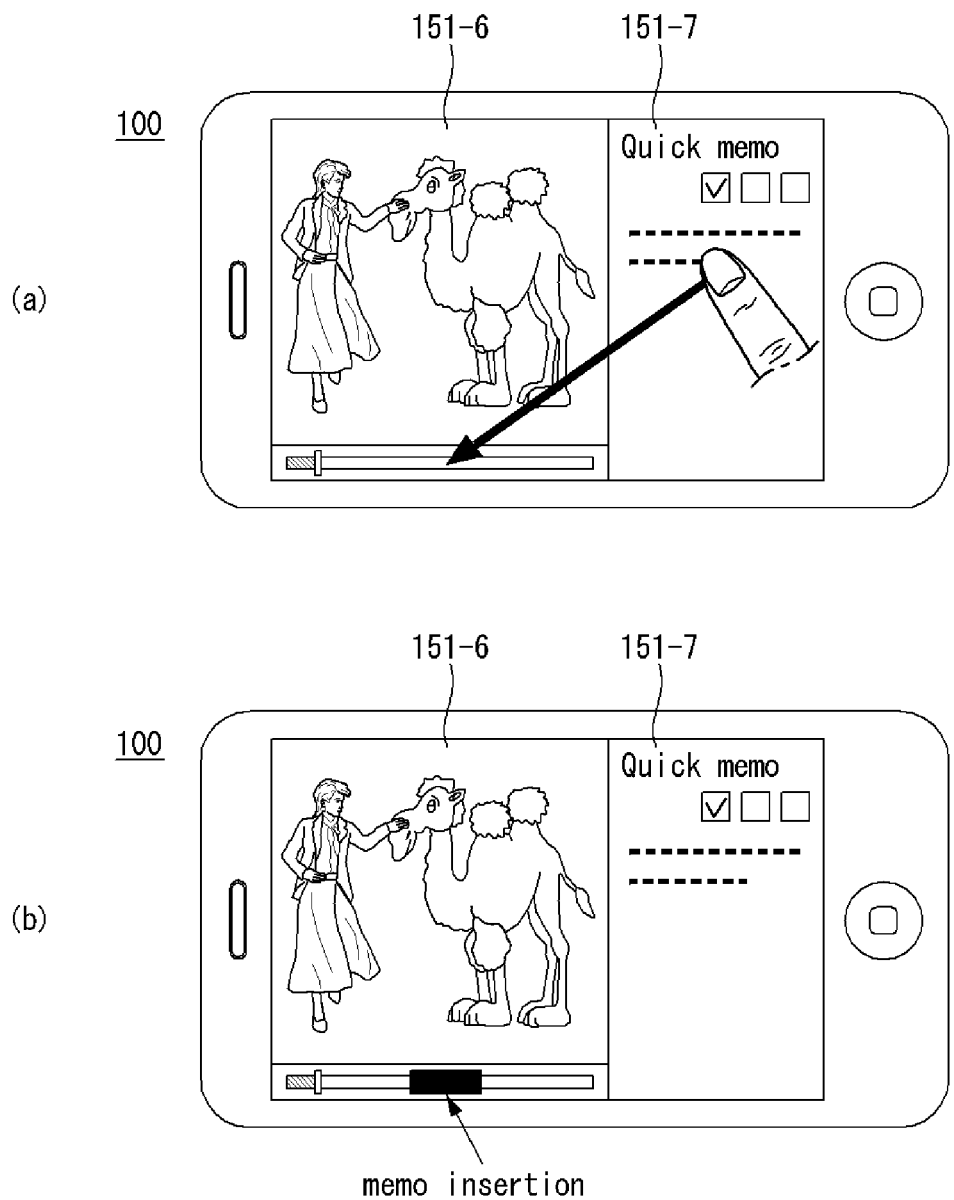
FIG. 25 illustrates one example of storing a memo generated based on handwriting inputs according to the method for generating a memo shown in FIG. 23 in such a way to correspond to a particular play timing of a video.

FIG. 25 illustrates one example of storing a memo generated based on handwriting inputs according to the method for generating a memo shown in FIG. 23 in such a way to correspond to a particular play timing of a video.

FIG. 25(a) illustrates a situation where the user drags a touch on a handwriting input on a handwriting input area to a particular play timing. Then the controller 180 can set up a memo based on the handwriting input as the memo corresponding to the particular play timing and store the memo as such FIG. 25(b).

Meanwhile, a handwriting input displayed on the handwriting input area 151-7 may correspond to what is displayed on the handwriting input area 151-7 as a result of carrying out a retrieving function for a pre-stored memo file. Also, the handwriting input displayed on the handwriting input area 151-7 may correspond to a handwriting input provided by the user after the handwriting function is activated.

Figure 26:
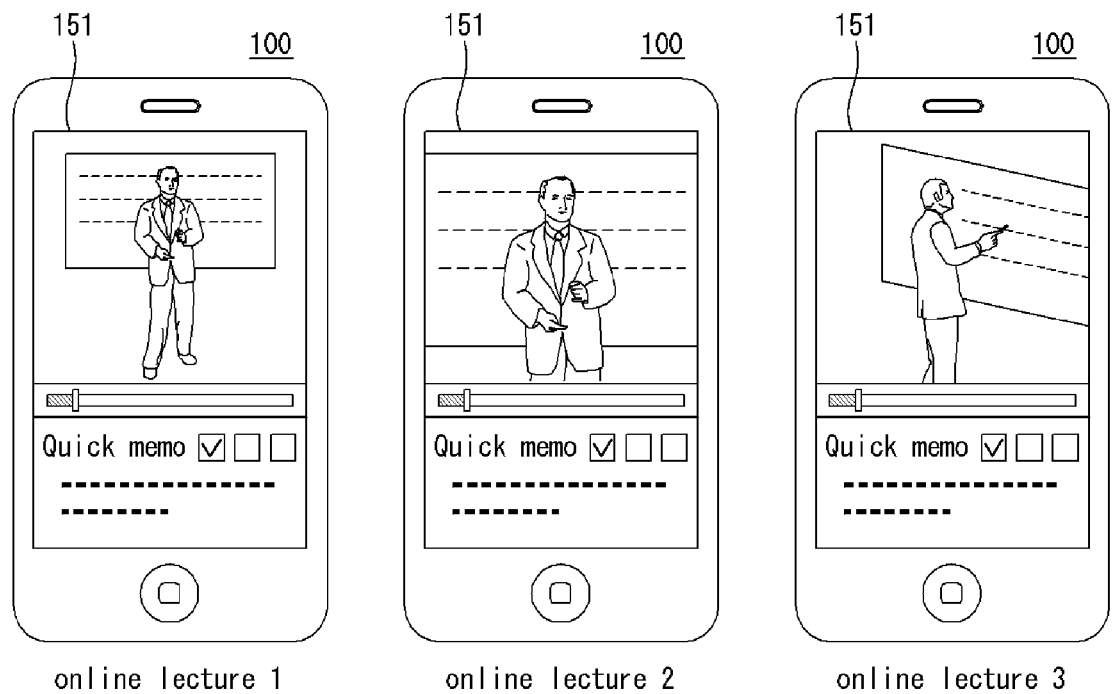
FIGS. 26 to 28 illustrate a method for managing a memo written during video play in a mobile terminal according to the present invention.
Figure 27:
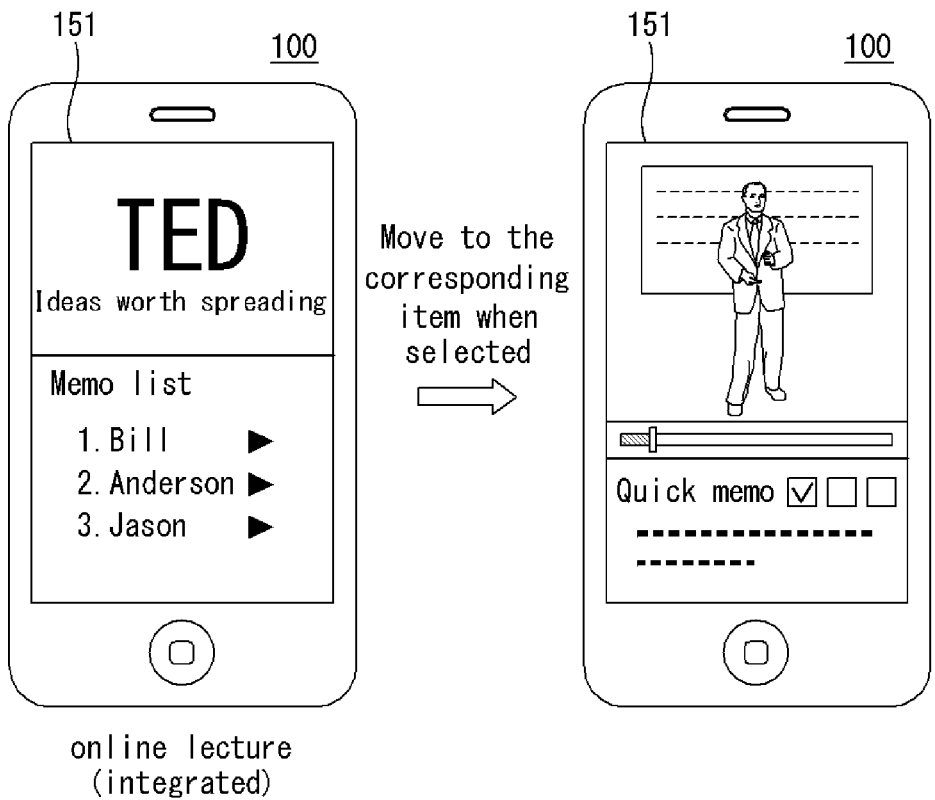
Figure 28:
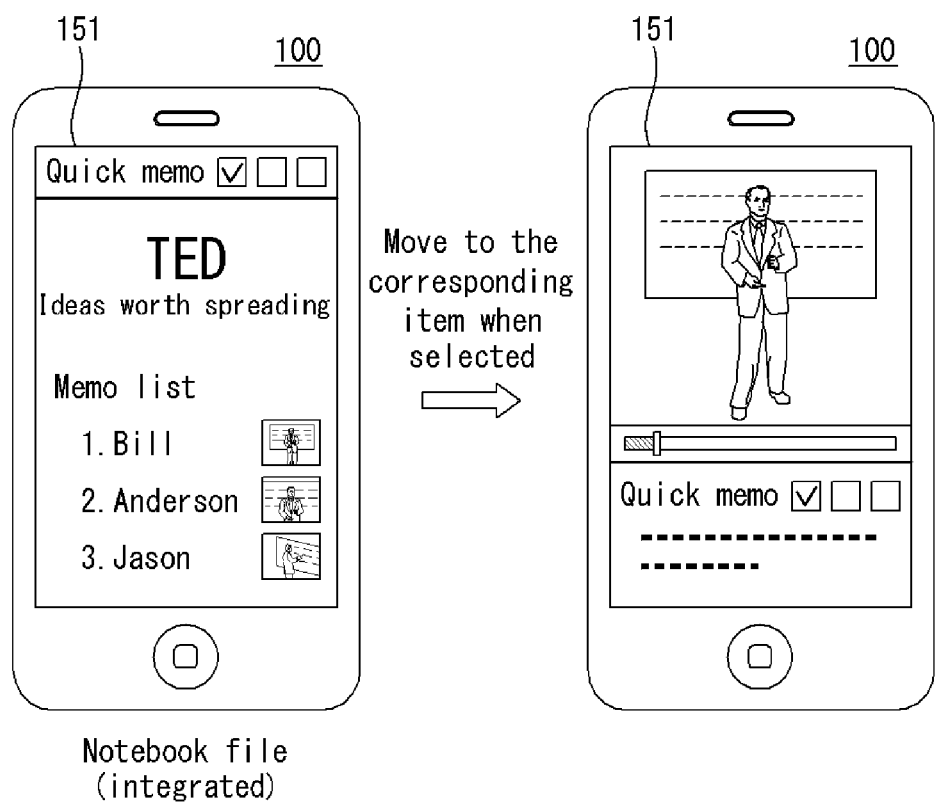

FIGS. 26 to 28 illustrate a method for managing a memo written during video play in a mobile terminal 100 according to the present invention.

FIG. 26 illustrates a situation where a memo is generated and inserted into each of a plurality of video lectures. FIG. 27 illustrates a situation where videos containing an inserted memo are managed as an integrated single video and if a particular list item is selected, the controller 180 displays a video and a memo associated with the selected particular list item on the touchscreen 151.

FIG. 28 illustrates a situation where a memo and a video corresponding to a play timing interval into which the memo is inserted are managed as a list item of an integrated list and if a particular list item is selected, the controller 180 displays a video and a memo associated with the selected particular list item on the touchscreen 151.

Figure 29:
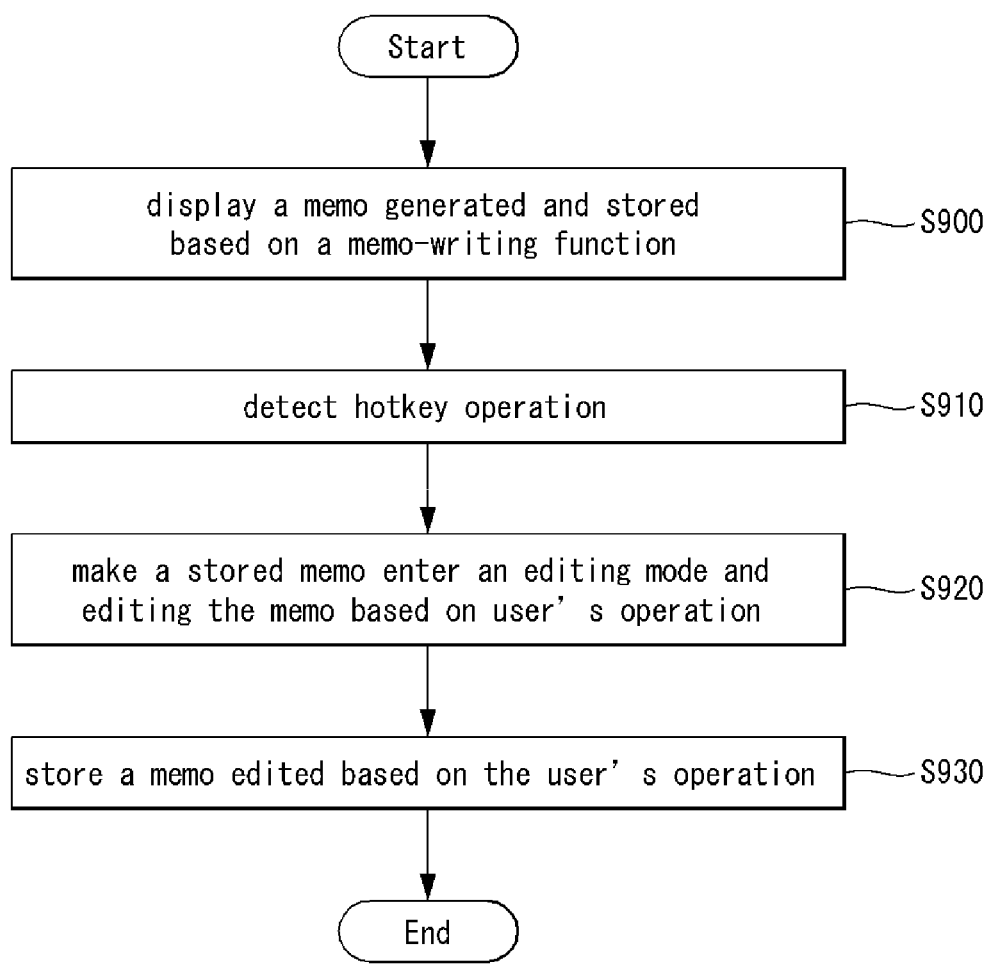
FIG. 29 is a flow diagram illustrating yet another method for editing a file in a mobile terminal according to the present invention.

FIG. 29 is a flow diagram illustrating yet another method for editing a file in a mobile terminal 100 according to the present invention. In what follows, the method for editing a memo file will be described with reference to related drawings.

The touchscreen 151 displays a memo generated and stored based on a memo-writing function S900. While the stored memo is being displayed, hotkey operation by the user is detected again S910. Here, the hotkey may correspond to a hotkey configured to activate the memo-writing function.

If the user's operation of the hotkey is detected again, the controller 180 makes the mobile terminal 100 enter an editing mode for the stored memo and based on the user's operation, carries out editing the memo S920. Here, the user's operation may include deleting a handwriting input, an additional handwriting input, and so on. However, the scope of the present invention is not limited to the above description.

Then the controller 180 stores the edited memo based on the user's operation S930. Here, the edited memo may be stored in a data storage area where the memo has originally been kept. Also, the edited memo may be stored in a new data storage area. At this time, the controller 180 can display on the touchscreen 151 a user interface for selecting or configuring a data storage area in which the edited memo is stored.

In the above, described have been various methods for generating a memo carried out in a mobile terminal 100 according to the present invention, storing a memo generated based on a handwriting input or a speech input during video play in association with a play timing of the video. However, similar to the case of playing a video, in a case where the screen scene of the touchscreen 151 changes as time goes one, too, the mobile terminal 100 according to the present invention can carry out a procedure of generating a memo while displaying the changing scenes of the screen.

For example, if a memo-writing function is activated during execution of a particular application, the controller 180 of the mobile terminal 100 carries out the memo-writing function while updating the screen of the touchscreen 151 by reflecting an execution result of the particular application. As a more specific example, if the memo-writing function is activated during execution of a web-browser, the controller 180 may carry out the memo-writing function by reflecting update of contents displayed on the execution screen of the web-browser, play of contents included in the execution screen of the web-browser (for example, play of flash video), and update of an article displayed on the execution screen of the web-browser.

Figure 30:
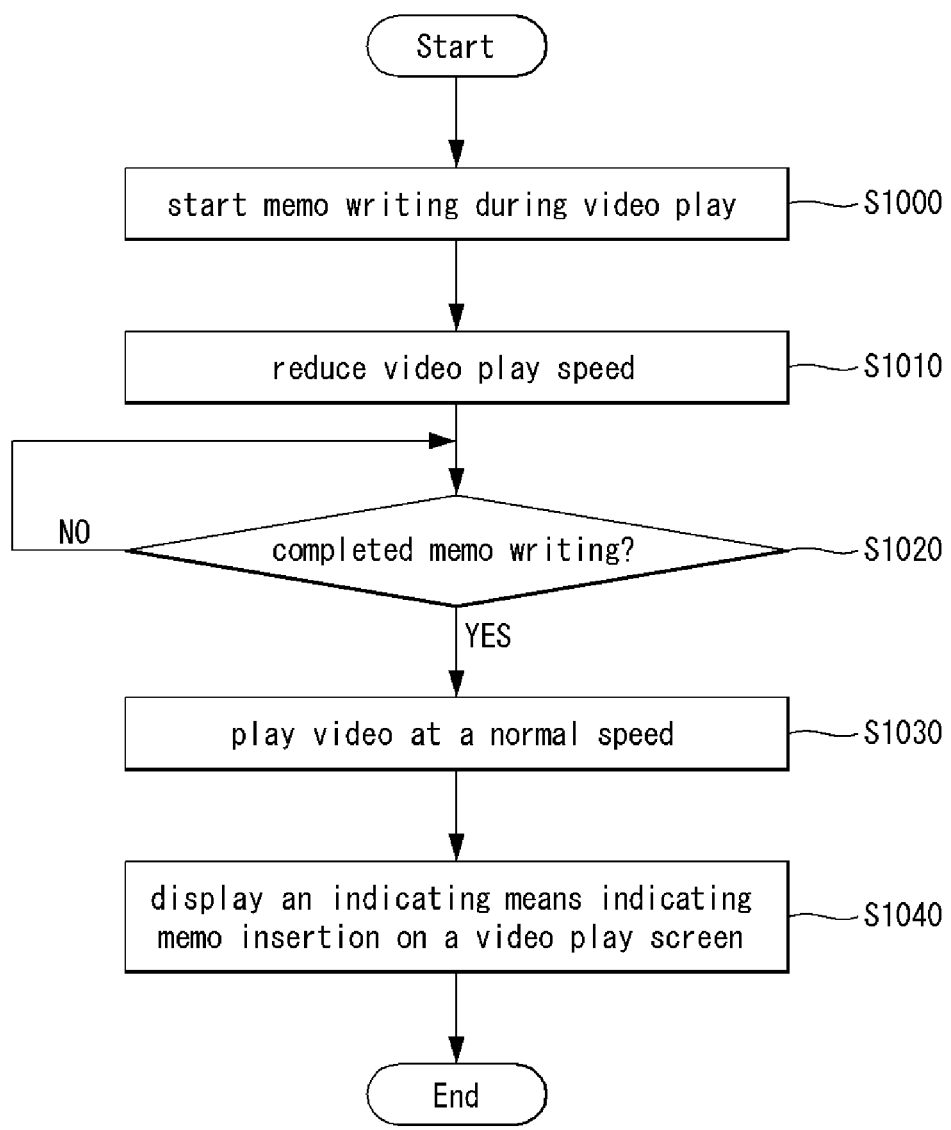
FIG. 30 is a flow diagram illustrating one example of a method for operating a mobile terminal according to the present invention.

FIG. 30 is a flow diagram illustrating one example of a method for operating a mobile terminal according to the present invention.

Memo writing starts while a video is played S1000. The controller 180, based on the user's operation of a predetermined hardware or software key, a predetermined touch input through the touchscreen 151, a particular gesture of the user recognized through the camera 121, a particular gesture of the user recognized through various sensing means, or a particular motion of the mobile terminal 100, can recognize the start of memo writing. However, the technical scope of the present invention is not limited to the above description.

If memo writing begins, the controller 180 reduces a video play speed to a predetermined speed S1010. This step is intended for increasing capability of recognizing a video in play while the user is writing a memo. Then, the controller 180 determines whether memo writing has been completed S1020. The controller 180, based on an elapsed time since memo writing, the user's operation of a predetermined hardware or software key, a predetermined touch input through the touchscreen 151, a particular gesture of the user recognized through the camera 121, a particular gesture of the user recognized through various sensing means, or a particular motion of the mobile terminal 100, can recognize completion of memo writing. However, the technical scope of the present invention is not limited to the above description.

If memo writing is completed, the controller 180 plays the video again at a normal speed S1030; sets up an interval between the memo writing start time and the memo writing completion time as a memo insertion interval; and displays an designation means indicating a memo insertion on a video play progress bar of a video play screen S1040.

Different from FIG. 30, a mobile terminal 100 according to the present invention, in case memo writing begins in the middle of video play, stops playing a video temporarily and resumes the video play once the memo writing is completed. At this time, the mobile terminal 100 can display only an indicating means indicating that a memo has been inserted into a video play progress bar of a video play screen; and can set up a memo insertion interval by taking account of a memo writing time and display the memo insertion interval on the video play progress bar.

FIGS. 31 to 34 illustrate examples where memo writing is started during video play in a mobile terminal 100 according to the present invention.

Figure 31:
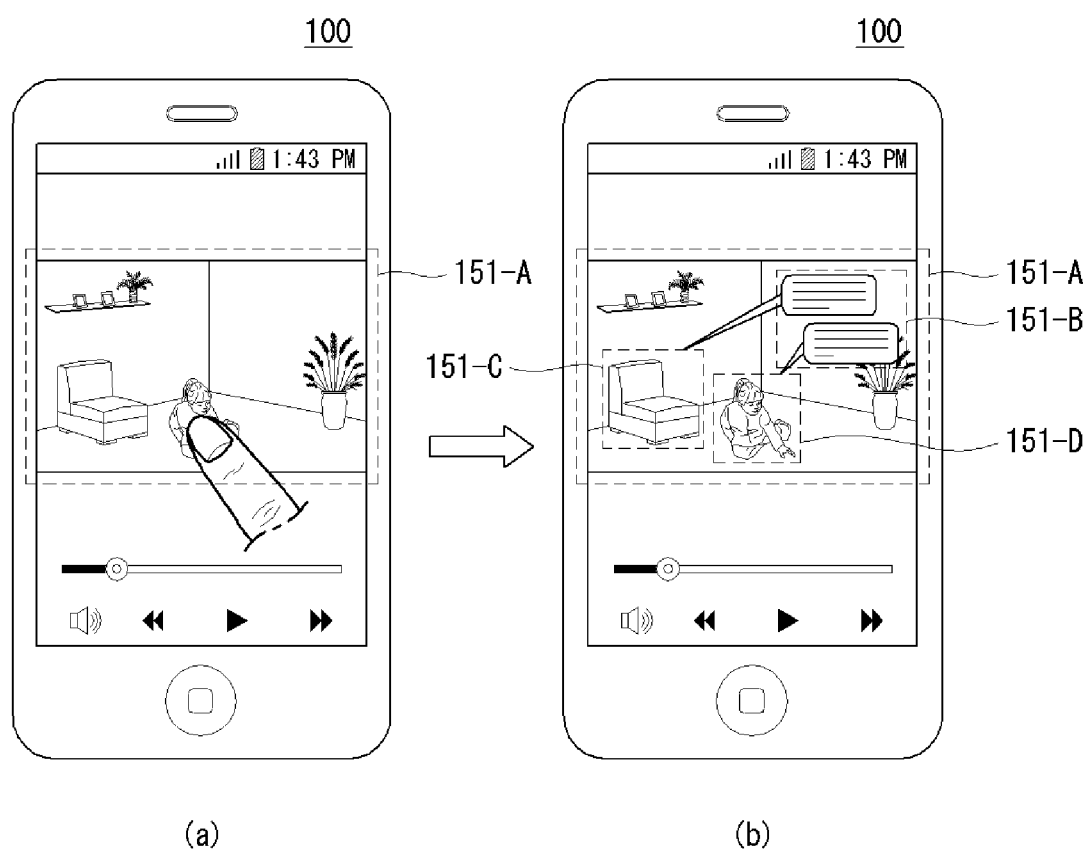
FIGS. 31 to 34 illustrate examples where memo writing is started during video play in a mobile terminal according to the present invention.

FIG. 31(*a*) illustrates a case where the user touches a chair and a person displayed in a video display region 151-A. Then the controller 180, as shown in FIG. 31(*b*), a memo input region 151-B in the form of a speech bubble corresponding to the chair 151-C and the person 151-D is displayed on the touchscreen 151. In other words, the controller 180 develops a relationship between the memo input region 151-B and objects displayed in a video display screen. That is to say, the user can select an object displayed in the video display region 151-A and write a memo corresponding to the object. As shown in FIG. 31, a memo input region for each object can be distinguished from each other by color.

Figure 32:
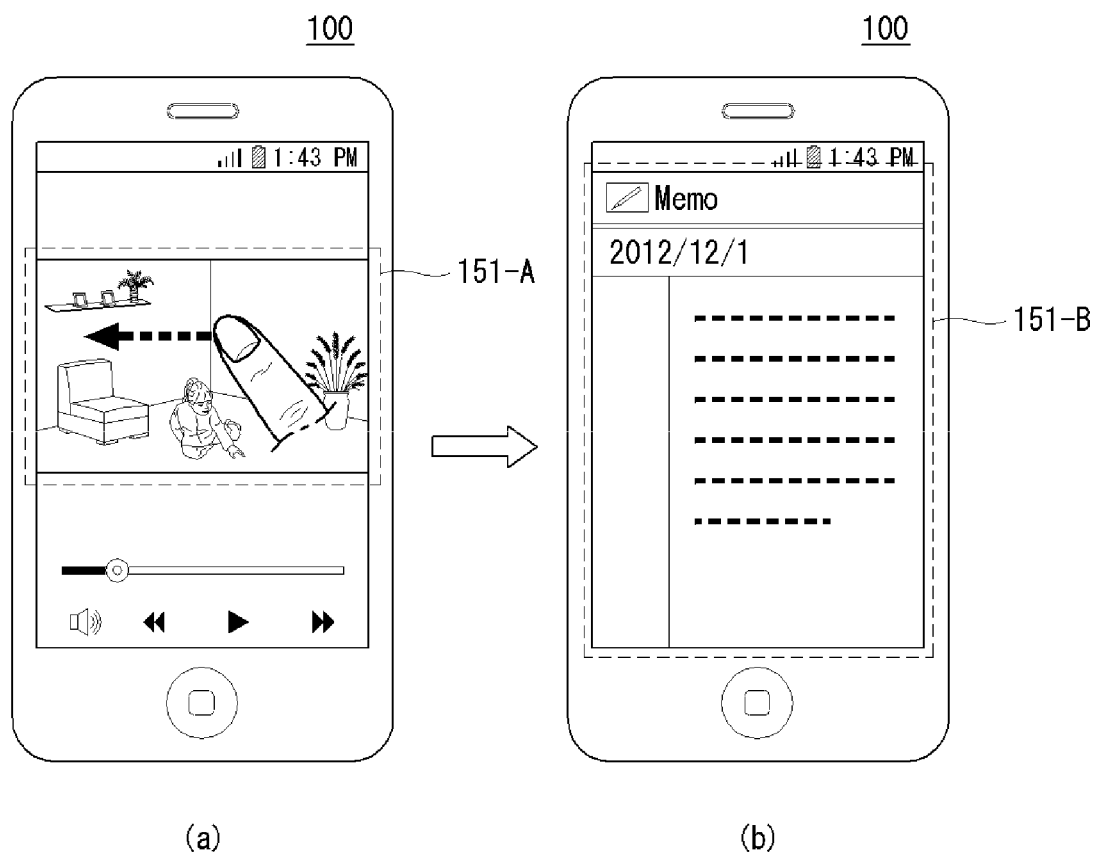

FIG. 32(*a*) illustrates a case where the user flicks the video display region 151-A to the left. Then, as shown in FIG. 32(*b*), the controller 180 can display a memo input region 151-B across the entire screen of the mobile terminal 100. At this time, the controller 180 stops video play temporarily and resumes the video play after the memo writing is completed. Meanwhile, the mobile terminal 100 according to the present invention, as shown in FIG. 32, can store time information corresponding to a generated memo together with the memo.

Figure 33:
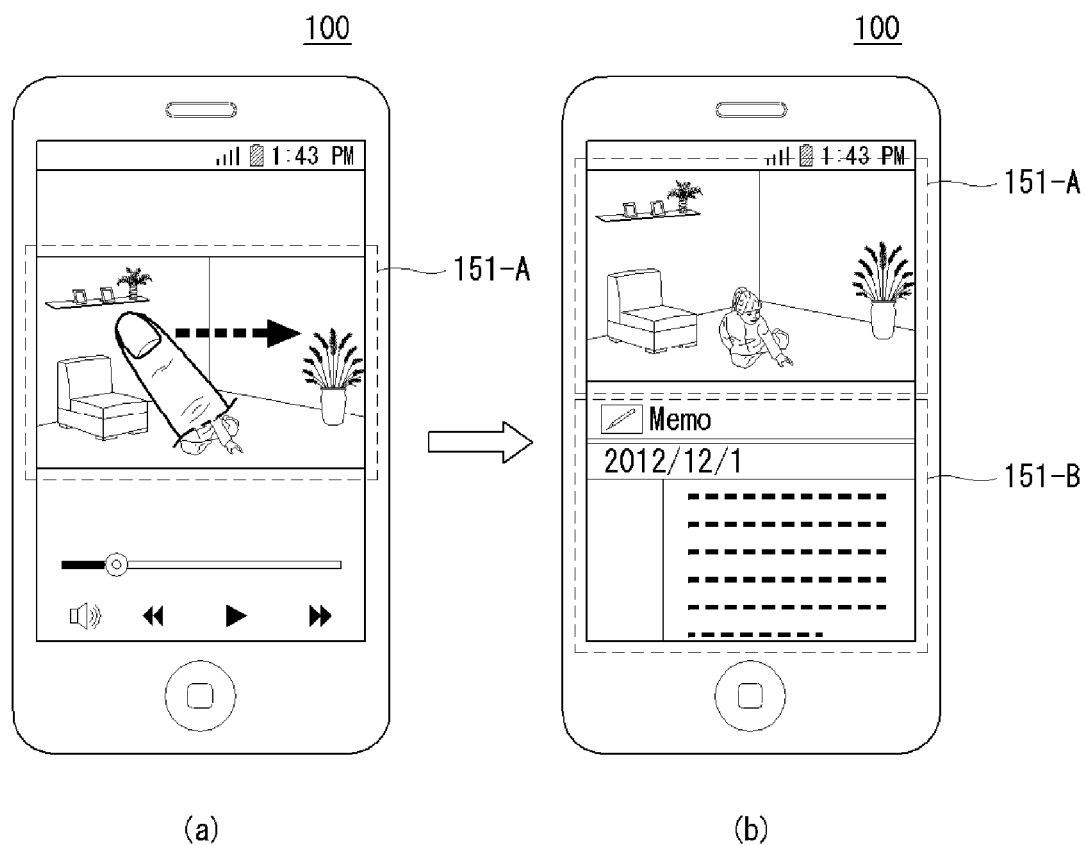
Figure 34:
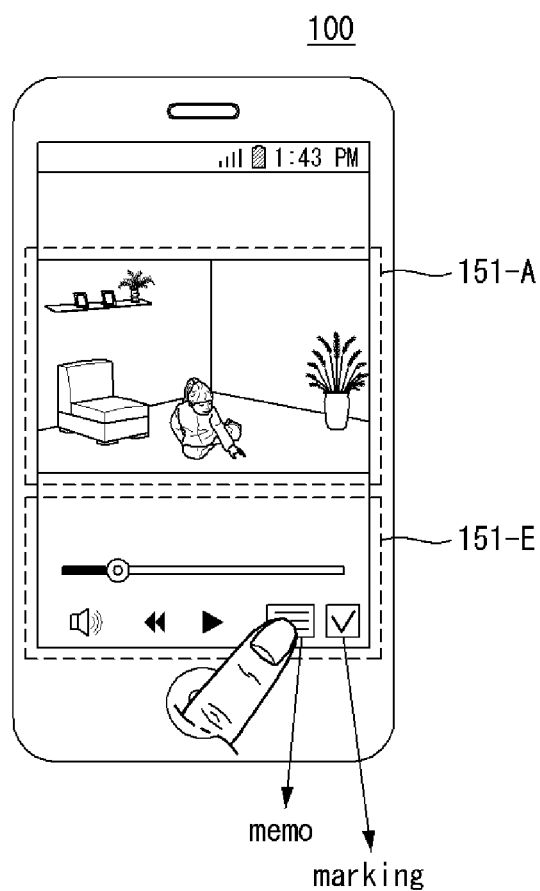

FIG. 33(*a*) illustrates a case where the user flicks the video display region 151-A to the right. Then the controller 180, as shown in FIG. 32 or FIG. 33, can display the memo input region 151-B on the screen. It should be noted that in case the user selects a marking icon, the controller 180, if video play is terminated or suspended, can display the memo input region 151-B as shown in FIG. 32 or FIG. 33.

Figure 35:
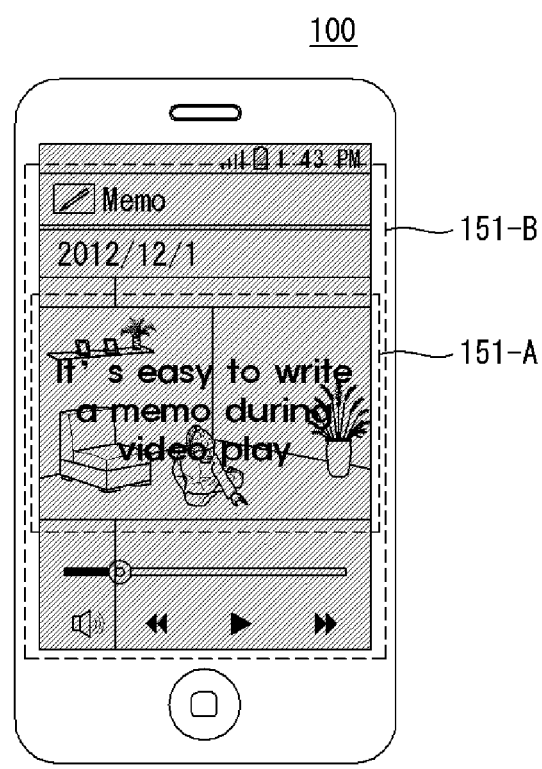
FIGS. 35 to 37 illustrate examples of a memo input region provided by a mobile terminal according to the present invention.
Figure 36:
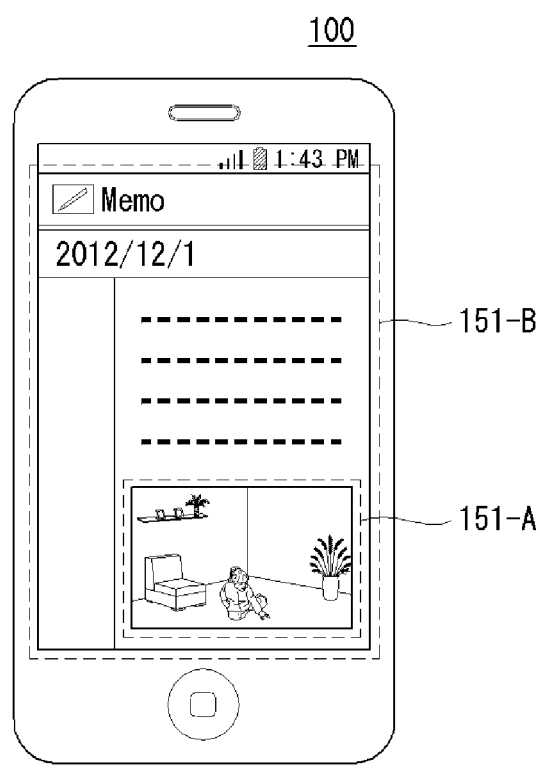
Figure 37:
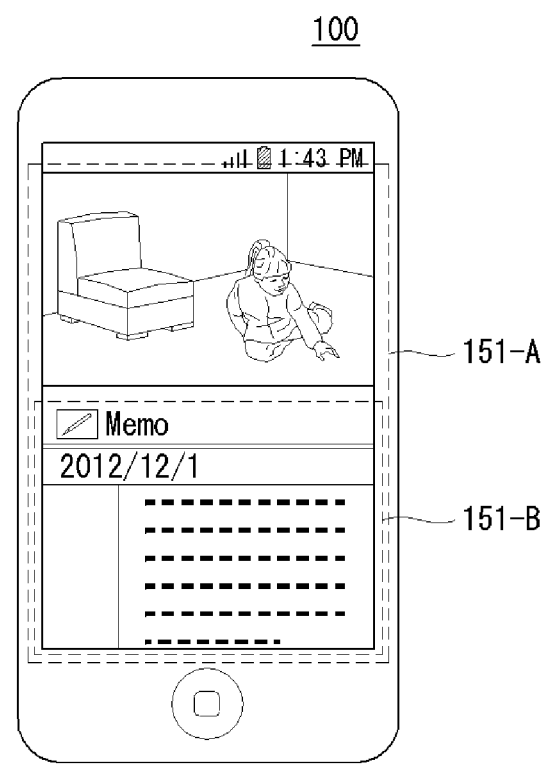

FIGS. 35 to 37 illustrate examples of a memo input region 151-B provided by a mobile terminal 100 according to the present invention.

As shown in FIG. 35, the mobile terminal 100, if a memo writing function is activated, can display a transparent memo input region 151-B by making the region overlap the entire screen including the video display region 151-A.

As shown in FIG. 36, the mobile terminal 100, if the memo writing function is activated, can display the memo input region 151-B in the form of PIP (Picture-In-Picture).

As shown in FIG. 37, the mobile terminal 100, if the memo writing function is activated, can divide the screen into a video display region 151-A and a memo input region 151-B.

Although not shown in the figure, the user can input his or her memo by using a keypad or write a memo through a handwriting input. Also, the user can write a memo through a voice input. At this time, the mobile terminal 100 can generate a memo by converting the user's voice input to characters or store the voice input itself in the form of a voice memo.

Figure 38:
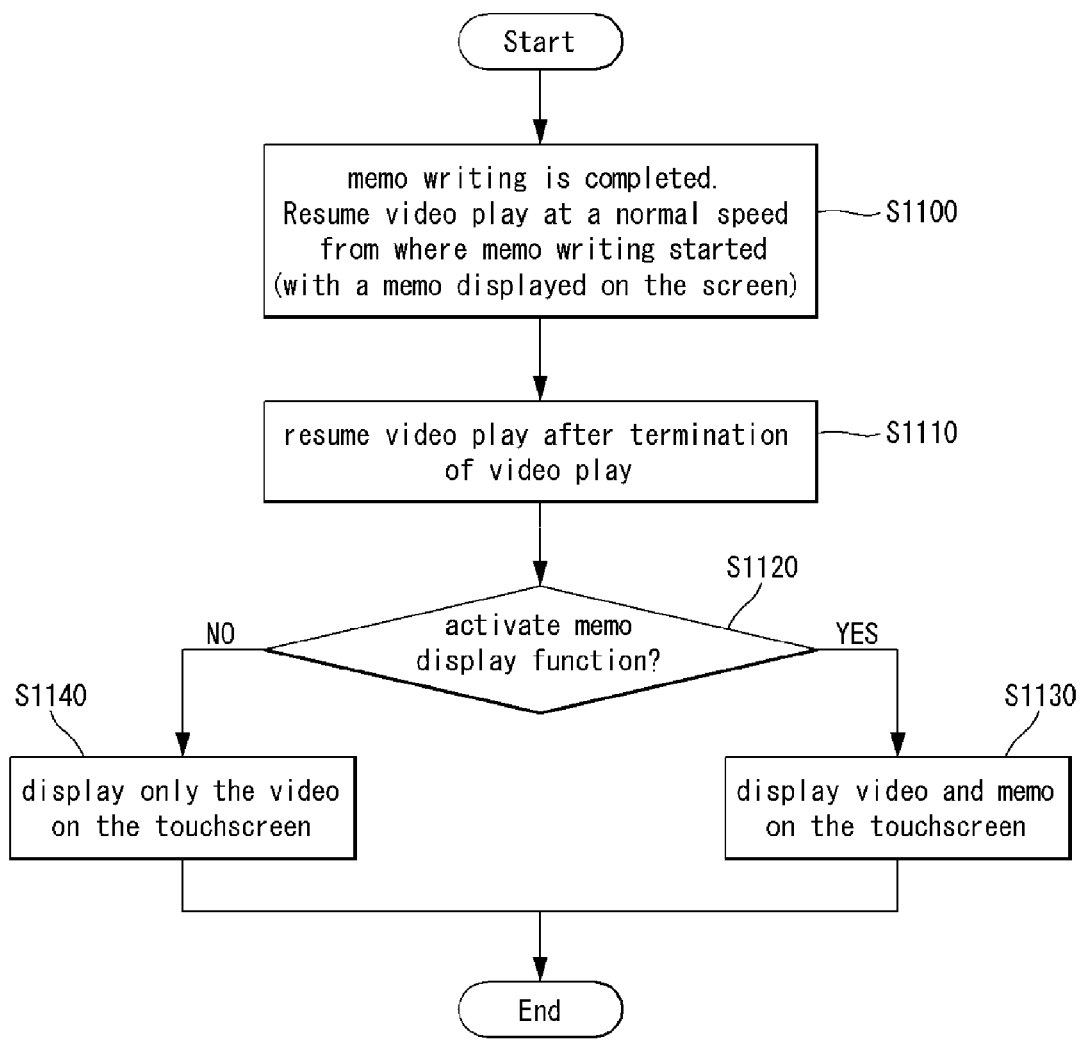
FIG. 38 is a flow diagram illustrating another example of a method for operating a mobile terminal according to the present invention.

FIG. 38 is a flow diagram illustrating another example of a method for operating a mobile terminal according to the present invention. In what follows, with reference to related drawings, the method for operating a mobile terminal will be described.

If memo writing is completed and a generated memo is stored S1100, the controller 180 resumes video play at a normal speed from a memo writing start time S1110. At this time, the controller 180 can display the generated memo on the touchscreen 151. The time at which the completed memo is displayed on the touch screen 151 may correspond to a time interval ranging from a memo writing start time to a memo writing completion time. During this interval the user can edit a memo while checking the memo interactively. Meanwhile, the controller 180 can enter a memo editing mode if a touch on a memo display region is received or a separate hardware/software key is selected. However, the technical scope of the present invention is not limited to the above description.

Video play is resumed after the video play is terminated. In this case, the controller 180 determines whether a memo display function is activated S1120. If the memo display function is found activated, the controller 180 can display a video in play together with a memo in the touchscreen 151 during a memo insertion interval S1130. In this case, too, if the user deactivates the memo display function, the controller 180 can remove the memo displayed in the screen. Activation or deactivation of the memo display function can be carried out based on operation of a predetermined hardware or software key, a particular gesture of the user, and the like.

However, in case the memo display function is in the status of deactivation, the controller 180 displays on the touchscreen 151 only the video which is still played in the memo insertion interval, whereas a memo is not displayed on the touch screen 151, S1140. At this time, however, the video play progress bar in a video play control region can display a memo insertion indicator with which a memo insertion start time and a video insertion end time can be checked. Meanwhile, in this case, too, if the user activates the memo display function in the middle of displaying a memo, the controller 180 can display a memo on the screen.

Figure 39:
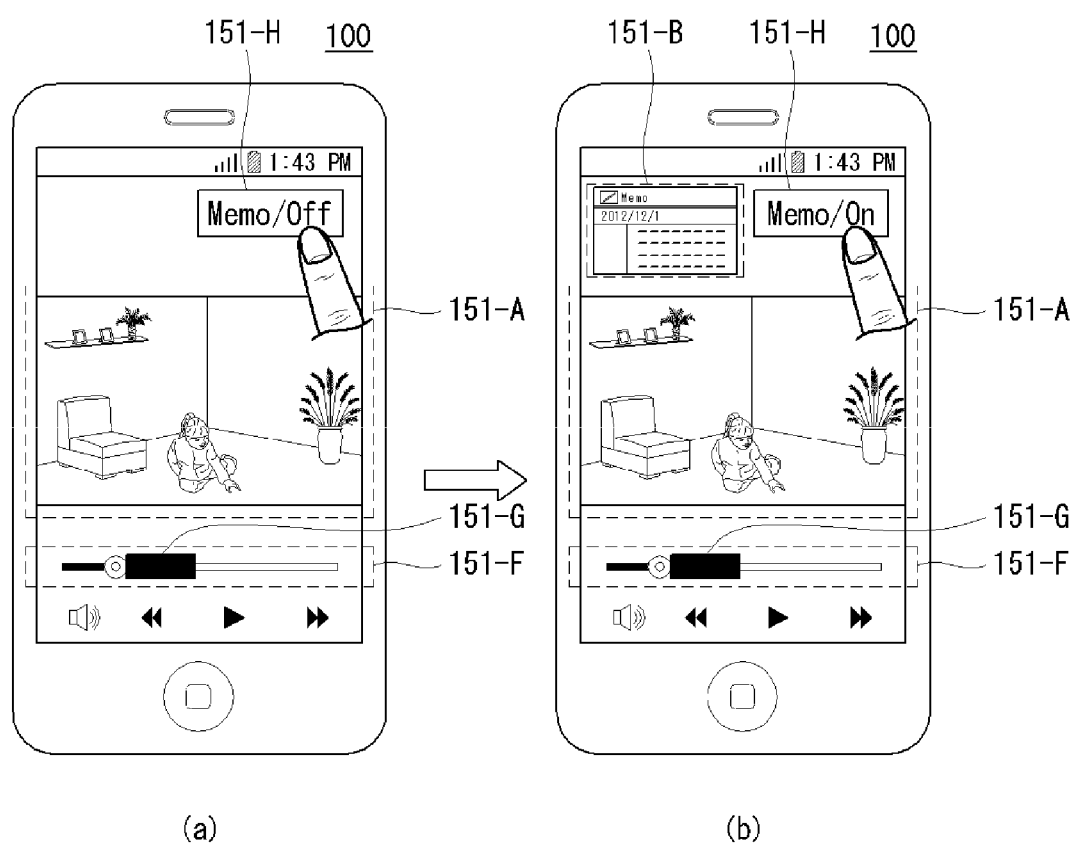
FIG. 39 illustrates examples of a video play screen according to a method for operating a mobile terminal of FIG. 38.

FIG. 39 illustrates examples of a video play screen according to a method for operating a mobile terminal of FIG. 38. It should be noted that FIG. 39(*a*) corresponds to a video play screen where a memo display function is deactivated while FIG. 39(*b*) is a video play screen where the memo display function is activated.

With reference to FIGS. 39(*a*) and (*b*), a video play screen comprises a video display region 151-A, a video play progress bar 151-F, and a memo display control button 151-H. The video play progress bar 151-F includes an indicator 151-G indicating that a memo related to the video in question is stored.

Meanwhile, a start time of the indicator 151-G represents a time at which an inserted memo is beginning to be displayed on the touchscreen 151 while an end time of the indicator 151-G represents a display end time of the inserted memo on the touchscreen 151. However, it should be noted that the above description assumes a situation where the memo display function is activated.

The user can control activation of the memo display function by touching a memo display function control button 151-H. As shown in FIG. 39(*a*), if the user touches the memo display control button 151-H while the memo display function is deactivated, the controller 180, as shown in FIG. 39(*b*), activates the memo display function and display a memo 151-I inserted into the touchscreen 151. As shown in FIG. 39(*b*), if the user touches again the memo display control button 151-H while the memo display function is activated, the controller 180, as shown in FIG. 39(*a*), deactivates the memo display function again.

Meanwhile, the user can change the memo insertion interval by selecting and moving a region corresponding to a memo insertion start time and a memo insertion end time through a touch input. Since the selection and movement operation has been described previously with reference to FIGS. 10 and 11, detailed description thereof will be omitted.

Figure 40:
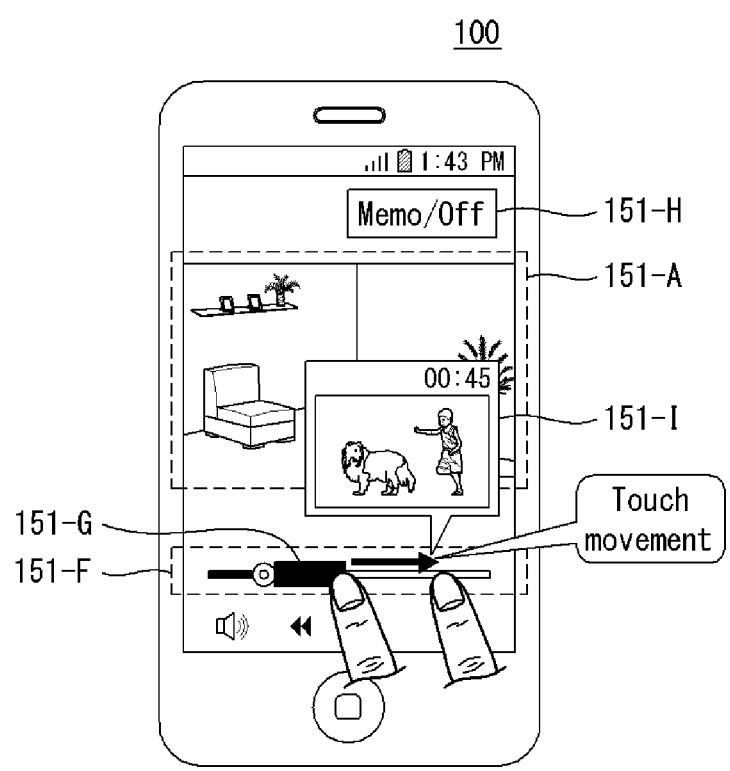
FIG. 40 illustrates a procedure of changing a memo insertion interval in a mobile terminal according to the present invention.

FIG. 40 illustrates a procedure of changing a memo insertion interval in a mobile terminal 100 according to the present invention.

FIG. 40 illustrates a procedure where the user touches to select a region corresponding to an end time of the memo insertion interval and changing the end time of the memo insertion interval by moving the touch input to the right. With reference to FIG. 40, the controller 180, displays on the touchscreen 151 an information provision region 151-I including a still image at a time point to which the touch has moved, namely, at the time point selected as an end time of the memo insertion interval and play time information. Then the user can check the information about the end time of the memo insertion interval by referring to the information provision region 151-I.

Meanwhile, if the user moves a touch point again, the controller 180 provides through the information provision region 151-I a still image and play time information about the moved point. If the touch point is moved to some point and released there by the user, the controller 180 can set up the point where the touch has been released as an end point of the memo insertion interval. The start point of the memo insertion interval can also be changed by using the method described above.

Figure 41:
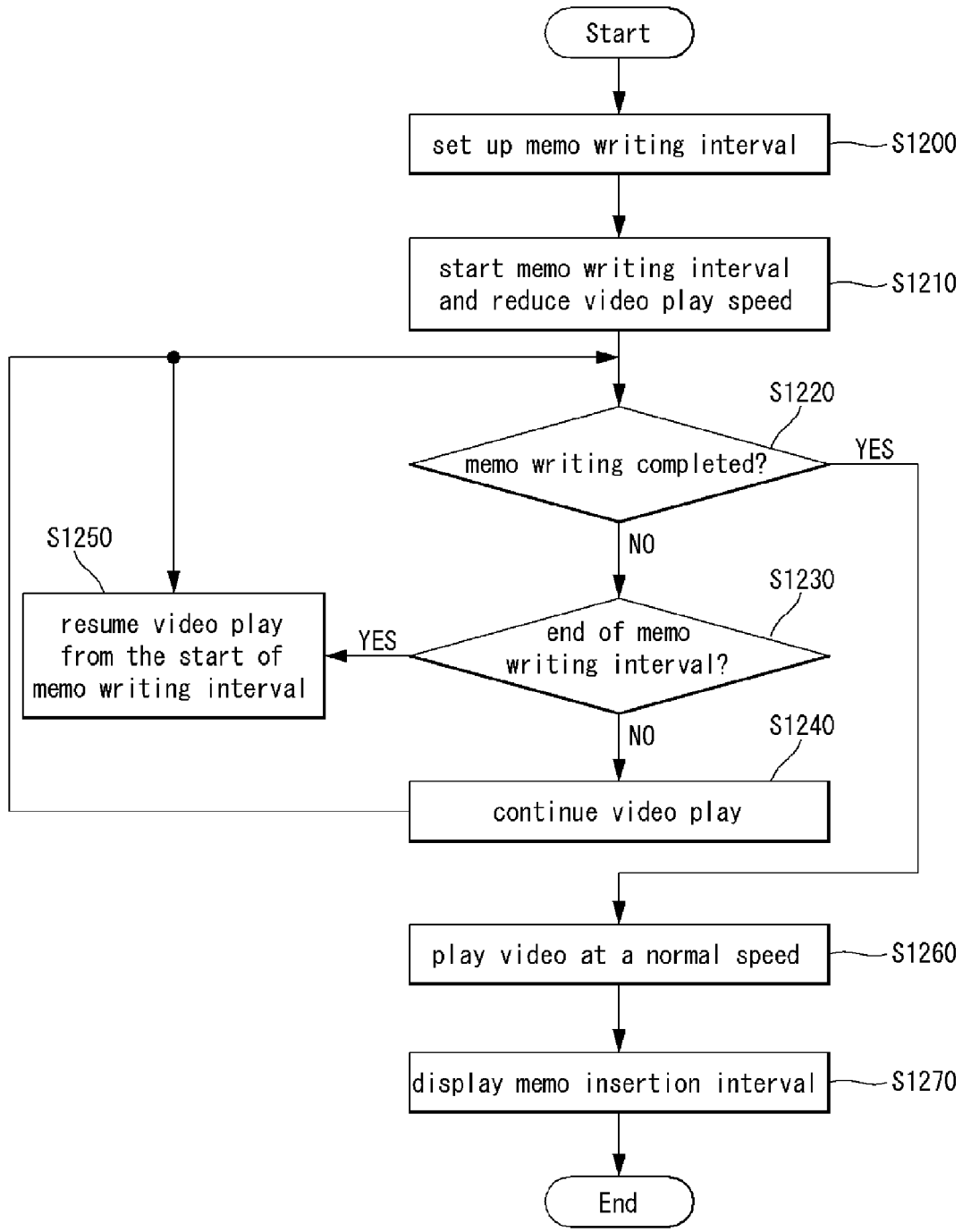
FIG. 41 is a flow diagram illustrating a yet another example of a method for operating a mobile terminal according to the present invention.

FIG. 41 is a flow diagram illustrating a yet another example of a method for operating a mobile terminal according to the present invention. In the following, the method for operating a mobile terminal will be described with reference to related drawings.

First, a memo writing interval is set up by the user's operation S1200. If the memo writing interval begins in the middle of video play while the memo writing interval is set up, the controller 180 reduces a video play speed S1210.

Next, the controller 180 determines whether memo writing has been completed S1220. If memo writing has not been completed yet, the controller 180 determines whether a memo writing interval is terminated S1230. If the memo writing interval is not terminated yet, the controller 180 carries out the S1220 step again while continuing video play S1240.

If the memo writing interval is terminated, however, the controller 180 plays the video again from the start point of the memo writing interval S1250, thus carrying out the S1220 step again. In other words, a mobile terminal 100 according to the present invention, if a memo writing interval is set up, can play the corresponding interval repeatedly until memo writing is completed.

If it is determined from the S1220 step that memo writing has been completed, the controller 180 plays a video at a normal speed S1260 and displays a memo insertion interval in a particular region of the video play screen S1270. More specifically, the memo insertion interval can be displayed on a video play progress bar or provided in the form of a list. However, the form in which the memo insertion interval is displayed is not limited to the examples described above.

Meanwhile, the memo insertion interval may be identical to the memo writing interval. In other words, with respect to video play timing, the memo writing start time can be the same as the memo insertion start time while the memo writing end time is the same as the memo insertion end time.

On the other hand, the memo insertion interval may differ from the memo writing interval. For example, in case the memo writing interval is set up previously and memo writing is completed within the memo writing interval, the controller 180 can set up the time interval between the start time of the memo writing interval and a time point at which memo writing has been actually completed as a memo insertion interval.

Applying the above scheme to FIG. 2, if memo writing is completed while a video corresponding to the memo writing interval is played for the first time, the controller 180 can set up the memo writing completion time as an end time of the memo insertion interval.

Meanwhile, as described above, the start time and end time of the memo insertion interval can be changed by the user.

Figure 42:
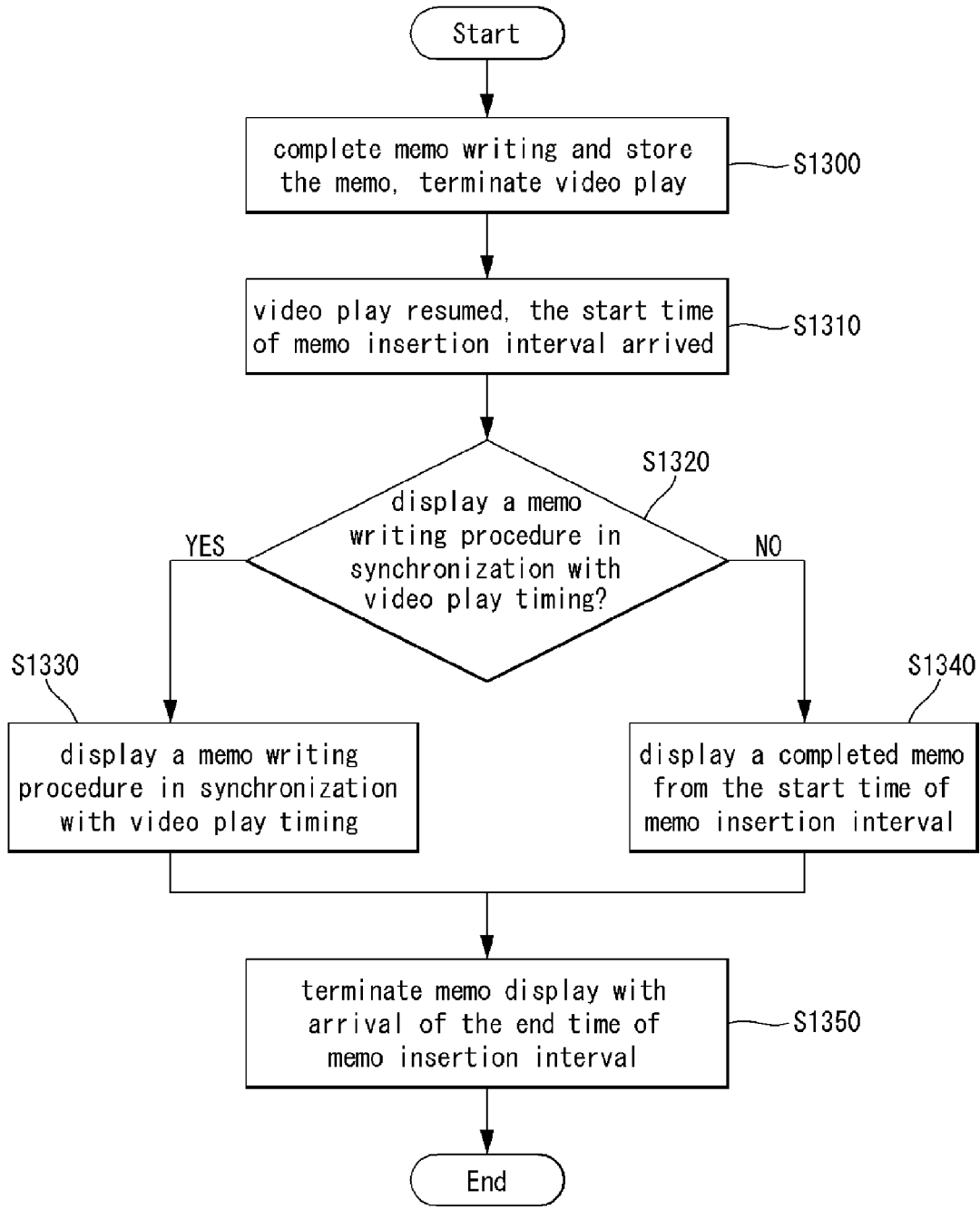
FIG. 42 is a flow diagram illustrating a still another example of a method for operating a mobile terminal according to the present invention.

FIG. 42 is a flow diagram illustrating a still another example of a method for operating a mobile terminal according to the present invention. In what follows, the method for operating a mobile terminal will be described with reference to related drawings.

While a video is played, memo writing is completed and a generated memo is stored and video play is terminated S1300. Next, a start time of a memo insertion interval is approached while the video is played again S1310.

Then the controller 180 determines whether to display a memo writing procedure in synchronization with video play timing S1320. If the memo writing procedure is so set up to be displayed in synchronization with the video play timing, the controller 180 displays the memo writing procedure in synchronization with the video play timing S1330. Then the user can check the memo writing procedure together with video in play.

In case it is set up in such a way that the memo writing procedure is not displayed in synchronization with video play timing, the completed memo can be displayed on the touchscreen 151 from the start time of a memo insertion interval S1340.

Adopting both of the two cases, if the end time of the memo insertion interval is approached, the controller 180 terminates displaying a memo on the touchscreen 151, S1350.

FIG. 43 illustrates a procedure of displaying a memo stored according to a method for operating a mobile terminal of FIG. 42.

FIG. 43(*a*) illustrates a case where a memo containing "Fantastic!" is generated between a first (scene 1) and a third scene (scene 3) of a video and stored. FIG. 43(*b*) illustrates a case where, in case a memo is generated and stored and the video is played again, the memo, while being completed, is displayed during an interval from the memo insertion start time to the memo insertion end time. However, FIG. 43(*c*) illustrates a case where, in case a memo is generated and stored and the video is played again, the memo writing procedure is displayed in synchronization of the video play timing.

FIGS. 44 to 47 are examples where a touchscreen displays a memo written and stored in relation to a video in a mobile terminal 100 according to the present invention.

Figure 44:
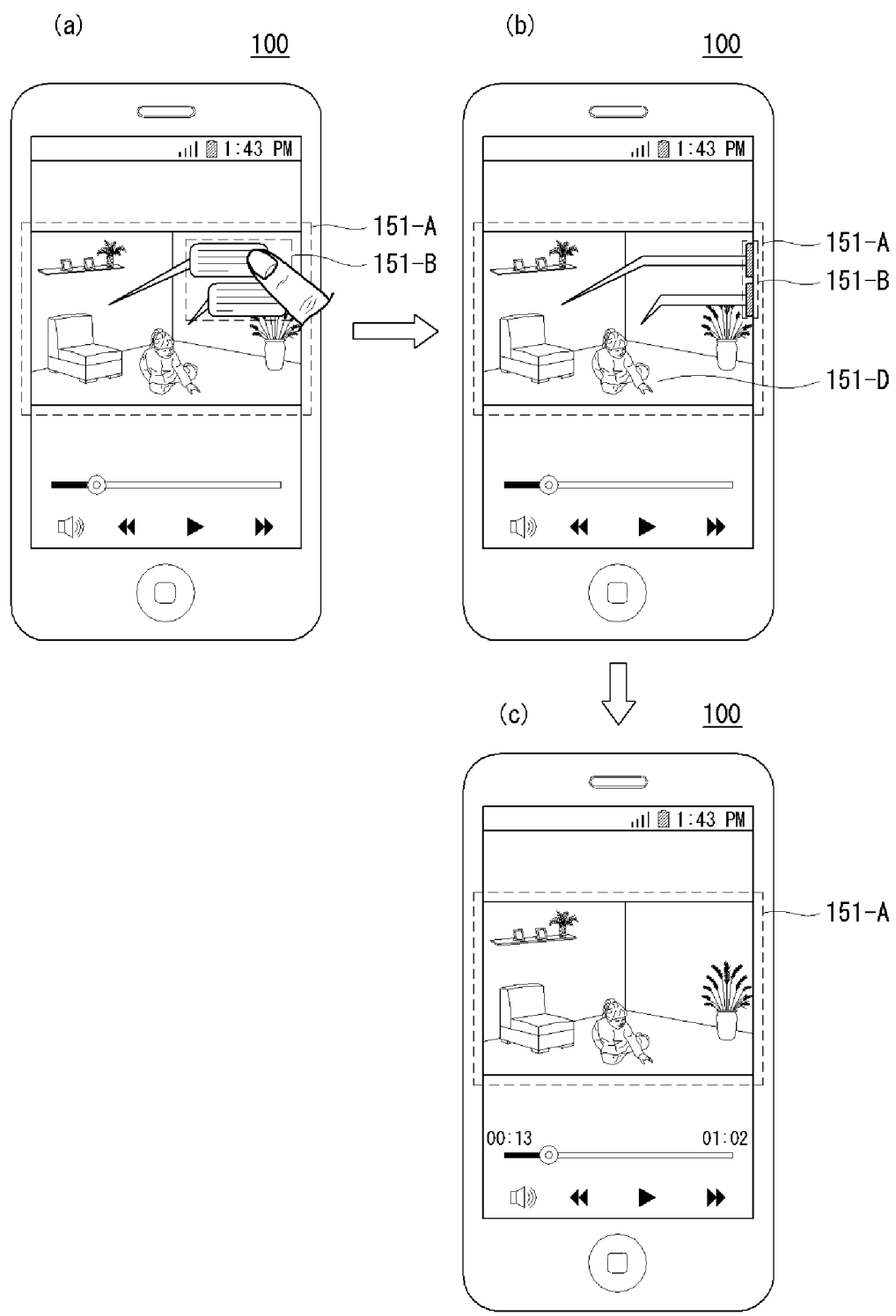
FIGS. 44 to 47 are examples where a touchscreen displays a memo written and stored in relation to a video in a mobile terminal according to the present invention.

FIG. 44(*a*) illustrates a case where, while a memo stored in the middle of video play is displayed, the user moves a touch point on the memo display region 151-B to the edge of the touchscreen 151. Then the controller 180, as shown in FIG. 44(*b*), can move the memo display region 151-B to the outside of the screen.

However, since part of the memo display region 151-B is displayed at the edge of the screen, the user can recognize from the display that a memo is stored. While the screen stays as shown in FIG. 44(*b*), if the user again touches part of the memo display region 151-B displayed at the edge of the screen and move the touch point toward the center of the screen, the controller 180, as shown in FIG. 44(*a*), can display the memo again in the middle of the screen.

FIG. 44(*c*) illustrates a case where display of the memo display region 151-B is terminated when the memo insertion interval is terminated.

Figure 45:
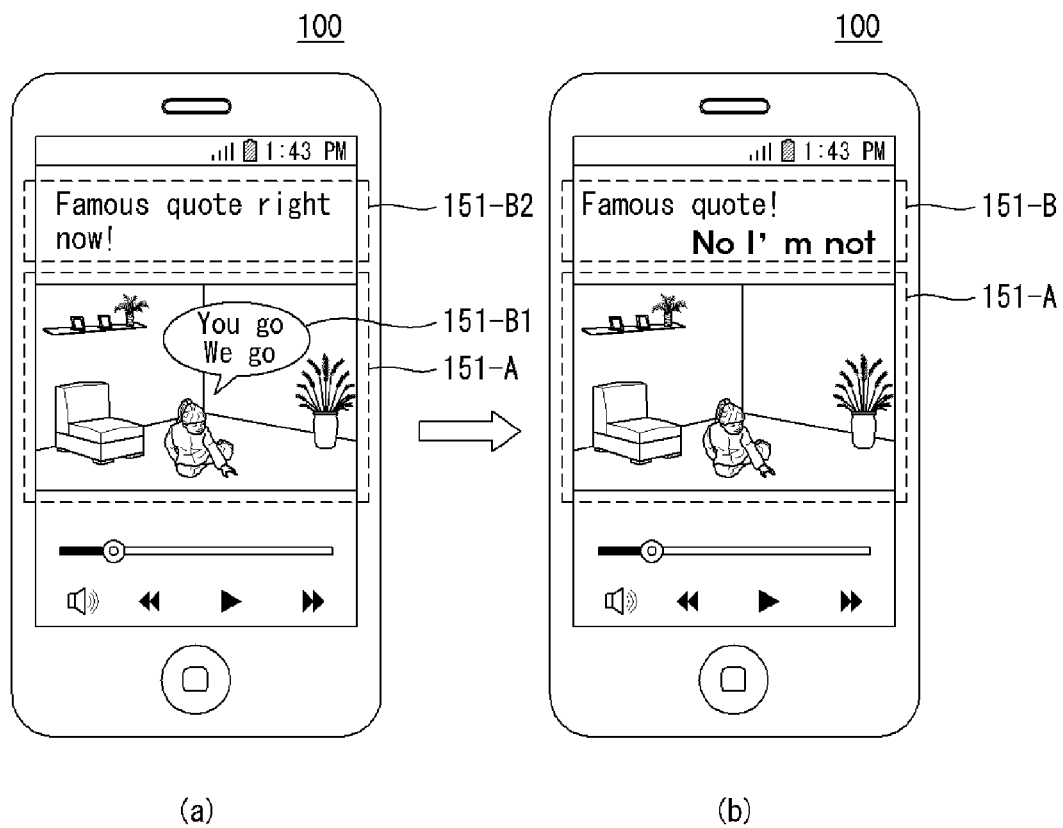

FIG. 45(*a*) illustrates a case where, in case a plurality of memos are stored in the same time period, one memo 151-B1 is provided in the form of speech bubble within the video display region 151-A while the remaining one memo 151-B2 is provided outside the video display region 151-A.

FIG. 45(*b*) illustrates a case where a plurality of memos stored in the same time interval are displayed in a memo display region 151-B separated from the video display region 151-A.

Figure 46:
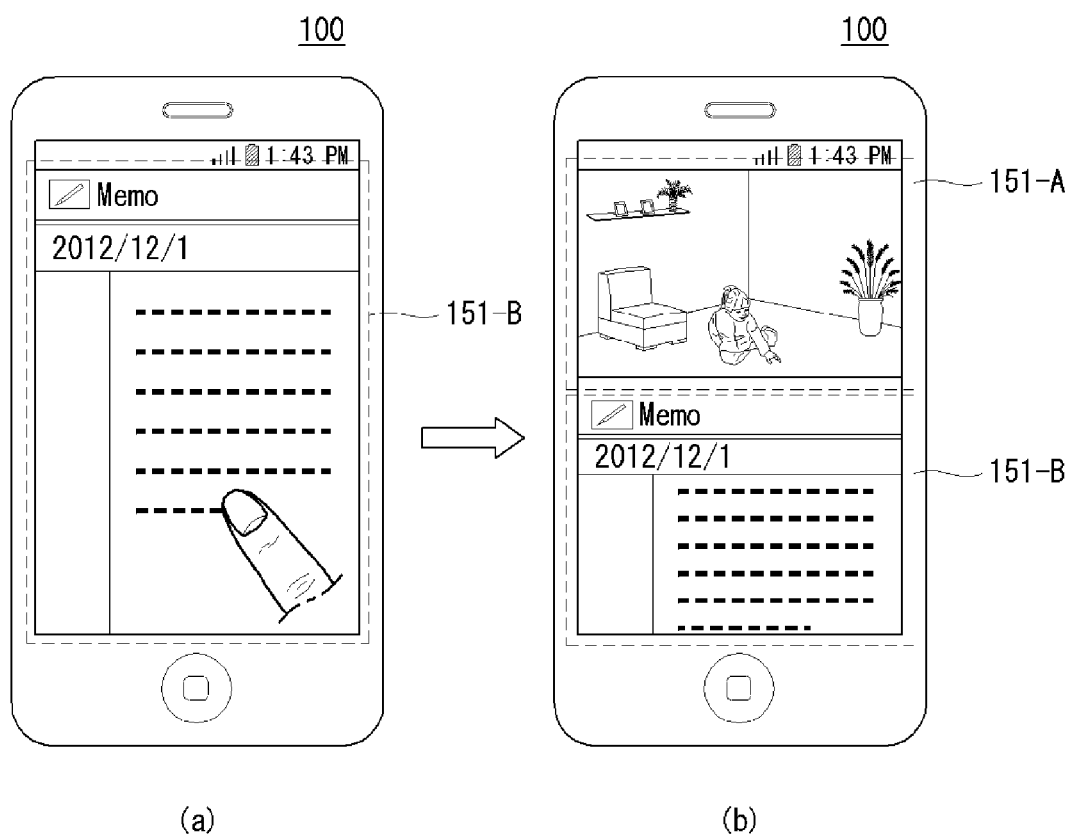

FIG. 46(*a*) illustrates a case where a memo written and stored during video play is retrieved and displayed on the touchscreen 151. In this case, since a memo is displayed across the entire screen, the user can suspend video play when the memo is retrieved. As shown in FIG. 46(*a*), if the user touches the memo display region 151-B, the controller 180, as shown in FIG. 46(*b*), can display a memo in the memo display region 151-B while resuming the video play.

Figure 47:
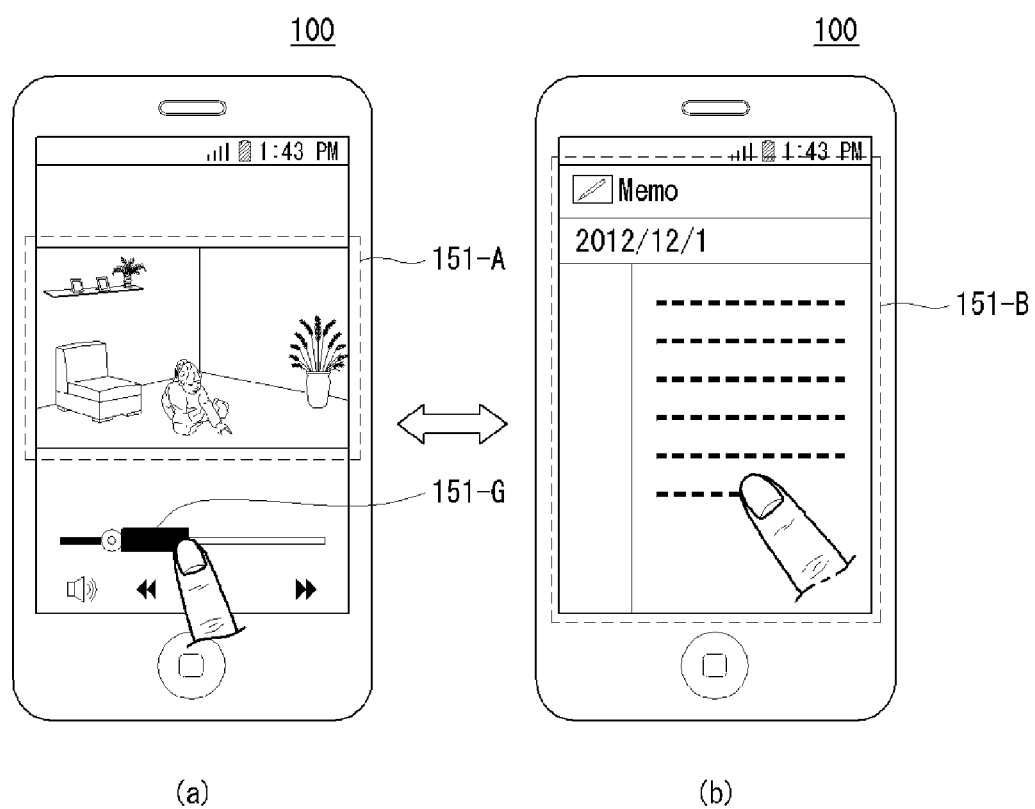

FIG. 47(*a*) illustrates a case where the user touches an icon 151-G indicating insertion of a memo during video play. Then the controller 180, as shown in FIG. 47(*b*), can display the memo display region 151-B across the entire screen. At this time, the controller 180 can suspend video play temporarily. If the user touches the memo display region 151-B while in the status as shown in FIG. 47(*b*), the controller 180 can convert the screen status back to FIG. 47(*a*). At this time, the controller 180 can resume the video play.

Figure 48:
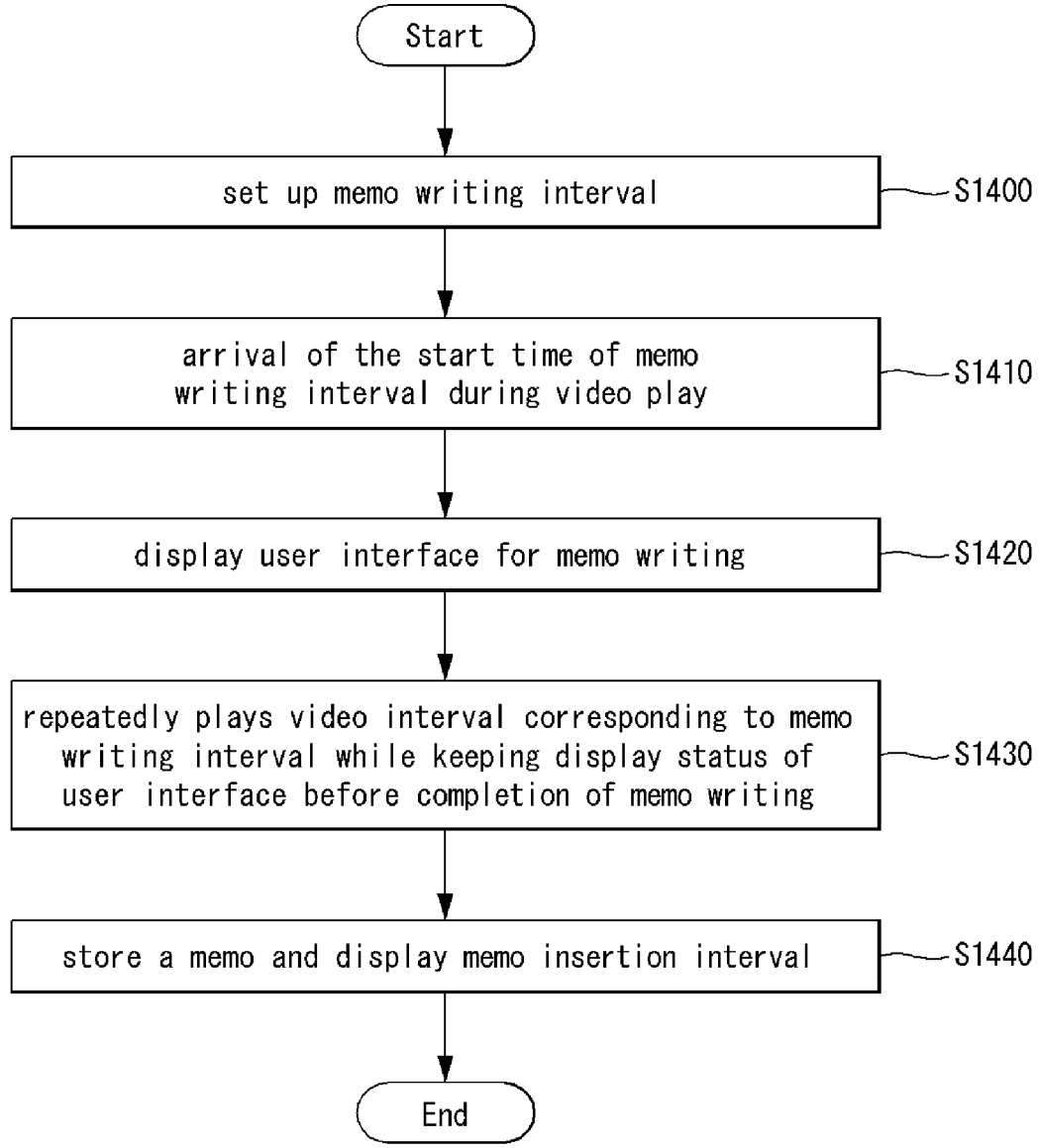
FIG. 48 is a flow diagram illustrating a further example of a method for operating a mobile terminal according to the present invention.

FIG. 48 is a flow diagram illustrating a further example of a method for operating a mobile terminal according to the present invention. In what follows, the method for operating a mobile terminal will be described with reference to related drawings.

First, the controller 180 configures a memo writing interval based on a memo writing start time and a memo writing end time designated by the user S1400. While the memo writing interval is set up, the start time of the memo writing interval is approached while a video is played S1410.

Then, the controller 180, continuing video play, displays a user interface for memo writing on the touchscreen 151, S1420. Next, the controller 180 maintains a display status of the user interface before the memo writing is completed and repeatedly plays a video interval corresponding to the memo writing interval S1430. Although not shown in FIG. 49, the controller 180 can reduce a play speed of a video corresponding to a memo writing interval down to a predetermined speed. And the controller 180, if memo writing is completed, can restore the video play speed to a normal speed even if the video play speed has previously been reduced for memo writing or current timing falls within a memo writing interval.

And if memo writing is completed, the controller 180 stores the memo and displays the memo insertion interval on a progress base of the video play control region S1440. As described above, the controller 180 can configure the memo insertion interval the same as the memo writing interval.

Also, the controller 180 can set up the start time of the memo insertion interval to be the same as the start time of the memo writing interval while the end time of the memo insertion interval can be set up differently from the end time of the memo writing interval. For example, the controller 180, if memo writing is completed while a video interval corresponding to a memo writing interval is played for the first time, can set up the memo writing completion time as the end time of memo insertion.

Meanwhile, as described above, the controller 180 can display a stored memo in its completed form on the touchscreen 151 during the memo insertion interval or display a procedure of memo writing on the touchscreen 151 in synchronization with video play timing. Such a method for memo display can be designated by the user.

Also, the controller 180 can change the memo insertion interval by reflecting the start time of the memo insertion interval and the end time of the memo insertion interval selected by the user.

Figure 49:
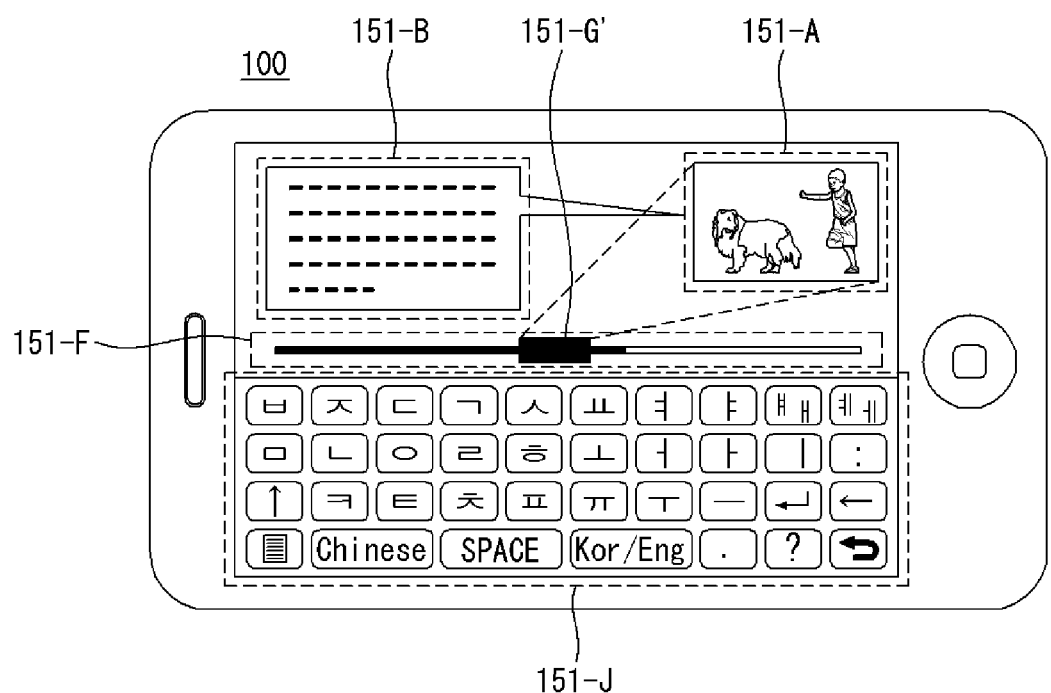
FIG. 49 illustrates an example where a memo is written according to a method for operating a mobile terminal of FIG. 48.

FIG. 49 illustrates an example where a memo is written according to a method for operating a mobile terminal of FIG. 48.

If a memo writing interval is specified and a start time of the memo writing interval is approached during video play, the controller 180, as shown in FIG. 49, reduces the size of a video play region 151-A and displays a user interface for a memo input on the touchscreen 151.

As shown in FIG. 49, the user interface for a memo input includes a keypad 151-J for receiving a memo input and a memo display region 151-B where the contents received through the keypad 151-J are displayed. However, the user interface in the description above is only one example of a user interface for memo writing provided by a mobile terminal according to the present invention.

For example, a mobile terminal 100 according to the present invention may provide a handwriting input region for writing a memo directly from a handwriting input as a user interface for memo writing. As another example, the mobile terminal 100, in case a memo function is provided through voice recognition, may display on the touchscreen 151 a memo display region which displays text converted from a voice recognition result.

Meanwhile, as shown in FIG. 49, the indicator 151-G' displayed in the progress bar 151-F may represent a memo writing interval set up at the initial configuration or a memo insertion interval where a memo generated in that interval can be provided to the user. This applies the same for FIG. 51, which will be described later.

Figure 50:
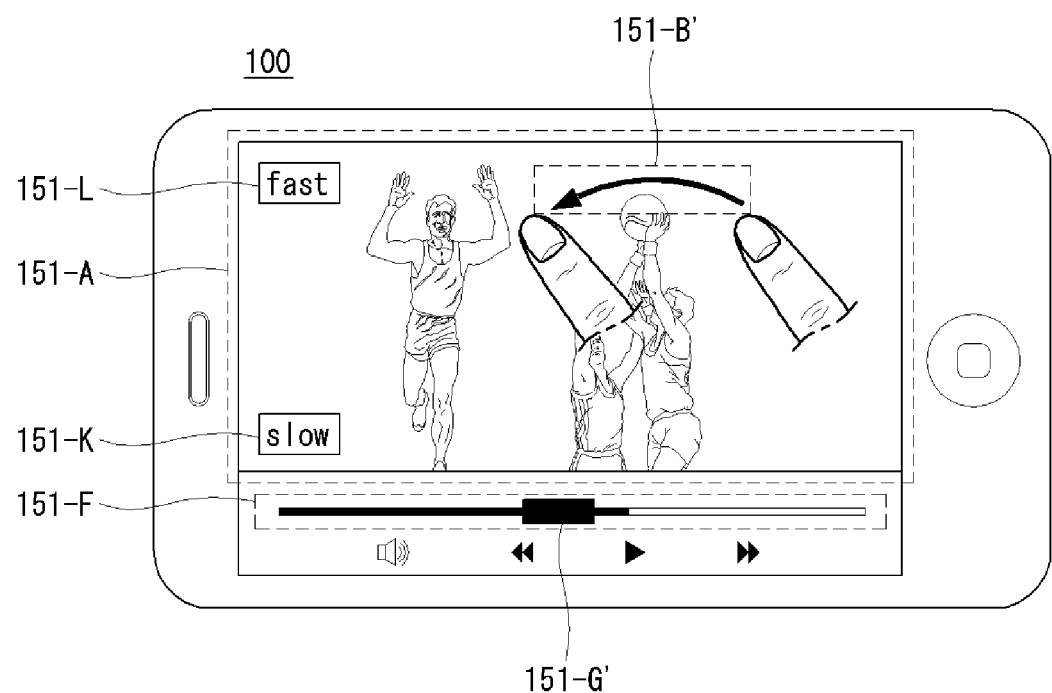
FIG. 50 illustrates another example where a memo is written according to a method for operating a mobile terminal of FIG. 48.

FIG. 50 illustrates another example where a memo is written according to a method for operating a mobile terminal of FIG. 48.

If a memo writing interval is specified and a start time of the memo writing interval is approached during video play, as shown in FIG. 50, a region corresponding to a video play region 151-A is provided as a user interface for memo writing through a handwriting input. And the controller 180 displays selection buttons 151-K for controlling a video play speed on the touchscreen 151. Then the user, as shown in FIG. 50, can draw an arrow as a memo through a handwriting input by using his or her finger.

After a memo is generated and stored and the video is played again and the memo display function is activated, the controller 180 can display on the touchscreen 151 a memo writing procedure generated based on a handwriting input in accordance with a video play speed during the memo insertion interval.

Figure 51:
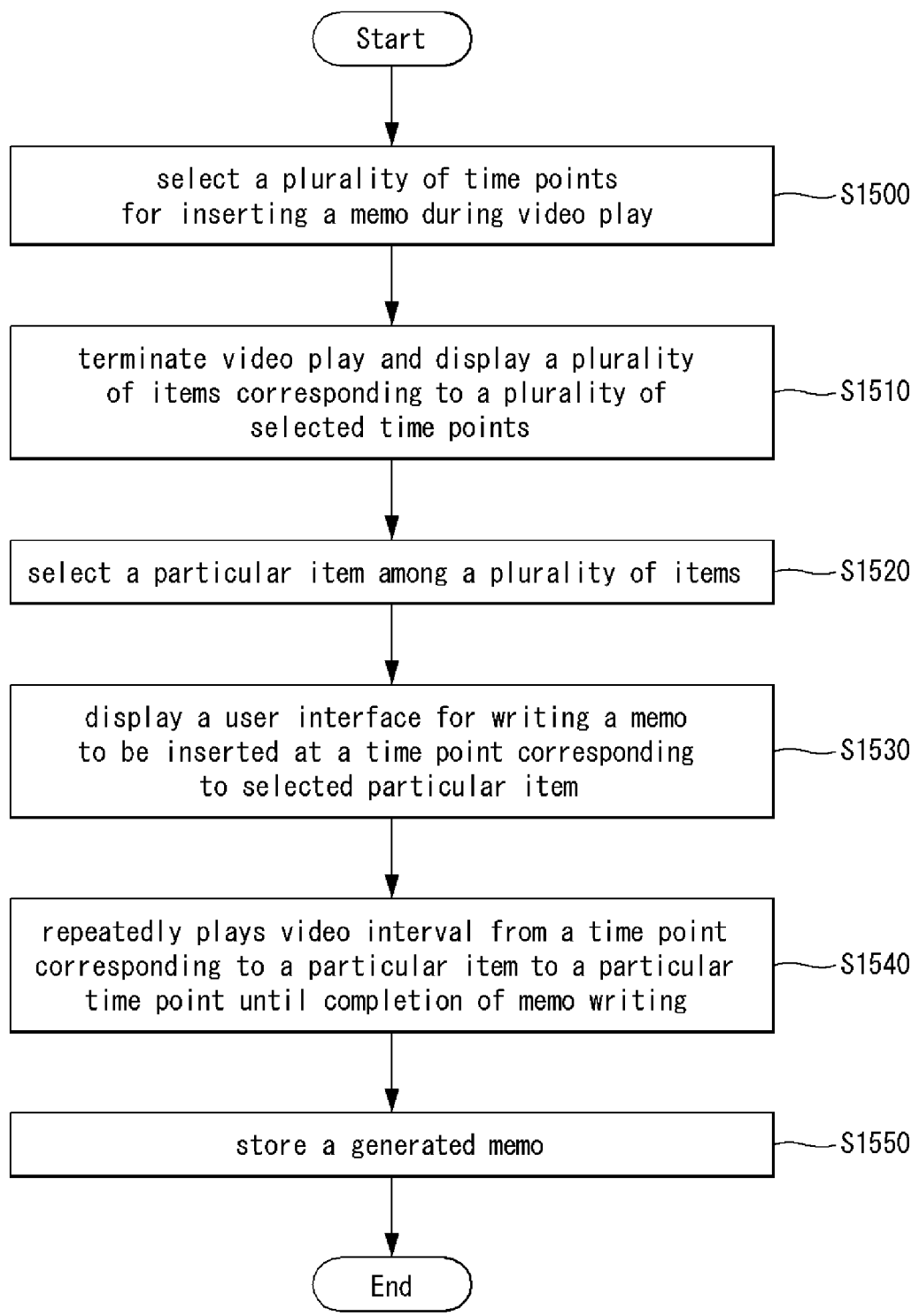
FIG. 51 is a flow diagram illustrating an additional example of a method for operating a mobile terminal according to the present invention.

FIG. 51 is a flow diagram illustrating an additional example of a method for operating a mobile terminal according to the present invention. In what follows, the method for operating the mobile terminal will be described with reference to related drawings.

In the middle of video play, a plurality of time points are selected for memo insertion S1500. The controller 180 can select a particular time point as the time point for memo insertion based on the user's operation of a hardware or software key, a particular gesture of the user, a touch input for a particular pattern through the touchscreen 151, and so on. However, the technical scope of the present invention is not limited to the above description.

If video play is terminated after a plurality of time points are selected, the controller 180 displays a plurality of items corresponding to the selected plurality of time points on the touchscreen S1510. An item corresponding to a particular time point may include video-related information corresponding to the particular time point. The video-related information may include a still image at the particular time point, play time information corresponding to the particular time point, and so on; however, the technical scope of the present invention is not limited to the above description.

A particular item is selected from among a plurality of items displayed on the touchscreen 151, S1520. Then, the controller 180 displays on the touchscreen 151 a user interface for writing a memo to be inserted at a time point corresponding to the selected particular item S1530.

Then the controller 180 plays repeatedly a video interval ranging from a time point corresponding to a particular item to a predetermined time point until memo writing is completed S1540. In case the memo writing is completed within a first play of the video, the video interval is not repeatedly played. The controller 180 can be made to play the video interval only once.

If memo writing is completed, the controller 180 stores the generated memo S1550. Meanwhile the user can configure a memo insertion interval directly. At this time, the start time of the memo insertion interval may correspond to a particular time point corresponding to a generated memo selected during video play. Also, as described earlier, the user can change the memo insertion interval by changing the start time or end time of the memo insertion interval configured previously.

As shown in the figure, FIG. 51 illustrates an example where items intended for selecting a memo writing time point are displayed in case video play is terminated after a plurality of time points are selected. Different from the illustration, however, even if video play is suspended temporarily after a plurality of time points are selected, a mobile terminal 100 according to the present invention can display on the touchscreen 151 a plurality of items corresponding to the selected plurality of time points.

Figure 52:
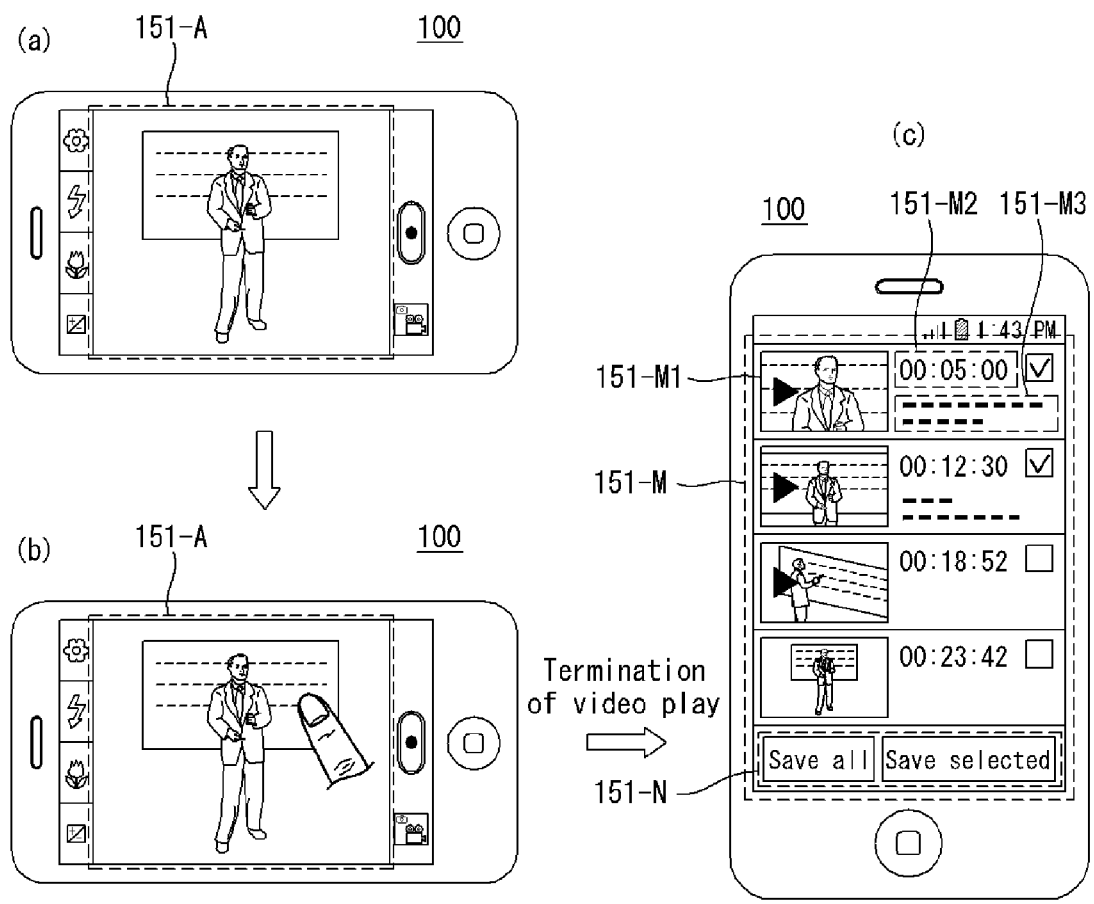
FIG. 52 illustrates an example where, after a memo writing time is selected according to a method for operating a mobile terminal of FIG. 51, an item corresponding to the selected memo writing time is displayed.

FIG. 52 illustrates an example where, after a memo writing time is selected according to a method for operating a mobile terminal of FIG. 51, an item corresponding to the selected memo writing time is displayed.

FIGS. 52(*a*) and (*b*) illustrate a case where the user selects a particular time point by touching a video display region 151-A during video play. After a plurality of time points are selected, video play is terminated. Then the controller 180, as shown in FIG. 52(*c*), can display a plurality of items corresponding to the selected plurality of time points on the touchscreen 151. Also, the controller 180 can display on the touchscreen 151 buttons 151-N for deciding whether to store a memo corresponding to a memo writing time point.

Each item includes a still image 151-M1 and play time information 151-M2 at a time point corresponding to the item. Meanwhile the still image 151-M1 can also provide a play button meant for playing a video interval ranging from a time point corresponding to an item to a particular time point. The number f repetition of the video interval may be one or more. And after memo writing is completed, the generated memo 151-M3 can be displayed for the corresponding item.

FIG. 53 illustrates examples of selecting a time at which a memo is inserted according to a method for operating a mobile terminal of FIG. 51. FIG. 53(a) illustrates a case where, in case a touch input forming a predetermined rectangular shape is received, a current video play time point is specified as a memo insertion position.

Meanwhile the controller 180 may assign different importance to a memo to be generated later depending on the shape of a touch received. For example, the controller 180 can store a memo corresponding to a touch input in the form of a rectangular shape as an important memo whereas it designates a memo corresponding to a touch input forming a circular shape as an ordinary memo.

Figure 54:
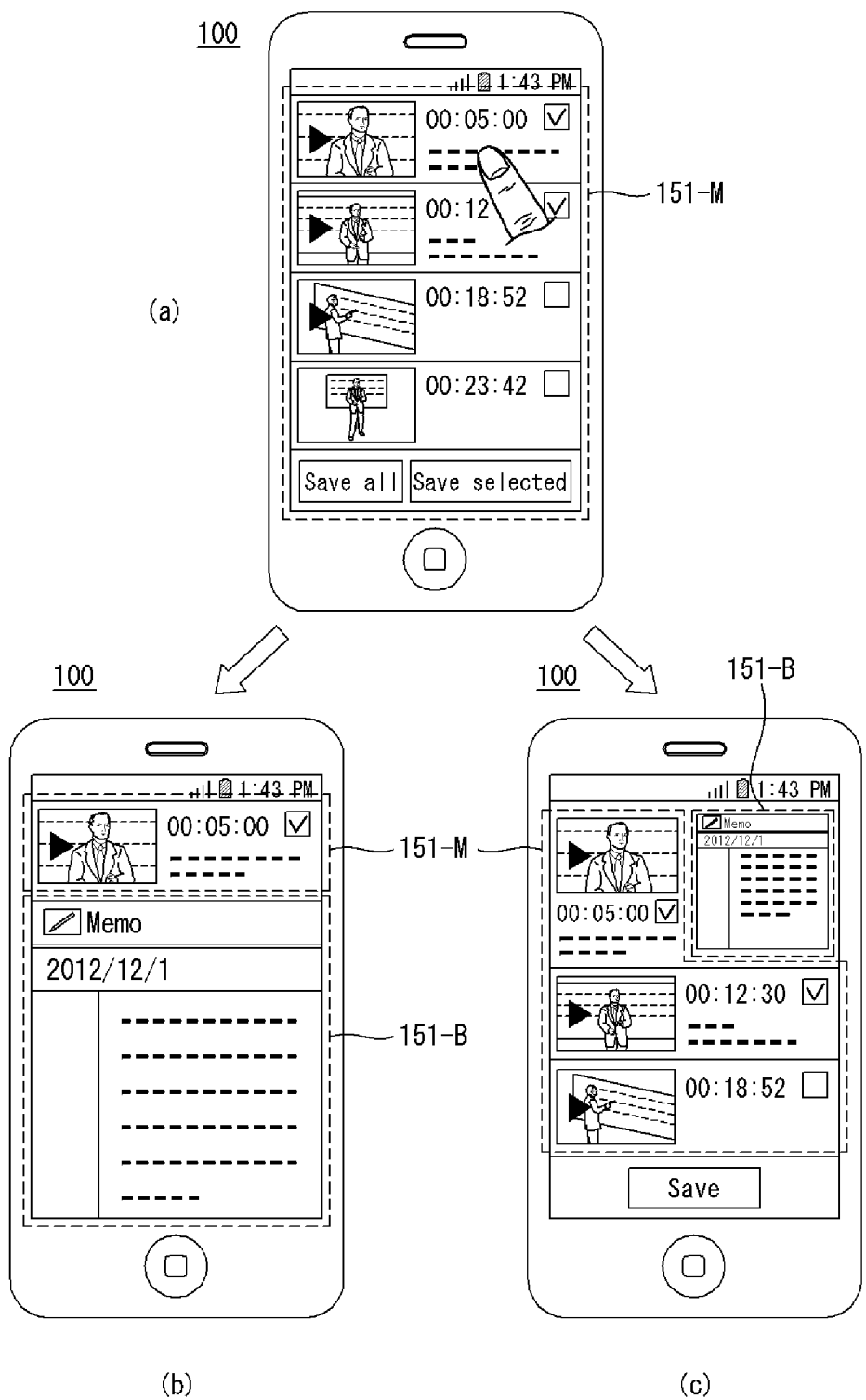
FIG. 54 illustrates examples where, in case a particular item is selected according to a method for operating a mobile terminal of FIG. 51, a user interface for memo writing is provided.

FIG. 54 illustrates examples where, in case a particular item is selected according to a method for operating a mobile terminal of FIG. 51, a user interface for memo writing is provided.

FIG. 54(a) illustrates a case where a plurality of items corresponding to a plurality of time points selected are displayed on the touchscreen 151 after video play is terminated and a particular item among them is selected.

Then, as shown in FIG. 54(b), the controller 180 can assign the entire screen excluding the selected item to the memo display region 151-B. Also, as shown in FIG. 54(c), the controller 180 can display the memo display region 151-B having a small size on the touchscreen 151. Although not explicitly shown in FIG. 54, as described earlier, a method for writing a memo may employ a keypad, voice recognition, and so on. However, the technical scope of the present invention is not limited to the description above.

Figure 55:
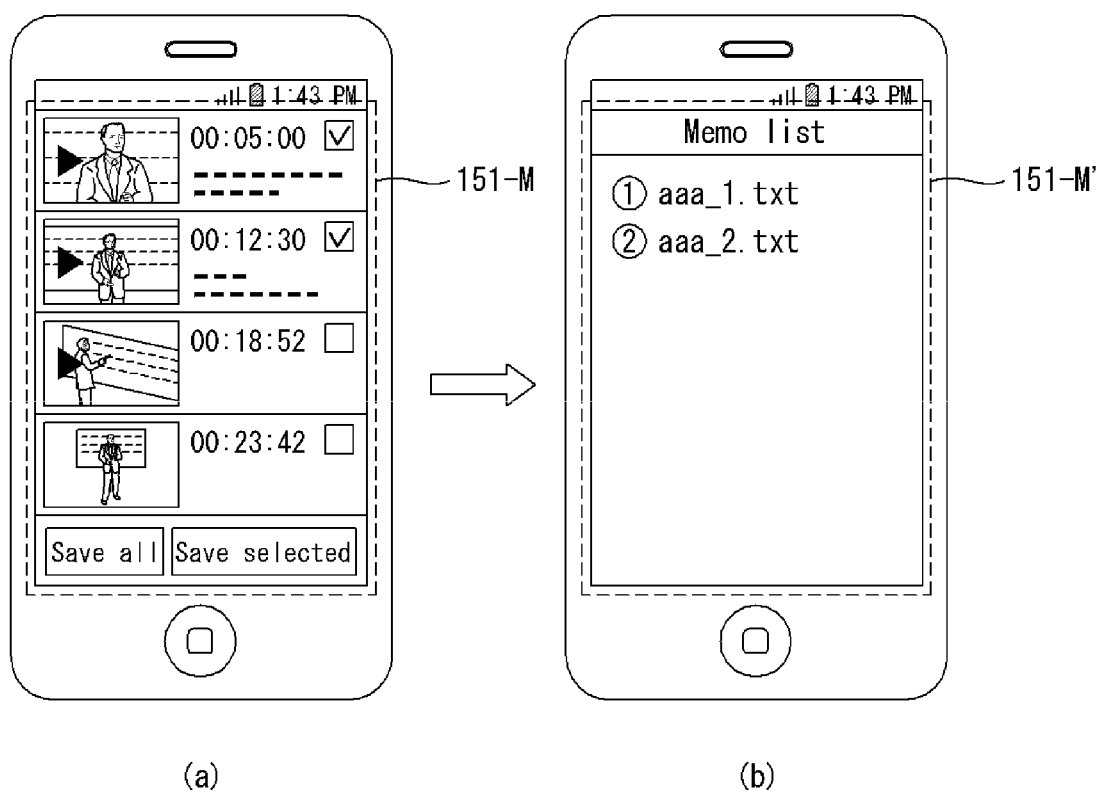
FIG. 55 illustrates one example where a memo written according to a method for operating a mobile terminal of FIG. 51 is stored.

FIG. 55 illustrates one example where a memo written according to a method for operating a mobile terminal of FIG. 51 is stored. The memo list M' shown in FIG. 55(b) indicates that if a new memo is created, the controller 180 automatically stores the memo by giving a non-overlapping title to the memo.

The user of a mobile terminal according to the present invention can carry out a memo-writing function through handwriting or voice inputs during video play.

The mobile terminal according to the present can reduce a video play speed in case a memo writing function is carried out while the video is played.

The mobile terminal according to the present can play a video corresponding to a memo insertion interval repeatedly in case a memo writing function is activated while the video is played.

The mobile terminal according to the present can support designating only a time point at which a memo is supposed to be inserted while a video is played and writing a memo at the designated time point after the video play is completed.

Individual methods related to memo functions carried out in a mobile terminal 100 according to the present invention described above can be implemented in the form of a program which can be carried out through various computer means and can be recorded in a computer-readable recording medium. The computer-readable recording medium may record program commands, data files, data structure, and the like separately or in a combination thereof. A program recorded in the medium may correspond to the one specially designed and implemented for the present invention or the one already known to those skilled in the field of computer software.

Examples of a computer-readable recording medium may include magnetic media such as a hard disk, a floppy disk, and a magnetic tape; optical media such as CD-ROM and DVD; magneto-optical media such as optical disk; and hardware devices such as ROM, RAM, and flash memory specially constructed to store and carry out program commands. Examples of a program may include high-level language codes which can be executed by a computer using an interpreter as well as assembly codes such as those generated by a compiler. The hardware device can be so constructed as to be operated by one or more software modules to carry out operation of the present invention and vice versa.

As described above, although the present invention has been described by a limited number of embodiments and drawings, the present invention is not limited by the embodiments. Rather, those skilled in the art to which the present invention belongs will be able to achieve various modifications from the disclosed embodiments.

Therefore, the scope of the present invention should not be limited by the embodiments described above but should be defined by appended claims and equivalents of the claims.

What is claimed is:

1. A mobile terminal, comprising:
  a hardware memory configured to store information;
  a touchscreen configured to display information; and
  a hardware controller configured to:
    cause the touchscreen to display playback screen of a video on an entire display area of the touchscreen, the playback screen including one or more playback controls of the video;
    divide the entire display area of the touchscreen into a first area and a second area in response to a user selection of a memo-writing function at a first time point of the video;
    wherein the playback screen of the video is displayed on the first area and handwriting input is received on the second area;
    capture a video scene corresponding to the first time point in response to the user selection of the memo-writing function, wherein the captured video scene is displayed as a background of the second area while display of the playback screen of the video on the first area is continued; and
    wherein the handwriting input is received on the captured video scene displayed as the background on the second area and the playback screen of the video further comprises a progress bar, and a position indicator indicating a position of storing the generated memo information is displayed on the progress bar;
    generate memo information corresponding to the received handwriting input;
    cause the touchscreen to display the memo information on the second area of the touchscreen concurrently with the playback screen of the video on the first area;
    generate a memo in response to a user selection of a memo-saving function at a second time point during the display of the video;
    cause the memory to store the memo including the first time point, the second time point, the captured video scene, and the handwriting input, in association with the video.

2. The mobile terminal of claim 1, wherein the controller is further configured to set the first time point as an insertion start time of the memo and set the second time point as an insertion end time of the memo.

3. The mobile terminal of claim 2, wherein the controller is further configured to cause the touchscreen to display the stored memo during an interval between the first time point and the second time point.

4. The mobile terminal of claim 2, wherein the controller is further configured to:
cause the touchscreen to display a user interface that includes a visual indication of the insertion start time and the insertion end time; and
change at least the insertion start time or the insertion end time in response to a user operation received via the displayed user interface.

5. The mobile terminal of claim 4, wherein:
the position indicator displays the insertion start time and the insertion end time in association with a play progress bar of the video; and
the user operation includes a movement of a touch on an area corresponding to the visual indication of at least the insertion start time or the insertion end time.

6. The mobile terminal of claim 4, wherein the controller is further configured to cause the touchscreen to display:
an insertion position of the memo in association with the progress bar of the video; and
the memo based on a touch on an area corresponding to the insertion position.

7. The mobile terminal of claim 1, wherein:
the displayed memo information includes a word; and
the controller is further configured to search for the selected word and cause the touch screen to display results of the search in response to a user selection of the word.

8. A mobile terminal, comprising:
a touchscreen configured to display information; and
a hardware controller configured to:
cause the touchscreen to display a video and a progress bar for controlling playback of the video;
activate a memo-insertion function during the display of the video when predetermined input data is generated from an input unit while the video is displayed;
deactivate a video switching function such that a playback position of the video is not changed in response to a touch to the displayed progress bar;
cause the touchscreen to display a file list including a plurality of selectable data for selecting data to be inserted as a memo into the video being played;
receive a first touch input via the touchscreen selecting particular data of the displayed user interface;
receive a second touch input to a particular position on the progress bar to define a memo insertion start point; and
insert the selected particular data as the memo into the video at a time point corresponding to the memo insertion start point on the progress bar, wherein the video is continuously played while the selected particular data is inserted as the memo;
wherein a playback indicator indicating the current playback position is correspondingly moved while the video switching function through the progress bar is deactivated and the memo-insertion function is activated,
wherein the controller is further configured to receive a memo insertion end time on the progress bar based on a user input and further cause the touch screen to repeat display of the video from a time point corresponding to the memo insertion start time to the memo insertion end time until the memo writing is completed.

9. The mobile terminal of claim 8, wherein the second touch input is received after the first touch input.

10. The mobile terminal of claim 8, wherein:
the displayed user interface includes a plurality of selectable data each corresponding to a time point of the plurality of time points; and
the controller is further configured to cause the touchscreen to display a user interface for writing the memo to be inserted at the time point corresponding to the particular data.

11. The mobile terminal of claim 10, wherein the displayed video is video being recorded by a video recording function of the mobile terminal.

12. The mobile terminal of claim 10, wherein the displayed user interface includes at least time point information or a still image of the video at each of the plurality of time points.

13. The mobile terminal of claim 12, wherein the controller is further configured to set a memo insertion interval of the memo based on the time point corresponding to the memo insertion start time and the memo insertion end time.

14. The mobile terminal of claim 13, wherein the controller is further configured to change at least the time point corresponding to the memo insertion start time or the memo insertion end time based on a user input, and change the memo insertion interval based on the change of the memo insertion start time or the memo insertion end time.

15. The mobile terminal of claim 13, wherein the controller is further configured to cause the touchscreen to display a portion of the video corresponding to the changed memo insertion interval.

16. The mobile terminal of claim 12, wherein the controller is further configured to pause the video when the plurality of time points are selected, wherein the user interface for writing the memo is continued to be displayed.

17. A mobile terminal, comprising:
a touchscreen configured to display information;
a hardware memory configured to store information related to a video, wherein the stored information includes a pre-stored memo writing time interval for a memo to be input, the time interval comprising a start time and an end time stored prior to playback of the video; and
a hardware controller configured to:
cause the touchscreen to display playback of a video;
cause the touchscreen to display a user interface for memo writing when a current playback time of the video enters the pre-stored memo writing time interval while the video is being played;
deactivate a video switching function such that a playback position of the video is not changed in response to a touch to the displayed progress bar;
receive a memo writing input to the displayed user interface via the touchscreen;
cause the touchscreen to repeat playback of a portion of the video from a time point corresponding to the start time to a time point corresponding to the end time until the memo writing input is completed, and repeating playback of the portion of the video is terminated when the memo writing input is completed,
cause the memory to store a memo including the start time, the end time, and the memo writing input;

wherein the pre-stored memo writing time interval is set before receiving the memo writing input; and wherein the controller is further configured to cause the touchscreen to:

display the video at a reduced speed during the memo writing time interval before the memo writing is completed; and display the video at a normal speed when the memo writing is completed even if a completion time point of the memo writing is within the memo writing time interval.

18. The mobile terminal of claim 17, wherein the controller is further configured to determine the memo writing time interval before the user interface is displayed.

19. The mobile terminal of claim 17, wherein the controller is further configured to change the end time of the memo writing time interval to a time at which the memo writing is completed, when the memo writing is completed while the portion of the video is being displayed for the first time.

20. The mobile terminal of claim 19, wherein the controller is further configured to cause the touchscreen to:

display a completed memo during the memo writing time interval; or display a memo writing procedure in synchronization with the video during the memo writing time interval.

21. The mobile terminal of claim 17, wherein the controller is further configured to change the memo writing time interval based on a change of the start time or the end time by a user.

22. The mobile terminal of claim 17, wherein the controller is further configured to set a beginning of the memo writing input at a first time point of the video, set an end of the memo writing input at a second time point of the video, and set the memo writing time interval based on the first time point and the second time point.

23. The mobile terminal of claim 22, wherein the controller is further configured to cause the touchscreen to:

display the video at a first speed before the beginning of the memo writing input is set;

display the video at a second speed that is less than the first speed when the beginning of the memo writing input is set; and display the video at the first speed when the end of the memo writing input is set.

24. The mobile terminal of claim 23, wherein displaying the video at the first speed when the end of the memo writing input is set includes displaying the video from the first time point and displaying the memo writing input from the memo writing start time to the end time.

25. The mobile terminal of claim 22, wherein the controller is further configured to cause the touchscreen to display the memo writing time interval on a progress bar of the video.

26. The mobile terminal of claim 25, wherein the controller is further configured to cause the touchscreen to:

display the memo during the memo writing time interval; or display a memo writing procedure in synchronization with the video during the memo writing time interval.

27. The mobile terminal of claim 26, wherein the controller is further configured to change the memo writing time interval based on a change of the start time or end time of the memo writing time interval by a user.

28. The mobile terminal of claim 27, wherein the controller is further configured to cause the touchscreen to display at least:

play time information about a time point selected by the user to which the start time or end time of the memo insertion interval is changed; or a still image corresponding to the start time or end time of the memo writing time interval.

\* \* \* \* \*